United States Patent [19]

Magill

[11] Patent Number: 5,411,805
[45] Date of Patent: May 2, 1995

[54] TRIAXIALLY ORIENTED POLYMER MEMBRANE

[75] Inventor: Joseph H. Magill, Pittsburgh, Pa.

[73] Assignee: University of Pittsburgh of the Commonwealth System of Higher Education, Pittsburgh, Pa.

[21] Appl. No.: 74,684

[22] Filed: Jun. 9, 1993

Related U.S. Application Data

[63] Continuation of Ser. No. 796,074, Nov. 20, 1991, abandoned, which is a continuation of Ser. No. 576,009, Aug. 31, 1990, abandoned, which is a continuation-in-part of Ser. No. 275,707, Nov. 22, 1988, abandoned, which is a continuation of Ser. No. 922,035, Oct. 22, 1986, abandoned.

[51] Int. Cl.⁶ .............................................. B32B 9/00
[52] U.S. Cl. ............................ 428/411.1; 428/412; 428/474.4; 428/500; 428/910; 428/220
[58] Field of Search ................. 428/411.1, 412, 474.4, 428/500, 910

[56] References Cited

U.S. PATENT DOCUMENTS

| | | | |
|---|---|---|---|
| 2,952,878 | 9/1960 | Swerlick et al. | 18/48 |
| 3,801,404 | 4/1974 | Druin | 156/229 |
| 4,026,977 | 5/1977 | Bourganel | 264/41 |
| 4,026,978 | 5/1977 | Mungle et al. | 264/41 |
| 4,049,589 | 9/1977 | Sakane | 260/2.5 M |

(List continued on next page.)

OTHER PUBLICATIONS

M. J. Shankernaryanan, "A Study of Doubly Oriented Polymers Deformation-Morphology-Properties," (1985).

M. J. Shankernarayan et al., "Preparation of highly doubly oriented polymers," *Journal of Materials Science Letters* 5, (1986) pp. 267–269.

M. J. Shankernarayan et al., "Rolltrusion: Doubly-Orientation Processing and Morphology-Property Relationships for Commercial Plastics: Part I, Polyolefins," (Apr. 1986).

H. Voss et al., "On the Wear Behaviour of Doubly-Oriented Polymers: Part I Nylon 6" (1987), *Journal of Applied Polymer Science*, vol. 33, p. 1745.

H. Voss et al. "On the Wear Behavior of Doubly-Oriented Polymers: Part II Polyethylene and Polypropylene," (1987) *Journal of Applied Polymer Science*, vol. 34, p. 177.

M. J. Shankernarayan et al., "Rolltrusion: Doubly-Orientation Processing and Morphology-Property (List continued on next page.)

Primary Examiner—Patrick J. Ryan
Assistant Examiner—Kam Lee
Attorney, Agent, or Firm—Arnold B. Silverman; Suzanne Kikel

[57] ABSTRACT

A process is disclosed for the solid phase preparation of triaxially oriented synthetic polymeric material from an orientable amorphous but crystallizable or a semicrystalline thermoplastic polymeric workpiece comprising (a) presenting the conditioned workpiece, at the entry mode of an opposing pair of solid rollers that are spaced apart a distance substantially less than the thickness of the workpiece; and (b) deforming the workpiece by compressive passage through the paired rollers at a nominal deformation ratios of at least 2 to 1. The deformation drawing is carried out between the glass transition temperature and the melting point of the polymeric material, by applying a draw tension insufficient to cause tensile failure of the workpiece. Also disclosed is a rolltruded copolymer membrane or film-like material with a triaxial orientation morphology with a periodicity consisting essentially of crystallite and amorphous materials or a periodic distribution or crystalline and intercrystalline tie regions.

31 Claims, 34 Drawing Sheets

U.S. PATENT DOCUMENTS

| | | | |
|---|---|---|---|
| 4,151,031 | 4/1979 | Goad et al. | 156/201 |
| 4,384,023 | 5/1983 | Okamura et al. | 428/338 |
| 4,442,147 | 4/1984 | Schirmer | 428/35 |
| 4,643,865 | 2/1987 | Okada et al. | 264/288.4 |

OTHER PUBLICATIONS

Relationships for Commercial Plastics," (1987) *International Polymer Processing*, pp. 65–74.

M. J. Shankernarayanan et al., "Rolltrusion: Doubly-Orientation Processing and Morphology-Property Relationships for Commercial Plastics," (1987), *Intern. Polymer Processing*, pp. 66–76.

J. H. Magill et al., "Property Correlations for Doubly Oriented Polymers Prepared by the Rolltrusion Technique" (1987), *Journal of Applied Polymer Science*, vol. 34, pp. 2337–2343.

J. H. Magill, "High Modulus Polymers," (1988), *Polymer News*, vol. 13, No. 4, pp. 107–113.

E. M. Berg et al., "3–D Structure–Property Relationships in Rolltruded Polymers, Part 1: Mechanical Property Enhancement in Three Directions," (Jun. 1989) *Polymer Engineering and Science*, vol. 29, No. 11, pp. 715–721.

D. C. Sun et al., "3–D Structure–Property Relationships in Rolltruded Polymers. Part III: The Origin of 3-D Property Enhancement," presented at American Chemical Society Polymer Meeting, Miami, Fla. (Sep. 10–15, 1989).

D. C. Sun et al., "Thermal Interactions in Oriented Polymeric Materials: Shrinkage, Crystallization, and Melting," *Polymer Engineering and Science*, vol. 29, No. 21, pp. 1503–1510 (Nov. 1989).

D. C. Sun et al., "Novel 3–Dimensional Mechanical Properties for Rolltruded Polymers: Polypropylene," *Journal of Polymer Science: Part C: Polymer Letters*, vol. 27, pp. 65–72 (1989).

D. C. Sun et al. "Rolltrusion Properties and Modeling," (Apr. 17–20, 1990) Keynote Lecture presentation at Sixth Annual Meeting, PPS, Nice, France.

C. C. Lin et al., "Morphology and Mechanical Properties of Rolltruded Propylene–Ethylene Block Copolymers," (Apr. 17–20, 1990), presentation at Sixth Annual Meeting, PPS, Nice, France.

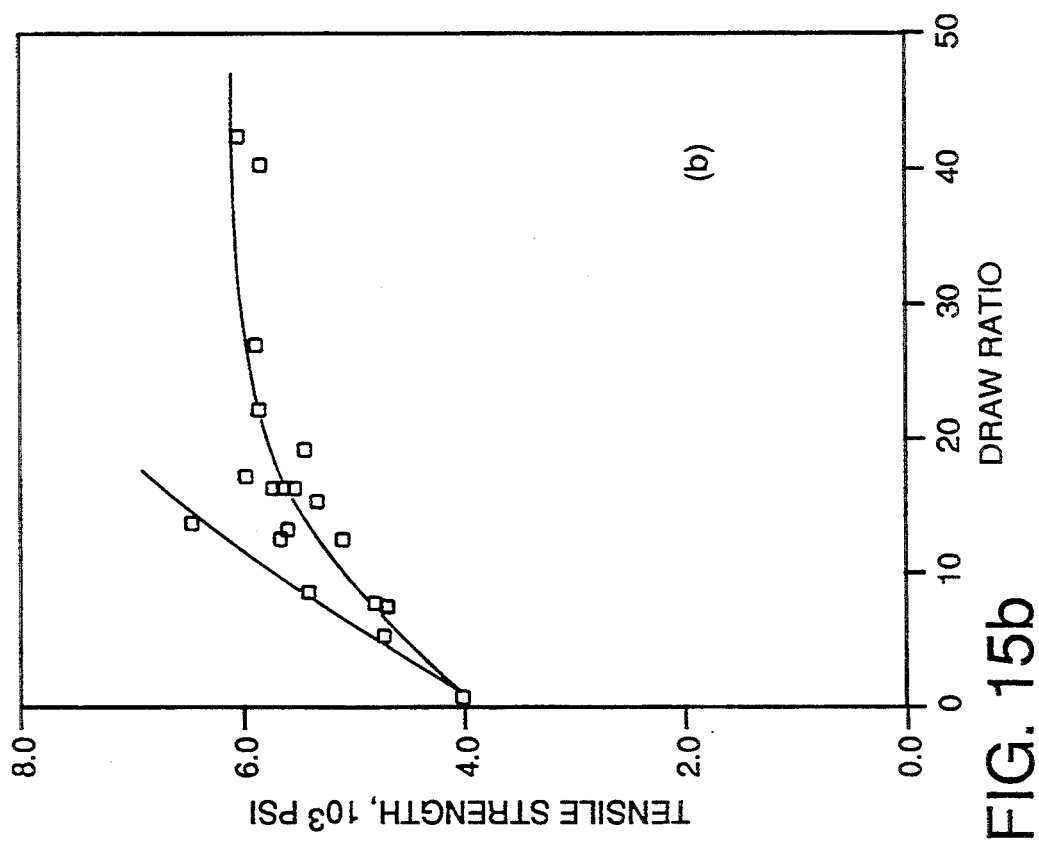
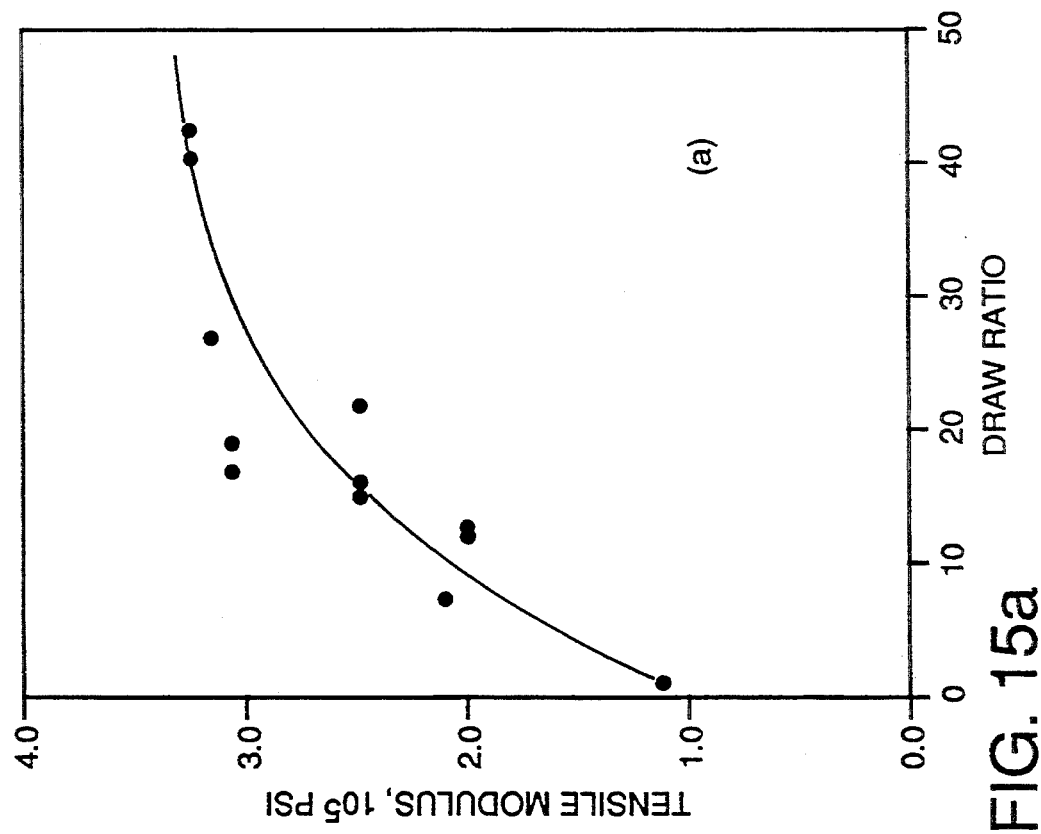
FIG. 15a
FIG. 15b

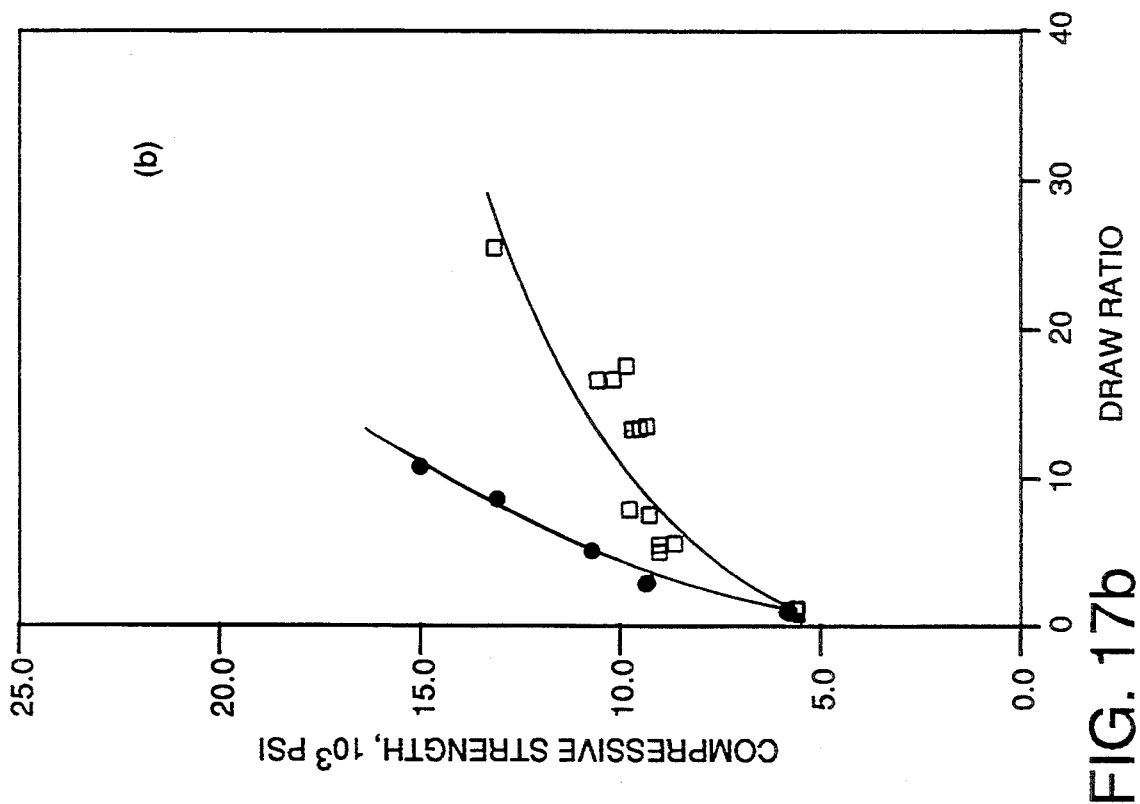
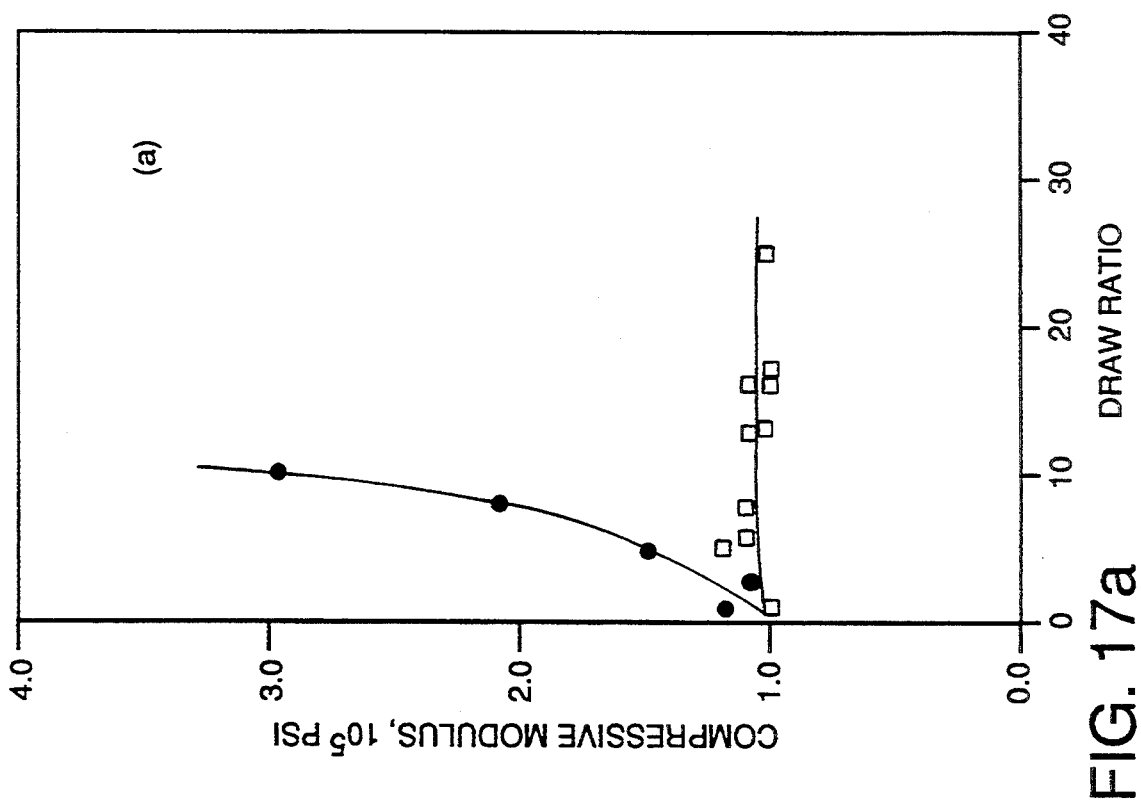
FIG. 17b
FIG. 17a

11(Y)

11(Z)

11(X)

PARALLEL TO (Z)

PARALLEL TO (Y)

PARALLEL TO (X)

PARALLEL TO (Z)

PARALLEL TO (Y)

PARALLEL TO (X)

| PARALLEL TO (X) | PARALLEL TO (Y) | PARALLEL TO (Z) |
|---|---|---|
| 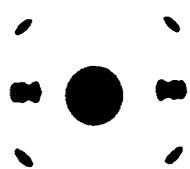 | 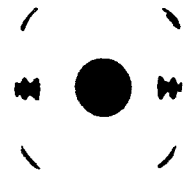 |  |
| ROLLED POLY(PROPYLENE) FIG. 26a | ROLLED POLY(PROPYLENE) FIG. 26b | ROLLED POLY(PROPYLENE) FIG. 26c |

| PARALLEL TO (X) | PARALLEL TO (Y) | PARALLEL TO (Z) |
|---|---|---|
| 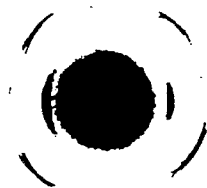 | 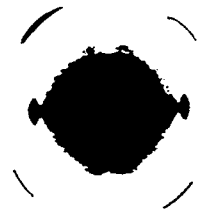 |  |
| BIAXIALLY ORIENTED POLY(PROPYLENE) FIG. 26d | BIAXIALLY ORIENTED POLY(PROPYLENE) FIG. 26e | BIAXIALLY ORIENTED POLY(PROPYLENE) FIG. 26f |

| PARALLEL TO (X) | PARALLEL TO (Y) | PARALLEL TO (Z) |
|---|---|---|
| 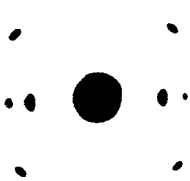 | 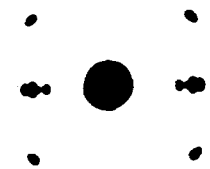 | 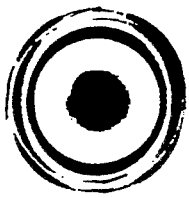 |
| ROLL-TRUDED POLY(PROPYLENE) FIG. 26g | ROLL-TRUDED POLY(PROPYLENE) FIG. 26h | ROLL-TRUDED POLY(PROPYLENE) FIG. 26i | ns is
TRIAXIALLY ORIENTED POLYMER MEMBRANE

This invention was made with government support under National Science Foundation Award No. CBT 8822829. The government has certain rights in the invention.

This is a Continuation of application Ser. No. 07/796,074, filed Nov. 20, 1991, now abandoned which is a continuation of application Ser. No. 07/576,009 filed on Aug. 31, 1990, which is being abandoned, which is a Continuation-In-Part of Ser. No. 07/275,707, filed Nov. 22, 1988, which, in turn is a continuation of Ser. No. 06/922,035, filed Oct. 22, 1986, now abandoned.

BACKGROUND OF THE INVENTION

The invention relates to an improved polymer membrane or thin film used in chemical technology. More particularly, the invention relates to a triaxially oriented polymer membrane produced by the rolltrusion process.

Polymers, by definition, are long chain molecules in which the atoms are bound to one another by means of strong covalent bonds. Hence one would expect exceptionally high strength and stiffness values in the chain direction since the applied load would then be opposed by the covalent bond themselves. On the contrary, most of the commercial polymers exhibit strength and stiffness values far below their theoretical limits. It is established that the modulus values of most of the commercial polymers are at least an order of magnitude less than their theoretical limits, thus severely limiting their use in many structural or load bearing applications. One of the many ways to improve engineering properties lies in the preparation of highly chain extended/oriented polymers. Another is to create a well regulated nonspherulitic morphology with oriented crystalline regions separated by amorphous regions which may be oriented to varying degrees to create a workpiece with improved properties in 3-D (three directions). The latter approach is unique and forms the basis for rolltrusion, a new process, and its applications. This rolltrusion process is discussed in the above parent case, U.S. Ser. No. 275,707, filed Nov. 22, 1988. It is not simply the crystallinity of the polymer that determines its properties but the morphological distribution of crystalline and amorphous regions and their respective sizes and states of orientation. As engineering materials polymers offer several advantages over metals and ceramics, in terms of high strength to weight ratio, cost efficiency, easy processability and improved corrosion resistance in many applications. See Table 1.

The need for oriented polymers has led to the development of several orientation techniques such as solid state deformation of polymers, preparation of polymers with rigid chemical structures; and crystallization/fiber spinning from gels and dilute solutions. Much of the research in oriented polymers during the past two decades have been devoted towards an improvement and understanding of processing-morphology property relations in uniaxially oriented systems. However, in the present invention, we are concerned with the preparation of highly triaxially oriented polymers from commercial plastics produced by the rolltrusion process, which produces a membrane for use in chemical technology.

Solid State Deformation of Polymers

Amongst the orientation techniques mentioned, solid state deformation of polymers has been extensively researched because of its technological and commercial importance.

A. Cold Drawing

This is the foremost amongst the various deformation techniques used in the preparation of highly oriented crystalline and amorphous polymers. Cold drawing is usually carried out by drawing the specimen on a tensile testing machine. The extent of drawing is highly dependent on deformation conditions such as draw temperature and speed, and also on material properties, such as molecular weight, molecular weight distribution, and to some extent on the initial morphology of the polymer. The method is limited in practice due to the batch nature of the process and its inability to process large sections of polymer.

B. Cold Extrusion

The process consists of forcing the solid polymer through a tapered die by means of a ram or plunger. The technique has been successfully employed in the preparation of highly oriented polyethylene, polypropylene and several other polymers. The limitations of this technique are (a) requirement of extremely high pressures for the attainment of high draw ratios; (b) appearance of cracks on the extrudated surfaces at high draw ratios; and (c) inability to process certain types of polymers.

C. Hydrostatic Extrusion

The process is very similar to cold extrusion except that the pressure is now transmitted through a fluid which surrounds the polymer. The pressure required for hydrostatic extrusion of polymers is much lower than cold extrusion. Still, it requires the use of high pressures which cause severe risks in commercial-level processing.

D. Die Drawing

In this technique oriented polymers are produced by drawing the billet through a converging die. This method has been used to produce oriented polyethylene, polypropylene, and polyvinylidene fluoride.

Widespread commercial use of the above techniques has been limited due to their batch operation nature, complex instrumentation, and their inability to process large billets of formed plastics.

F. Rolltrusion

This solid state deformation technique was developed by Applicant and co-workers for the preparation of triaxially oriented polyolefins, nylons, ethylene/propropylene block copolymers, polyvinylidene fluoride, poly(ethyleneterephthalate), polycarbonates, poly(aryletheretherketone) (PEEK), and polyester polymers from commercial plastics. The technique, in principle, is relatively simple and is a continuous deformation process, which is now shown as employable in the fabrication of highly doubly, or triaxially oriented polymers from such plastics. It overcomes the processing limitations imposed by die drawing, like fixed die dimensions, that limit the processing of large sheets and rods. Additionally, it is not material limited in the sense that high melting polymers, such as PEEK, and ultra high molecular polymers, such as polyethylene may be processed by rolltrusion, whereas previously these types of materials were not extruded satisfactorily. Table 1A summarizes and compares these six known examples of solid state deformation techniques.

Types of Orientation

Conventionally, three types of molecular orientation can be introduced into any isotropic polymeric system:
(A) Uniaxial Orientation—As the name suggests, there occurs preferential alignment of the polymer molecules along the direction of application of deformation force. Typical processes which lead to uniaxial orientation are cold drawing and cold extrusion.
(B) Biaxial Orientation—In this case, the polymer molecules are preferentially aligned along two different deformation directions usually perpendicular to one another. Film blowing processes normally lead to biaxial orientation; and
(C) Triaxial Orientation—When an uniaxially oriented polymer is rolled under suitable conditions, one of the crystallographic planes usually lies parallel to the molecular axis and becomes oriented within the plane of rolling. Triaxially oriented polymers may be produced in several ways, as illustrated in FIG. 1. Rolltrusion is a one step operation, which is demonstrably more effective to achieve this orientation. All other known state of the art processes are multi-step operations. Rolltrusion is the method used to produce the membrane of the invention.

Triaxially Oriented Polymers

Triaxially oriented polyethylene, polypropylene, nylon 6, nylon 66, and some other polymers, have been produced by various researchers using mainly a two stage process. However, a detailed review of the literature has shown that these polymers have been employed mainly: (i) to detail the structural changes in oriented polymers upon deformation, and (ii) in basic morphological investigation of crystalline polymers. Few, if any, have approached triaxial orientation as a viable alternative for the preparation of high strength-/modulus polymers in bulk; hence, the lack of systematic studies on processing-morphology-properties relations in triaxally oriented polymers prior to the present invention. The mechanisms of deformations of semi-crystallines are well known.

Applicant and co-workers investigated the processing-structure-property relations in rolltruded polyethylene sheets up to draw ratios of about 30:1, and as high as 60:1 for polypropylene. See "Preparation of Highly Doubly Oriented Polymers"; (J. H. Magill et al., Jour. of Material Science Letters, 5, 267-269, March 1986). Applicant and other co-workers investigated the morphology in deformed polypropylene and propylene-/ethylene block copolymers. See Prague Conference Proceedings on Polymer Morphology, July 1985.

The effect of draw temperature and draw speed and other parameters on the deformation behavior were examined in an attempt to optimize the processing conditions for the preparation of highly triaxially oriented rolltruded specimens. These samples exhibited enhanced transparency, increased molecular orientation along the deformation direction and increased melting point and degree of crystallinity. They obtained triaxially oriented polyolefins, ethylene/propylene co-polymers, and polyketones, polycarbonates samples with tensile strength values up to 50 ksi, a seventeen fold increase as compared to the original commercial polymer.

More recently, highly oriented polyethylene samples (presumably triaxially oriented) have been produced by Kaito and co-workers (J. Appl. Poly Sci., Vol. 30 (1985) p. 1241) using the roller drawing technique. They investigated the effect of draw ratio on the induced molecular orientation, melting characteristics and the mechanical properties of "roller-drawn" polyethylene thin strips. They thought roller drawing to be a useful procedure for producing high modulus and high strength HDPE sheets.

Uniaxial deformation behavior of polyethylene fibers (up to draw ratios of 22), approximately along the molecular chain axis direction, at various temperatures ranging between the room temperature and the melting point was examined by Wu et al (J.Poly. Sci., Phys. Ed., Vol. 18 (1980), p 751). Brittle failure was reported at all test temperatures with no significant plastic deformation but much improved mechanical properties.

The rolltrusion process is based on the following considerations
(a) preliminary investigation had shown that the rolltrusion process can be employed in the preparation of highly oriented polymers with well regulated morphologies in three directions which are mutually perpendicular;
(b) the technique is relatively simple, continuous and is capable of processing polymer continuously;
(c) the procedure has been attempted with a wide spectrum of polymers, e.g., polyolefins, polyamides polyolefin copolymers, polyetherketones, polyvinylidene polymers and copolymers, polycarbonates, and polyesters; and
(d) moreover, the technique produces triaxial orientation, i.e., the crystallographic directions of the crystallites are usually well aligned triaxially with respect to the deformation directions (during extension and compression) throughout the sample, as compared to uniaxial and biaxial orientation obtained by other deformation processes. There is, however, some dependence of orientation on the molecular weight of the sample, although this is not a limitation for processability by this method.

OBJECTS OF THE INVENTION

An object of the invention is to provide a membrane or thin-like film comprising a polymer material with a triaxial orientation morphology produced by a rolltrusion process and having a periodicity consisting essentially of crystallites and amorphous materials with no spherulitic textures remaining after said rolltrusion process.

A further object of the invention is to provide a membrane or thin film comprising a polymer material with a three dimensional morphology having a periodic distribution of crystalline and intercrystalline tie molecular regions.

A further object of the invention is to provide a morphology of material made from a crystalline or potentially crystallizable polymer by the rolltrusion process in the form of a relatively thin film which functions as a membrane for the concentration, separation, or removal of gases and small molecules.

A still further object of the invention is to provide a porous or a non-porous homogeneous polymer membrane produced by the rolltrusion process and used in gas separation technology.

A still further object of the invention is to provide a relatively thin membrane which is both strong and rugged for use in chemical technology.

These and other objects of the invention will be more fully understood from the following description of the invention on reference to the illustrations appended hereto.

SUMMARY OF THE INVENTION

Commercial grade .polyolefins, and other polymers, are triaxially oriented in a single operation, namely, rolltrusion, to produce highly transparent semicrystalline triaxially-oriented specimens. The result of this process signifies a triaxial crystallite orientation within an oriented amorphous load bearing matrix, unlike biaxial orientation (two-dimension stretching) with which it is often confused, and which biaxial orientation is a result of the processes of the art. The process may be performed stepwise, or continuously, and the sample size produced is only limited by the practical dimensions of the roller and wind-up arrangement used to receive the processed workpiece. One schematic of the rolltrusion process is shown in FIG. 2.

The Young's moduli of HDPE and iPP double oriented specimens prepared by this procedure were enhanced $\times 25$ and $\times 15$ times, respectively, over that for the original polymers received from the manufacturer. Tensile strength of these products were significantly improved at least $\times 8$ (HDPE) and $\times 30$ (iPP) over the original polymer. Draw ratios of $\times 30$ for HDPE and $\times 60$ for iPP have been obtained. Moreover, extensive morphological characterization conducted using WAXS, SAXS, SEM, birefringence, etc., demonstrated that the polymer crystallites in the rolltruded HDPE and iPP sheets were oriented with the molecular c-axis along the draw direction, while a low index plane was parallel to the roll surface of the workpiece for high draw ratios.

This "two phase" morphology with triaxial crystal symmetry shows many potential applications industrially. From DSC traces, it was established that the melting temperature, the sharpness of the melting peak, and the degree of crystallinity all increased with increasing draw ratio. GPC measurements (made before and after processing) confirmed that the commercial plastics did not undergo thermomechanical degradation during processing. This conformation can also be made or determined by X-ray analysis. There are considerable advantages of the rolltrusion technique compared with other currently used Solid state deformation techniques.

The conditioned plastic workpiece is deformed in its solid state by passage through the rollers (either fixed or rotating) at a nominal deformation of at least 2:1, by means of drawing the workpiece from the downstream end of the rollers. In the rolltrusion process, the workpiece is subjected to considerable compression and take-off tension simultaneously depending upon the dimensions of the workpiece and the processing temperature (between greater than Tg and less than Tm) among other factors. It is simultaneously compressed and drawn in a single pass under processing conditions (draw temperature, speed and ratio), to produce triaxially oriented polymer, of good quality and improved mechanical properties, such as tensile strength, tensile modulus, enhanced creep resistance, and based on the triaxial orientation induced by the disclosed rolltrusion process. The wear resistance and other practical aspects of plastic material properties have been measured and thus shown to be improved by the present invention. This technique of process control distinguishes the rolltrusion technique from all prior techniques.

The material produced has a triaxially oriented, two-phase morphology. This was characterized by conventional molecular orientational analytical methods for assessing the effect of processing condition on mechanical properties. Good quality processed polymers with greatly enhanced properties were obtained and characterized.

The procedure has now been applied to many plastics producing materials all of which demonstrate enhanced moduli and tensile strengths, and higher toughness, triaxial orientation, crystallinity, enthalpy, crystallite size, and so on. Correlations between properties and macroprocessing conditions have been established and are optimized through process modeling protocols presented below.

The polymer workpiece may be preconditioned to a temperature below its melting point, but above its glass transition temperature, to insure a high enough draw ratio that will affect triaxial orientation. Preconditioning is conducted in its solid state to a range of 0° to 350° C., so that the deformation may be carried out at least 20° C. below the thermodynamic melting point. For example, with polyolefin plastics, this lies in the practical range between 0° and 180° C. For polyethylene specifically, the draw temperature used was in the range from 20° to 125° C., permitting a maximum draw ratio ranging from 5 to 30. Amorphous polymers are processed less than 20° C. above their respective glass transition temperatures.

The draw speed was varied tenfold, ranging from 2.6 to 30 mm. per minute, but draw speed did not appreciably effect the draw ratio, which was found to be largely independent of draw speed in the ranges studied herein. With preheating, draw speeds up to 10 meters per minute are practical. By preheating the workpiece before the inlet to rollers, considerably higher speeds are obtainable.

It is practical to use draw speeds greater than several meters $\min^{-1}$; indeed, speeds of up to 10 meters $\min^{-1}$, can be usefully employed preferably in the range of 1 cm to one meter/min.

For isotactic polypropylene, the draw temperature is in the range of 50 to 165° C., permitting a draw ratio ranging from 12.5 at 140° to a draw ratio of 60 at rollers temperature of 158° C. Again, draw ratio was essentially independent of the draw speed, which was in the range 2.6 to 26 mm. per minute. Generally, useful draw ratios range between 5 and 60. The maximum draw ratio usable for a polymeric workpiece is effected by increasing the preconditioning and roller temperatures up to a level clearly below the observed melting point of the workpiece conveniently at least 20° C. below the melting point, or less than 20° above the glass transition of the polymer if it is amorphous. Draw speeds of up to 100 mm. per minute are employable with heated rotating rollers.

Compression and tension of the material are accomplished in one step in the rolltrusion process. As for the degree of compressive passage between the rollers, the nominal deformation ratio of the fed billet should be at least 2 to 1. The draw tension at the exit side of the rollers (largely achieved by increasing the draw speed) should be sufficient to effect a draw ratio of at least 6.5 to 1, ranging as high as 60 to 1 and above with the polypropylene material, wherein the optimum mechanical properties are gained. This is evidenced by the tensile modulus, tensile strength elongation-at-break and birefringence data presented in the tables. For HDPE a draw ratio of about 22 was used; and for iPP, a draw ratio of about 35 gave the best balance of physical properties for the thusly triaxially oriented workpiece.

The above several paragraphs concentrate on the rolltrusion process. The invention is particularly concerned with the morphology of the workpiece produced by the rolltrusion process, which workpiece finds particular application as a membrane for the concentration, separation or removal of gases and/or small molecules or particles. A more recent study, more pertinent to the invention used isotactic polypropylene (iPP); polyvinylidene fluoride (PVDF) or $PVF_2$; and propylene/ethylene block copolymer. Long billets cut from molded or extruded sheets were rolltruded according to established procedures. Draw speeds used were between 0.28 to 6.05 cm/min, in the absence of a preheater. Mechanical properties were found to be independent of draw speed within this range, on the other hand, it was found that draw temperature greatly influenced sample properties as well as morphology. Draw temperatures employed in this study will be discussed further hereinafter.

BRIEF DESCRIPTION OF THE DRAWING

The invention will now be more particularly described, by way of example, with reference to the accompanying drawings, in which

FIGS. 15–17 are plots showing the mechanical properties of rolltruded iPP specimens as a function of draw ratio;

FIGS. 26a, 26b, 26c, 26d, 26e, 26f, 26g, 26h, and 26i show X-ray diffraction patterns for polypropylene with FIGS. 26a, 26b, and 26c representing rolled polypropylene in the x, y, and z directions, respectively; FIGS. 26d, 26e, and 26f representing biaxially oriented polypropylene in the x, y, and z directions, respectively; and FIGS. 26g, 26h, and 26i representing rolltruded polypropylene in the x, y, and z directions, respectively;

DETAILED DESCRIPTION OF THE INVENTION

Figure 2:
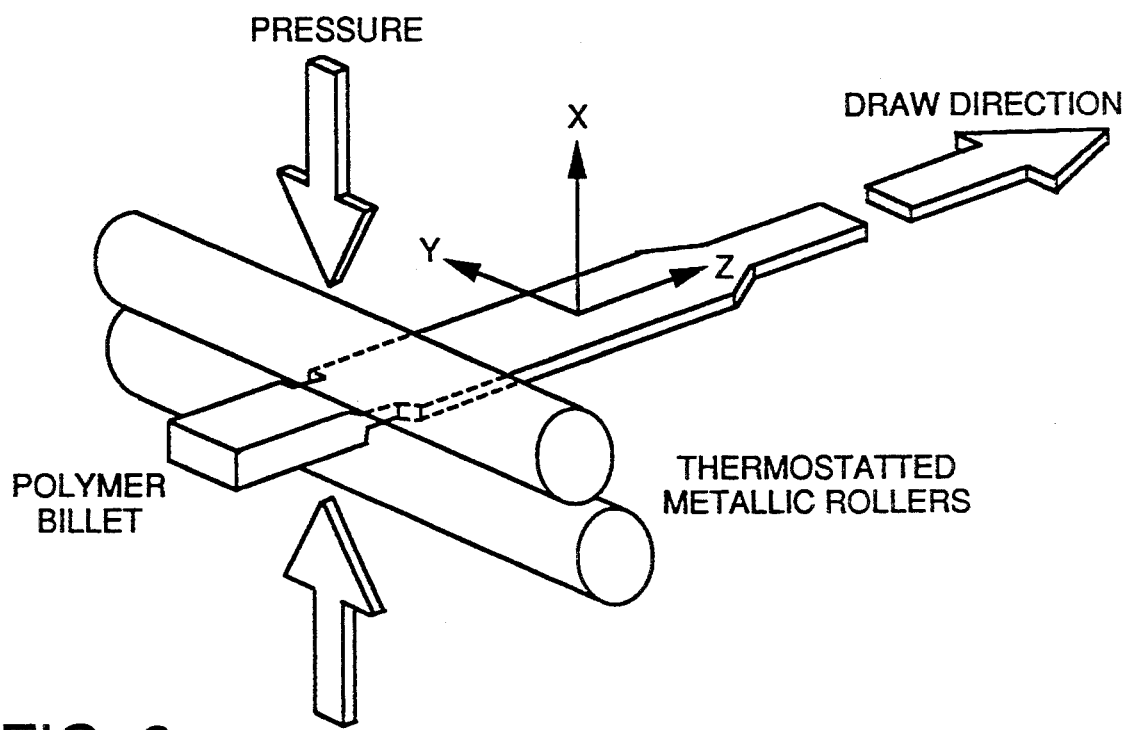
FIG. 2 is a schematic of a rolltrusion apparatus for triaxial orientation of polymer billets.

FIG. 2 illustrates the rolltrusion design which basically consists of a pair of thermostatted rollers (static or rotating) and a wind-up device to tension and draw the polymer specimen. The specimen or the workpiece is compressed simultaneously as it is passed through the rollers. The specimen may also be preheated using an external device depending on the type and size of the polymer workpiece. The take-off tension and compressive forces applied simultaneously to the workpiece in the nip of the rollers are similarly determined by the workpiece and its mechanical/physical properties. Whether the rollers are fixed or rotating, the compressive force in the roller gap, coupled with the tensile (drawing) force, induces high-deformation, so that a highly triaxially oriented, rolltruded specimen is produced under steady state processing conditions.

One advantage of the rolltrusion procedure over all prior methods lies in large specimen size (widths and lengths), which can be produced continuously when required. In these circumstances not only do the polymer crystallites and amorphous tie molecules between the crystallites undergo a very high degree of preferential alignment along the direction of application of tensile and compressive forces, but a crystalline plane of the crystallites becomes oriented parallel with its molecular axis along the rolling plane, and the other two planes of the crystallites are crystallographically disposed with respect to the uniplanar rolling plane. This morphology is triaxial symmetry (single crystal-like). The anisotropy of various physical properties such as thermal resistance, electrical conductance, etc., in three axial directions can thus be controlled by the processing constraints applied to the workpiece. The rolltrusion process has now opened up a new field of technology and applications for high-modulus commercial materials of moderate to high molecular weights (as in UHMWPE $\sim 5 \times 10^6$ daltons).

The rolltrusion process provides a procedure for the solid phase deformation of a workpiece of an orientable thermoplastic polymer, which process comprises: preconditioning the workpiece in its solid state at a temperature in the range between Tm and Tg, providing the conditioned workpiece, frequently of the essentially unoriented polymer at the entry side of an opposing pair of rollers spaced apart a distant substantially less than the thickness of the workpiece; applying to the workpiece from the exit side of the rollers a draw tension insufficient to cause tensile failure of the workpiece, but sufficient to effect a draw ratio of at least 2 to 1, and upwards.

The term "workpiece" as used herein includes bars, strips, rods, multifilaments, films, and other cross-sections of amorphous or semicrystalline solid stock. The term includes both billets and other forms of stock of greater length; indeed, continuous stock, which may be formed as the process is performed, may be utilized. Examples include a polymer sheathed continuous core such as a metal wire, or continuous polymer rod, film or filaments. As stated hereinbefore, the invention is particularly concerned with a membrane or thin film produced as a result of using a polymer as a workpiece.

The orientable thermoplastic polymer is desirably a semicrystalline, or potentially crystallizable amorphous polymer, especially one which exhibits sufficient strain hardening and strain rate dependence of the flow stress to stabilize the neck, where the workpiece experiences a triaxially induced stress field formed under the desired drawing conditions. Preferred such polymers are suitably of a homo- or copolymer of polyolefins with at least one comonomer; a vinylidene fluoride polymer, a polyacetate, a polyamide, a polyester or (poly)esteretherketone (PEEK). Both linear and somewhat branched and/or amorphous polymers may be processed.

In the present invention, the rolltrusion process is used to produce a triaxially oriented polymer membrane. Not only are the crystallites highly regulated in three directions (i.e., crystallographically) within the workpiece, but intercrystallite tie molecules that connect them have varying degrees of tautness determined by the processing conditions. This morphological three-dimensional distribution of crystallites and interconnecting tie molecules arises because of the stress field that the workpiece experiences when tensioned and compressed simultaneously in the nip region of the deformation rollers.

Rolltruded specimens have morphological regularity, which is an important and distinct feature that qualifies them as quality membranes where their "porosity" may be regulated through solid deformation processing, without the use of solvents, some of which are noxious and even incapable of dissolving certain polymers. The porous (regions) dimensions or spacing between the crystallites of the polymeric membranes may be controlled by rolltrusion, and material selection and processing conditions.

Figure 14:
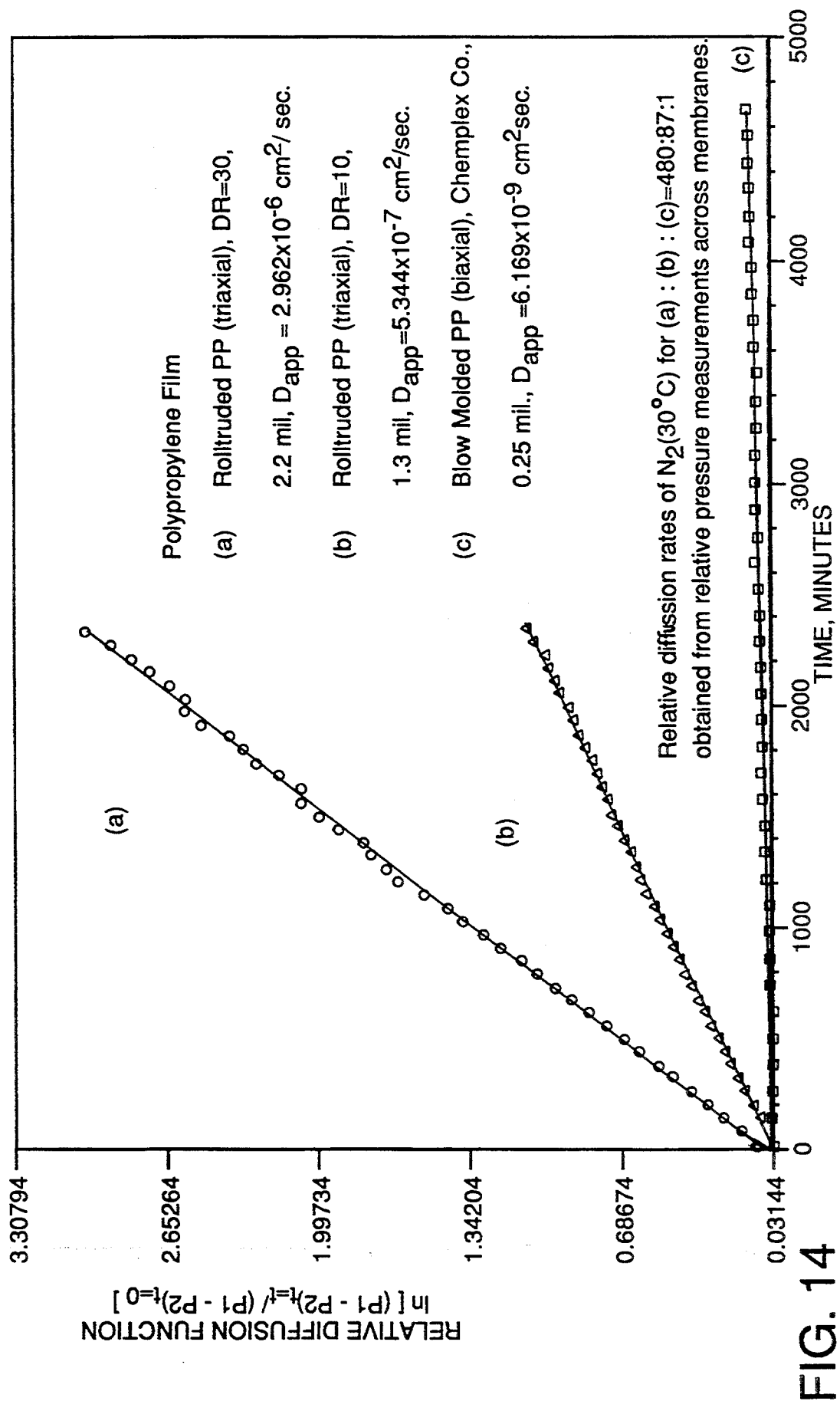
FIG. 14 is a plot of the relative diffusion rates between biaxial and triaxial polypropylene.

A case in point is FIG. 14 which demonstrates the superiority of rolltruded membranes over biaxial ones that are much thinner but still less effective for the same polymer/gas or/small molecule systems. This FIG. 14 provides a comparison of a relative diffusion rates between commercial biaxially oriented polypropylene and the triaxial membranes of the invention, which have "controlled" diffusion pathways. The difference is quite obvious from this FIG. 14. The crystallites are the diffusion blockers, and the intercrystalline regions comprise the permeable regions of the polymer which are aligned because of the three-dimensional morphology, therefore providing a relatively non-torturous pathway for diffusion and enhanced permeability. Also, since the drawing part of the rolltrusion process increases the tautness of the amorphous regions, the permselectivity of the polymer can be expected to increase, which is an important development in gas separation technology.

For use of the rolltruded membrane in gas separation technology, selectivity is provided by chemically matching or compatabilizing the gaseous species with the polymer membrane. Consequently, the potential of the type of membrane produced for the separation processes is virtually unlimited, nor is it limited to a few homopolymers, more about which is discussed hereinafter.

PREFERRED EMBODIMENTS OF THE INVENTION

Data Pertaining Generally to the Rolltrusion Process

Material

The commercial-grade high-density polyethylene (Boltaron 5200) and isotactic polypropylene (Boltaron 5500/5501) evaluated were supplied by the GTR Plastics Company, Ohio, U.S.A. (The physical and mechanical properties of the original HDPE and iPP polymers are given in Table 3.)

Sample Preparation

For demonstrating the processing described here the original HDPE and iPP stock sheets were cut into long billets of at least 48 inches (ranging in cross-sections from $0.5'' \times 0.5''$ to $0.15'' \times 0.15''$ approximately). Billets of required dimensions were cut from the original stock sheets. The surfaces of the cut billets were subsequently milled with a carbide steel fly wheel or bandsaw to yield desired sample thickness.

Triaxially oriented polymer samples were prepared by means of the rolltrusion process. The front end of the polymer sheet or billet was inserted between the processing rollers and then connected to the variable speed wind-up assembly supplying a constant load. The workpiece may also be readily prenecked under tension at elevated temperature(s) and then placed between the rollers for rolltrusion. Initially startup was manually slow until the desired roll gap (specimen thickness) was established. Thereafter, the draw speed was adjusted to produce a stable uniformly wide and thin product after passage through the rollers at a steady rate.

Preparation of Rolltruded Polymers

The process of triaxial orientation may be carried out in one or two stages.

One of the methods of defining draw ratio for the oriented polymers workpiece is determined as follows:
Draw Ratio = Original cross-sectional area of the billet Final cross-sectional area of the product Table 4 lists the processing conditions used in the preparation of triaxially oriented HDPE and iPP polymers, defined in Table 3. Triaxially oriented polymers with varying draw ratios can be obtained by the proper choice of draw temperature, draw speed and roller nip dimensions. The width of the processed or rolltruded specimen is comparable with the starting material width. The thickness is considerably reduced for high DR values. This feature distinguishes rolltrusion from all other state of the art techniques.

Analytical Techniques Used in Polymer Evaluation Morphology

A. Wide Angle X-ray Scattering (WAXS) The wide angle X-ray diffraction patterns were obtained using a Statton-type vacuum camera. The samples were exposed to Nickel filtered Cu $K_\alpha$ radiation for 4–5 hours at 35 KV and 20 mA. The sample to film distance was 47.35 mm, or the sample to film distance was varied as dictated by the processed workpiece. She diffraction patterns were obtained with X-rays parallel and perpendicular to the roll direction. The samples were scanned at a rate of 0.2°/min. using Cu $K_\alpha$ radiation of 40 KV and 25 mA. A 1° beam slit and graphite monochromator were used.

The average orientation of the crystallites (c-axis orientation) with respect to the roll direction was estimated using the Hermann's orientation function. The crystallite orientation factor was determined using the WAXD azimuthal scanning data obtained from (i) (200) and (020) reflections for HDPE and (ii) (040) and (110) reflections for iPP polymers respectively. The data was obtained with the X-rays parallel to the X direction, which is perpendicular to the directions of rolltrusion. Note that measurements were also made in the Y and Z directions too in order to establish the triaxial sample orientation of the extrudate. (See FIG. 3)

B. Small Angle X-ray Scattering (SAXS) The changes in long period spacing or average crystallite size were determined using the small angle X-ray scattering technique (SAXS). The SAXS measurements were carried out using a Rigaku-Denki camera and a rotating anode generator. Nickel filtered Cu $K_\alpha$ radiation was used through the X-ray work. The samples were exposed for 4–5 hours at 40 KV and 50 mA. The sample to film distance was 480 mm. The samples were photographed with the X-ray beam parallel to the X, Y and Z directions, respectively. The long period spacing was calculated.

Two dimensional SAXS measurements were also made at the Oakridge National Center for Small Angle Scattering, Oakridge, Tenn. Sample to detector distances of approximately 1 to 5 meters were employed for the x-ray beam parallel to the x, y, and z directions of the rolltruded workpiece (see FIGS. 27 and 28) wherein discrete scattering peaks are recorded and processed by a computer. Ni filtered $C_uK_\alpha$ radiation at 40 KV and 100 mA for periods of less than 2 hours were used.

C. Differential Scanning Calorimetry (DSC) A Perkin-Elmer differential Scanning Calorimeter (DSC-2), with scanning auto zero and computer integration accessories, was used to determine the melting characteristics and the heat of fusion of the original and deformed polymers. The calorimeter was initially calibrated for temperature measurements using a standard Indium sample (Melting pt. 156.0° C. and $\Delta H$ 6.8 cal/gm), and other standards. All the measurements were made at a full scale sensitivity of 10 m cal/sec. and at a scan rate of 10°/min. The melting point was directly determined from the DSC curve by reading the temperature corresponding to the peak maxima of the endothermic traces. The heat of fusion was obtained by integrating the area under the melting peak of the DSC curve. Then the degree of crystallinity of the sample was computed by conventional techniques using the heat of fusion data of 100% crystalline samples. Crystallinity was also determined from density measurements.

D. Birefringence

Birefringence measurements were carried out using a Leitz-Ortholux microscope equipped with a green line (g=546 nm) interference filter, a rotary sample stage and Berek compensator. Lipshaw Model 45 Rotary Microtome was used to microtome thin slices of the polymer from the doubly oriented strips. Measurements were made with the incident light parallel to the Y and Z directions.

The birefringence data and WAXS measurements were used to determine the amorphous orientation factor, fa. The intrinsic birefringences of single crystals of HDPE and iPP samples were taken to be 0.060 and 0.030, respectively, while the intrinsic birefringence of the amorphous phases of these polyolefins was assumed to be 0.20 for HDPE and 0.061 for iPP, respectively.

E. Electron Microscope

Fracture surface morphology of doubly oriented polyethylene and polypropylene polymers along various directions were examined using a JOEL JSM-35 Scanning electron microscope. Morphological characterization of ion-etched polymeric surfaces were carried out. Ion-etching was carried out in a JOEL-JFC 1100 ion sputtering instrument at 500 volts (AC) and 3 mA in air at a chamber pressure of 26.7 Pa for 30 minutes (max). All samples for scanning electron microscopy were coated with either Au or Au/Pd. Electron diffraction studies were made on thin layers of polymer detached from the surfaces of the ion-etched polymers using gelatin as the adhesive. Orientation, determined in the x, y and z directions of the samples were consistent with x-ray studies mentioned in section A, showing that the rolltrusion process induced triaxial orientation. Replication of the surfaces for the transmission electron microscopy studies were made using carbon backing.

F. Gel Permeation Chromatography

The molecular weight and the molecular weight distribution data on the original and the highest drawn polyethylene and polypropylene samples were provided by Chisso Corporation, Tokyo, Japan.

G. Mechanical Properties

Tensile properties of the triaxially oriented polyethylene and polypropylene specimens were determined using a table model Instron Tensile Testing Equipment (Model 4042) equipped with a strip chart recorder and a microprocessor. The tensile testing of triaxially oriented HDPE and iPP samples were conducted under the following conditions; test temperature—room temperature (~23°C.); gage length—1.0 and 2.0 in. for the HDPE and iPP samples, respectively; and cross-head speed—0.2 in/min., to comply with ASTM Standard procedures.

Where it is intended to utilize the rolltrusion process to produce a product with enhanced tensile modulus, tensile strength, percent elongations, and toughness, then a workpiece of a homo- or copolymer of ethylene should desirably comprise a polymer having a weight average molecular weight (Mw) less than 5,000,000, suitably from 50,000 to 500,000, preferably from 70,000 to 400,000; one of a linear homo- or copolymer of propylene should desirably comprise a polymer having a Mw from 150,000 to 800,000, preferably from 250,000 to 500,000.

However, the rolltrusion process may also be performed, to provide a more advantageous forming procedure for a workpiece of orientable polymer; or from an amorphous non-crystallizable polymer; or from an amorphous, but crystallizable polymer, orientable or semicrystalline, ultra high molecular weight polymer (for example, a linear homopolymer of polyethylene terephthalate having a Mw of 30,000 to 50,000). It may likewise be utilized, if polymers are prepared in relatively low to zero crystallinity, through side chain branching or quenching, or solution precipitation.

The draw ratio should be sufficient to draw the workpiece through the rollers but insufficient to cause tensile failure of the article; that is, the draw ratio should be such that the true stress at any point in the workpiece during processing does not exceed its fracture stress at that point. A suitable maximum value of draw ratio has been determined based on the data of FIG. 4. Sample molecular weight, and molecular weight distribution affect the draw ratio that is obtainable.

For a particular polymer, a steady state process is established for a given set of temperature, draw speed and deformation conditions (draw ratio). These parameters vary implicitly, but it has been found possible, for a particular polymer, to set the roller temperature (which will be only a nominal temperature for the polymer, since the process is not an isothermal one) and the workpiece shape and dimensions, and to vary the draw speed to obtain the desired product. The width of the workpiece is essentially invariantly within ±10% of the original billet, etc.; only the thickness × direction is drastically reduced.

For homo- and copolymers of ethylene and/or blends of polyethylene, the roller temperature may be desirably set at a temperature just above the lowest glass temperature (of the system) and preferably not above melting temperature of the highest melting component of the system. More particularly, for such polymers of $M_w$ from 50,000 to 150,000, the roller temperature is preferably from 70° C. to 130° C. For linear homo- and copolymers of polypropylene, of weight average molecular weight from 150,000 to 800,000, the roller temperature may be set from 20°–170° C., preferably 90°–160° C. A roller temperature of 80°–170° C., preferably 110°–160° C., is suitable for homo- or copolymers of ethylene and propylene, and of 80° C. to 180° C. is suitable for vinylidene fluoride polymers.

The advantages of the process of this invention over die and hydraulic drawing and rolling will become manifest to those skilled in the art. First, it obviates the necessity of a batch process and dispenses with use of expensive and potentially hazardous hydraulic pressure equipment, and multiplex operations commonly employed in state of the art methods. It is also found that, and in contrast to hydrostatic extrusion, the throughput increases with increasing deformation ratio, and triaxial orientation is preserved in rolltruded specimens. The rolltrusion process also obviates the need for solvents (often noxious in nature) for membrane formation.

Draw Temperature

The proper draw temperature was found as essential for the attainment of high draw ratios. Solid state deformation of crystalline polymers can be carried out at any temperatures ranging between the glass transition temperature and just below the melting point of the polymer. Usually, the deformation of crystalline polymers was accomplished at temperatures 5° to 50° C. below their melting point.

In Tables 5 and 6 are presented data on the variation in maximum draw ratios with the draw temperature for high density polyethylene and isotactic polypropylene, respectively. From the data, it is evident that the maximum draw ratio increases with increasing roller temperatures. In the case of iPP, it was possible to obtain a draw ratio of 35.0 at the roller temperature of 158° C., compared to a draw ratio of 5.0 at 110° C. Similarly, for the HDPE polymer, the draw ratio increased from 6.5 to 22.0 on raising the draw temperature from 100° C. to 120° C. Higher values have been attained. Attempts to draw the billets beyond determined maximum draw ratios often led to the specimen failure in the indicated processing ranges for the specimens of this example.

The data indicate that higher temperatures lead to lower draw stress for a given draw ratio. For HDPE polymer, draw stresses of 4100 psi and 2000 psi were required to obtain a draw ratio of 10.0 at 110° C. and 120° C., respectively. For iPP, draw stresses of 7200 psi and 3500 psi were required to obtain a draw ratio of 15.0, at 150° C. and 158° C., respectively. It is to be emphasized that these conditions depend on the size of the sample being processed.

Draw Speed

The draw speed corresponds to the constant rate of the wind-up device used in processing.

Plots of data on draw ratio as a function of applied draw speeds for the HDPE and iPP specimens of Table 3 indicate that the draw ratio is independent of the draw speed in the range of this disclosure. These results are in agreement with other observations made on other polymers at comparable draw speeds.

Optical Transparency

Commercial HDPE, iPP, and other polymers are opaque to visible light. This is due to scattering of light by the spherulitic structures and voids in . those polymers. In contrast, the rolltruded polyethylene and polypropylene produced were highly transparent, apparently because the spherulites are destroyed and voids were eliminated during processing, and they are converted into well-ordered crystalline and amorphous domains with dimensions less than the wavelength of visible light as verified by small angle X-ray scattering measurements.

Interpretation of Data Adduced on Morphology

Wide Angle x-ray Diffraction (WAXD)

The wide angle measurements were made primarily (i) to follow any polymorphic transitions in HDPE and iPP, for example, upon triaxial orientation, (ii) to confirm the triaxial orientation texture in the processed polymers, and (iii) to determine the average crystallite orientation in the roll and transverse X and Y directions.

The diffraction patterns of the original HDPE and iPP polymers were recorded using a Statton-type camera. Both patterns consist of concentric rings indicating no preferred orientation in any direction. The HDPE pattern was indexed with reference to an orthorhombic unit cell. The iPP pattern was indexed as the monoclinic structure.

Small Angle X-ray Scattering (SAXS)

Small angle X-ray scattering refers to diffraction of X-rays at Bragg angles less than 2-3 degrees. The SAXS measurements were carried out to investigate the changes in long period spacing upon triaxial orientation. The long period spacing is a measure of the average crystalline size in crystalline polymers, since it includes the dimensions of both the crystalline and the amorphous regions, the former being the greater.

Table 7 lists the long period spacing values obtained from some of the triaxially oriented HDPE and iPP samples processed at various conditions and of draw ratios up to X10. From the Table it is evident that average crystallite size is highly dependent on the draw ratio and draw temperature. The long period spacing was found to increase with increasing draw ratio and draw temperature. The original HDPE and iPP samples showed long period spacing values of 170 and 180 Å respectively. For doubly oriented iPP samples, the long period spacing increased from 180 Å to 247 Å, as the draw ratio increased from 1 to 10. Similarly, for HDPE samples the long period spacing values increased to 269 Å (DR=10) upon double orientation. In fact, at very high draw ratios such as ×60 for polypropylene, the discrete SAXS reflection sometimes disappears or can only be observed with difficulty.

The crystallite size is very dependent upon the draw temperature, whereas the size of the intercrystallite regions relates to the deformation (draw and compression) conditions as in the following equation:

$$L_{sample} = l_c + l_a$$

which is discussed more fully hereinafter.

Differential Scanning Calorimetry

The DSC technique has been employed extensively in the thermal analysis of amorphous and crystalline polymers. In the present specification, the technique was used to determine the changes in: (i) the melting characteristics upon double orientation, (ii) the degree of crystallinity based on heat of fusion values, and (iii) distribution of crystallite sizes from the nature of melting profiles.

The melting profiles of the original and the rolltruded HDPE samples at draw ratio of 22, and the rolltruded iPP specimens (DR=20 and 35), were plotted. HDPE samples usually showed single melting peak, while iPP specimens exhibited multiple melting peaks. It was also observed that the triaxially oriented HDPE samples exhibited relatively narrow melting profiles as compared to the original commercial polymer.

Table 8 presents the melting point data on rolltruded oriented HDPE and iPP samples (K°). The original HDPE and iPP samples had a melting point of 133.5° and 161.0° C., respectively. For triaxially oriented HDPE samples, a plot of melting temperatures, as a function of draw ratios was also made. It showed the peak melting temperature increased to 138.5° C. upon increasing the draw ratio to 22. Similarly, the iPP specimens, the low melting peak increased from 161° C. to 165.5° C. (DR=35) upon triaxial orientation. The high melting peak in triaxially oriented iPP samples occurred around 172° C.

Birefringence

Birefringence, $\Delta n$ is defined as the difference in refractive index parallel n , and perpendicular n to the draw direction for a uniaxially oriented polymer.

The refractive index in any given direction is related to the polarization properties of the macromolecule in that direction. The birefringence values in all three principal directions are needed to completely characterize The state of molecular orientation in a crystalline polymer. The characterization can be carried out in all three directions, only if one has either a single crystal or a triaxially oriented polymer, which possess a pseudo single crystal-like morphology.

The birefringence values along the YZ and XZ directions (FIG. 3) of the triaxially oriented HDPE and iPP polymer samples were determined by standard procedures.

Gel Permeation Chromatography

Gel permeation chromatography (GPC) measurements were made mainly to monitor the changes in molecular weight and molecular weight distribution in commercial HDPE and iPP samples before and after rolltrusion. The GPC data and the GPC curves obtained from the original and the triaxially oriented HDPE samples (DR 20) were studied. A comparison of the curves shows no significant changes in the molecular weight distribution upon rolltruded oriented iPP specimens (DR=35) were studied. The GPC traces for the original and the triaxially oriented iPP specimens (DR=35) were studied. Again, no change in the molecular weight distribution in iPP upon orientation was noted.

Table 9 lists the number average molecular weight ($M_n$), the weight average molecular weight ($M_w$), and the polydispersity values ($M_w/M_n$) for the original, and for the triaxially oriented, HDPE and iPP specimens. The commercial HDPE polymer had $M_n$ and $M_w$ values of 13,900 and 91,900 respectively, while the triaxially oriented HDPE (DR 20) showed $M_n$ and $M_w$ values of 11,300 and 91,200, respectively. Similarly for iPP, within the experimental error, no applicable change in number average and weight average molecular weight were observed (Table 13). The results indicate that both the number average ($M_n$) and the weight average molecular weight ($M_w$) for the HDPE and iPP polymers do not change significantly upon processing. Therefore, the commercial HDPE and iPP samples did not undergo any thermo-mechanical degradation upon triaxial orientation. In effect, the rolltrusion process left the polymers unaffected with regard to molecular weight.

Processing Conditions

Figure 4:
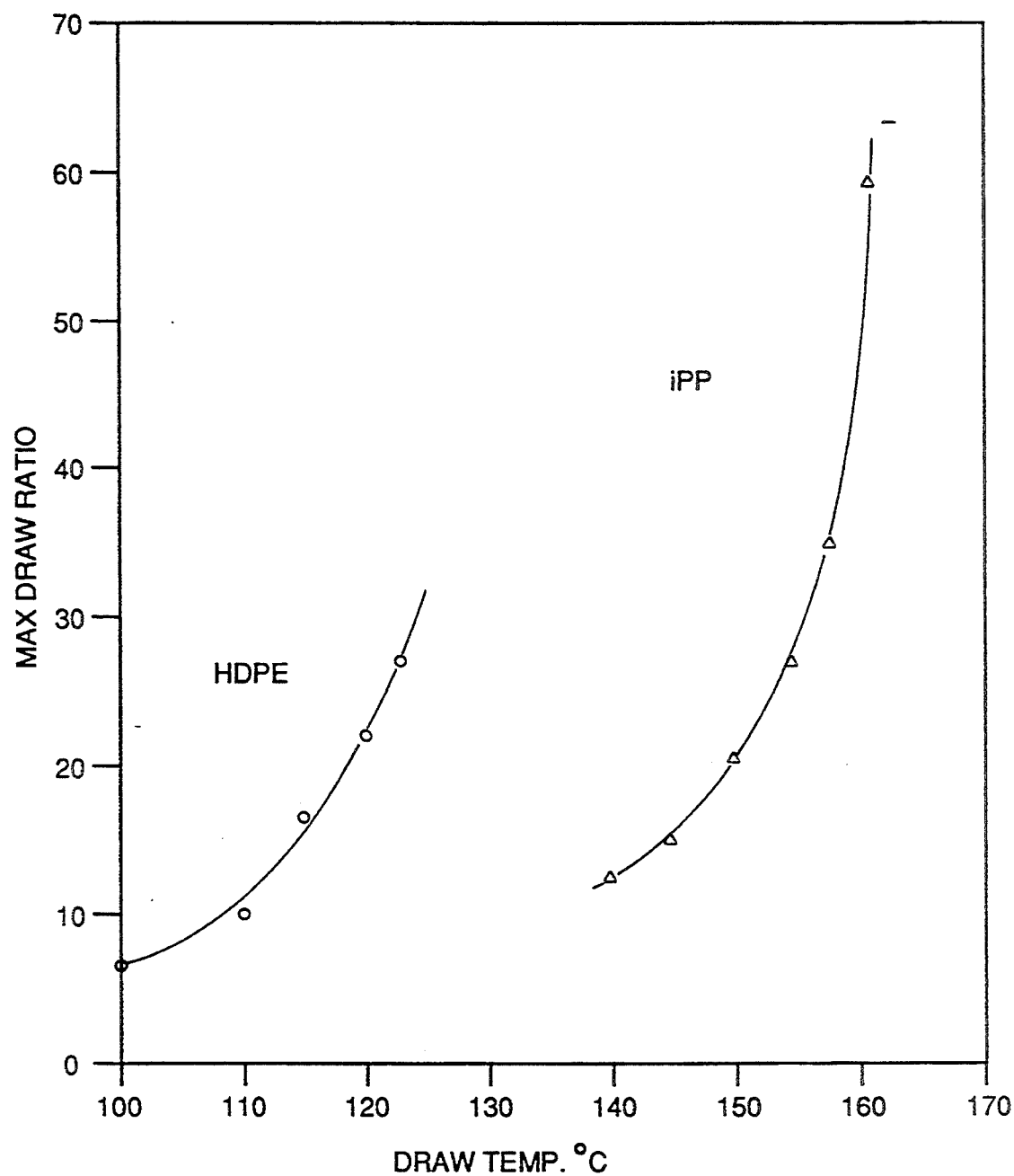
FIG. 4 presents the maximum draw ratios obtained as a function of draw temperature for HDPE and iPP samples of specified molecular characteristics.

Processing temperatures of 100, 100, 115, 120 and 123° C. for HDPE samples, and 140, 145, 150, 155, 158 and 160° C. for iPP samples were selected to illustrate the effects of processing temperature on properties. These conditions ensured that molecular mobility, and molecular alignment and extension, occurred in the workpiece well beyond the natural draw ratio attainable in either of these polyolefins. For each draw temperature, presumably a maximum draw, $DR_{max}$, ratio should be reached for the specific workpiece in question. $DR_{max}$ is peculiar to the molecular characteristics or state of the workpiece being studied. The results of $DR_{max}$ as a function of draw temperature are shown in FIG. 4 for HDPE and iPP samples, respectively.

From these curves, it is evident that $DR_{max}$ increases with increasing roller temperatures for a fixed specimen cross-section. For iPP, a draw ratio of 60 for Tp=160° C. is to be compared with a $DR_{max}$ of 5 for Tp=110° C. These are not necessarily optimum working conditions, but only reflect conditions suitable for rolltruding the commercial polyolefins employed in this particular study. No evidence of surface melting of the workpiece was observed at the highest temperatures (123° C. for HDPE and 160° C. for iPP). Therefore, these two temperatures are not considered to be the upper limits for rolltrusion. Note too, that the temperature rise in the workpiece during processing is insignificant.

The maximum draw stress along the deformation path, determined by the ratio of drawing load to final cross sectional area of the specimen, was found to be dependent on both draw ratio and draw temperature. For example, the maximum draw stress employed for HDPE ranged from 720 to 6200 psi at 120° C. For iPP at 158° C., the draw stress ranged from 150 psi to 22,300 psi. At each temperature, the draw stress tended to rise almost exponentially at high draw ratios, prohibiting further deformation and causing product breakage at times. In the present example, draw speed was also varied from 2.6 mm/min to 26 mm/min. Neither draw ratio nor draw stress was significantly affected within this speed range.

The necked profiles of the polymer specimens were examined during and after drawing. The rolltrusion products had a smooth surface, uniform thickness and high transparency. It is also important to note that dimensional changes of the workpiece were minimal in the rolltruded polyolefins.

Mechanical Properties

The tensile properties of the specimens reported here were determined along the draw direction (FIG. 2). In the tensile test, the unoriented polymers showed a yield point, followed by formation and propagation of the neck region, while all of the rolltruded HDPE and iPP samples exhibited considerably less extendable behavior, especially for specimens processed at high DR values.

Figure 5:
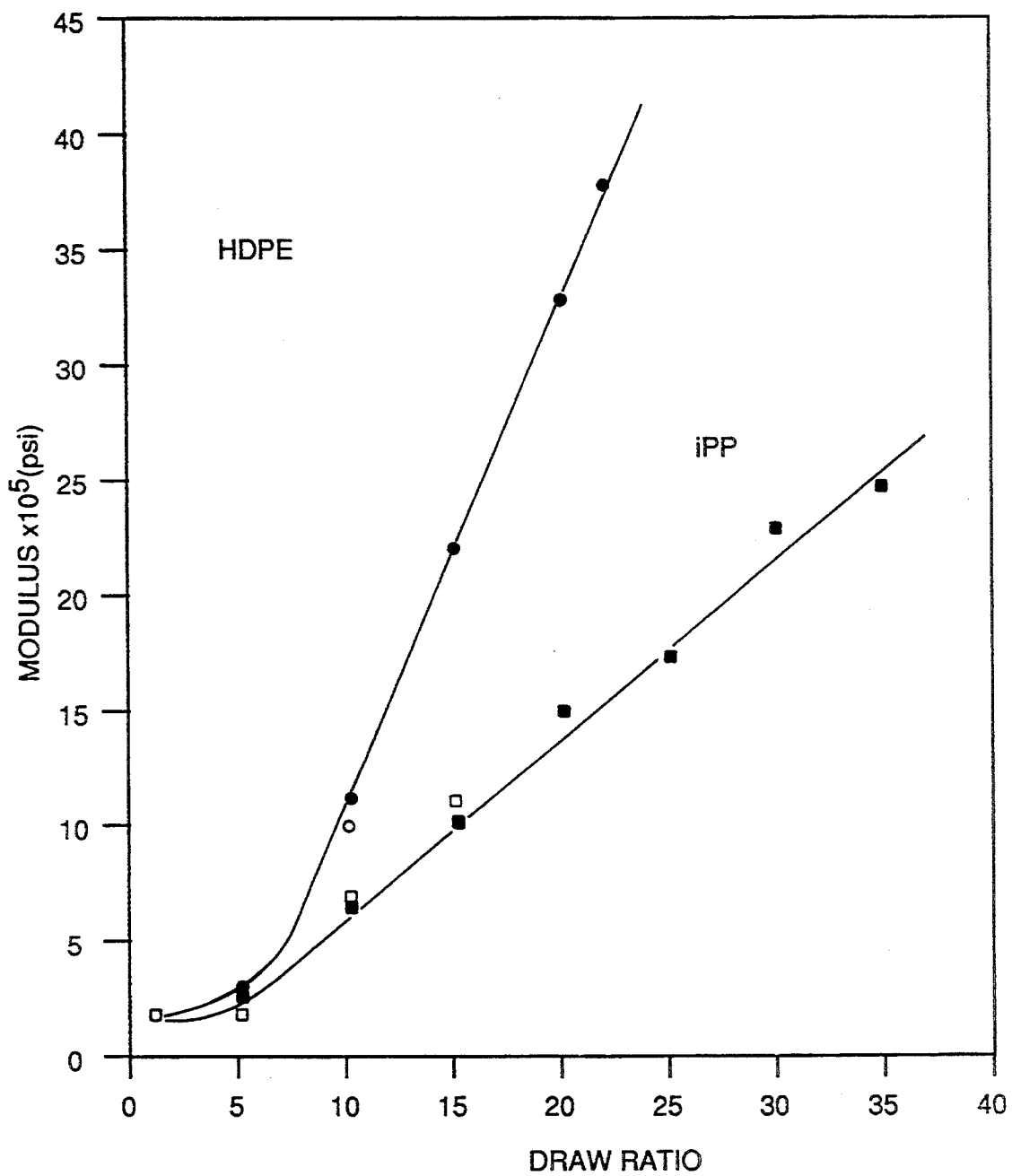
FIG. 5 presents the plots for Young's modulus for HDPE and iPP as a function of draw ratio.
Figure 6:
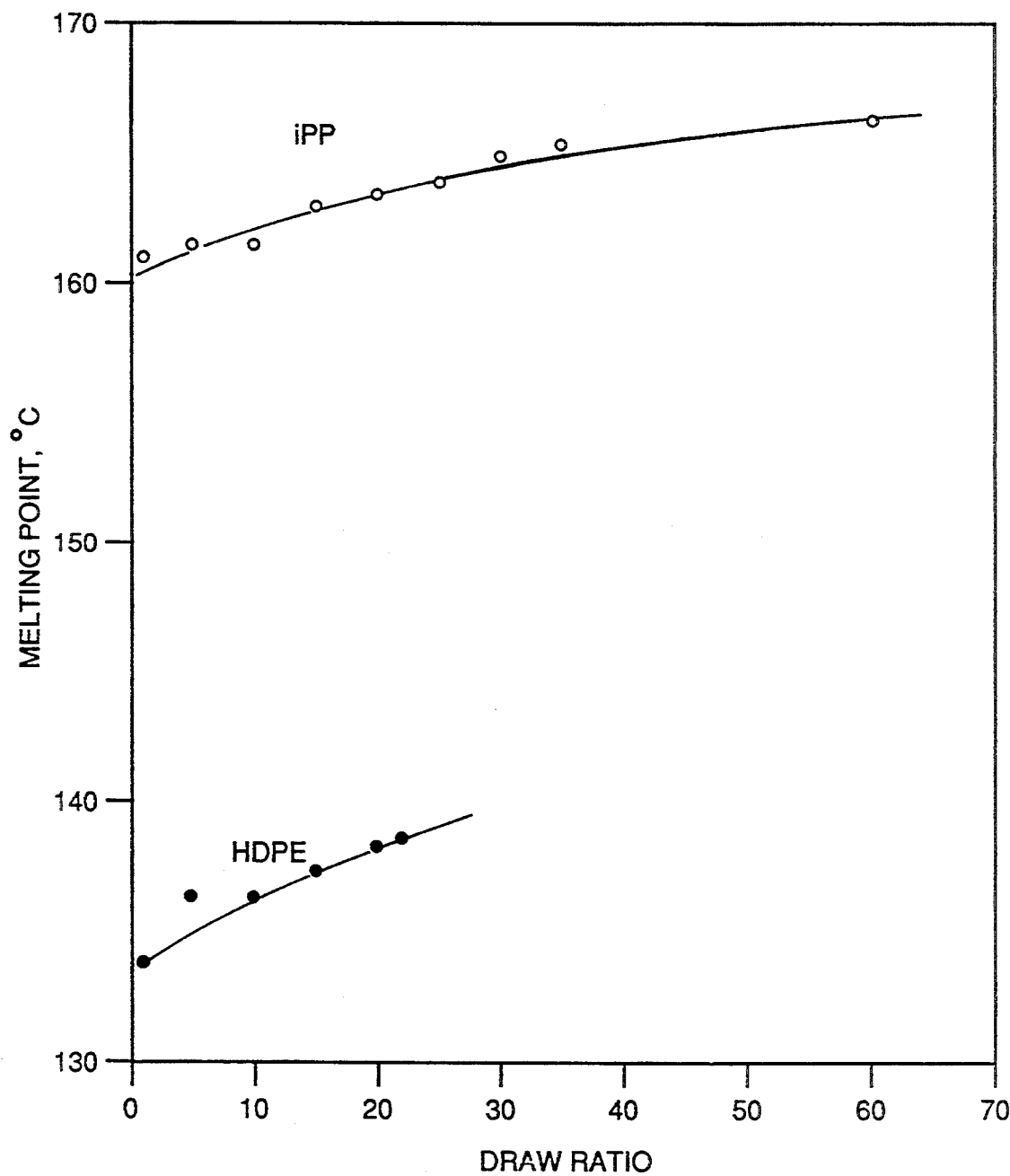
FIG. 6 is a plot of
(a) Melting point dependence of HDPE with increasing draw ratio, and
(b) Melting point of lower peak for iPP with draw ratio.

The Young's modulus, obtained for HDPE and iPP samples is plotted in FIG. 5 as a function of draw ratio. The Young's modulus of HDPE polymers was enhanced by more than 20 times, i.e., from $1.7 \times 10^5$ psi (1.2 GPa) for the original polymer, to $3.8 \times 10^6$ psi (26 GPa) for the highly triaxially oriented HDPE sample (in this instance a DR=22). Almost a linear increase in Young's modulus values was noted with increasing draw ratio. A significant increase in modulus was also observed for iPP samples. The Young's modulus of the original iPP sample was $1.8 \times 10^5$ psi (1.2 GPa) while a highly drawn iPP sample (DR-35) had a value of $2.5 \times 10^6$ psi (17.2 GPa). Young's modulus is found to be a unique function of draw ratio for the range of draw temperatures and draw speeds used here.

Tensile strengths follow a trend with draw ratio similar to Young's moduli. More importantly, tensile factor may be strongly correlated with amorphous orientation factor, fa (FIG. 11), which provides a more meaningful correlation parameter than does $f_c$, conventionally used. Elongation at break was considerably reduced at high draws ratio implying that the creep properties of these doubly oriented polyolefins were greatly enhanced through rolltrusion.

Wide Angle X-Ray Diffraction

HDPE and iPP are known to exist in several crystallographic forms. HDPE is predominantly orthorhombic and sometimes it occurs in the less stable monoclinic form. The iPP polymer is usually monoclinic form and it sometimes forms a hexagonal crystal structure. The data showed typical diffraction patterns of the unoriented original HDPE and iPP polymers indicating no preferred orientation in any direction. The HDPE pattern was indexed with reference to an orthorhombic unit cell, while the iPP patterns obtained from HDPE samples of various draw, ratios, DR=10, 15 and 22, recorded perpendicular to the YZ, XY, and XZ directions, respectively. The diffraction patterns were indexed with respect to orthorhombic and monoclinic forms of HDPE.

The data illustrated the diffraction patterns recorded in transmission for the original and a highly triaxial oriented HDPE sample with the X-ray beam perpendicular to the YZ, XY, and XZ directions. The intensity of the (110) reflection increases with increasing draw ratio. It is found that the intensity of the (200) reflection decreased remarkably with increasing draw ratio in YZ patterns but increased with draw ratio in XZ patterns.

These observations illustrate that during deformation, the crystallites in the HDPE samples of moderate molecular weight, rotate so that the (100) plane is aligned parallel to the rolling plane (i.e., YZ plane). This type of deformation has been reported in a few other investigations and can be explained as (110) twinning. A similar analysis for iPP monoclinic structure obtains. WAXD's show typical patterns recorded for a triaxially oriented iPP sample (DR=35) perpendicular to the XY, YZ and XZ planes. Molecules are preferentially oriented along the draw direction. The (110) plane is parallel to the roll surface, and the (040) plane along the transverse direction (Y direction), in triaxially oriented samples having high draw ratios. ($> \times 35$)

Differential Scanning Calorimetry—Crystallinity Values

Figure 7:
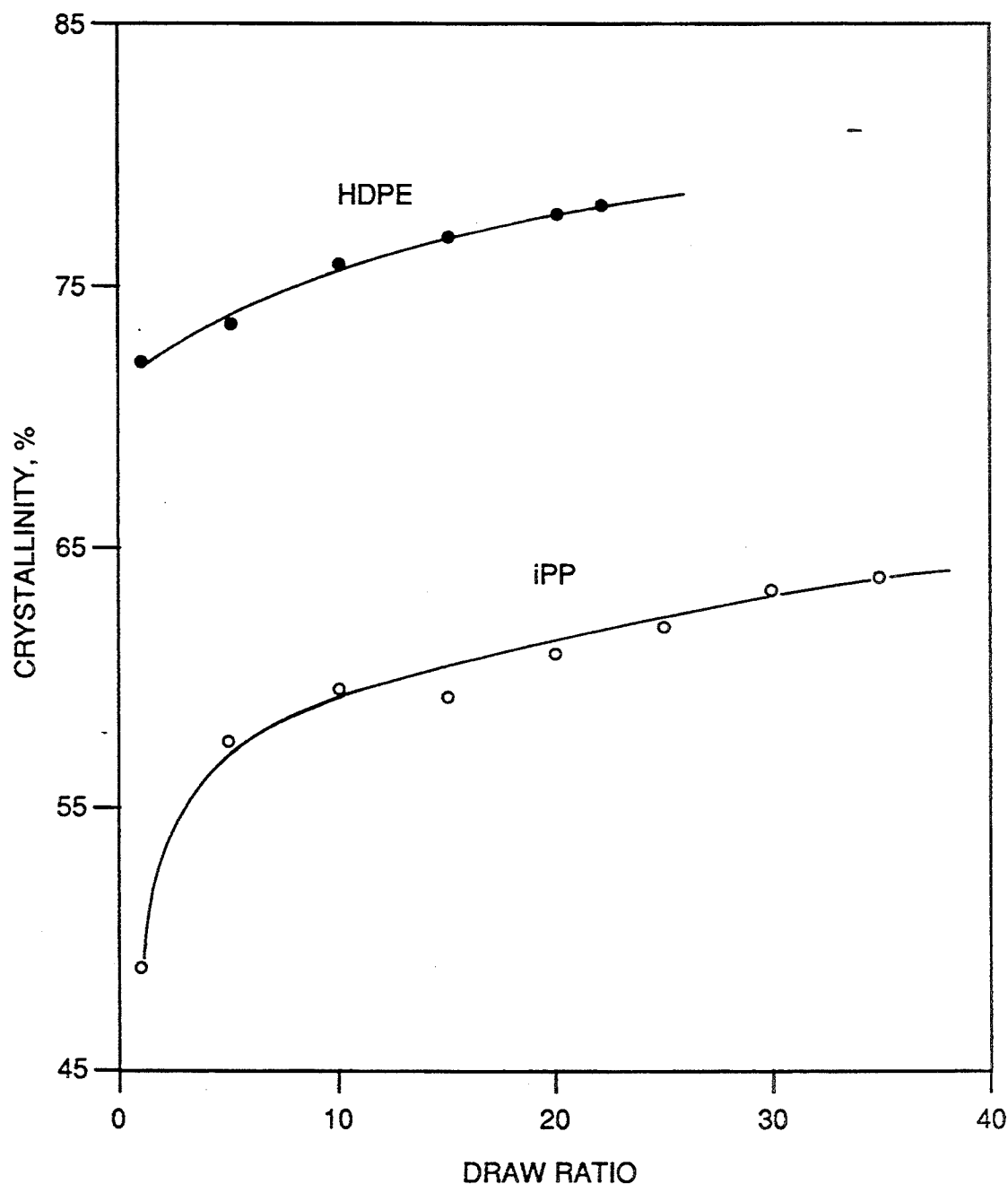
FIG. 7 is a plot of the percent crystallinity of HDPE and iPP shown as a function of draw ratio for several sets of processing conditions.

Crystallinity values determined from DSC, are plotted in FIG. 7. The degree of crystallinity was determined as the ratio of the enthalpy change at melting transition to the heat of fusion for an ideal crystal (69 cal/g and 38 cal/g were used for HDPE and iPP, respectively). Density measurements were also made for the rolltruded specimens, but here too the density of the amorphous phase, which is a function of draw ratio (or orientation), must be properly assigned before the degree of crystallinity can be calculated accurately. Trends in crystallinity with processing conditions are in accord using both techniques.

Birefringence

Figure 8:
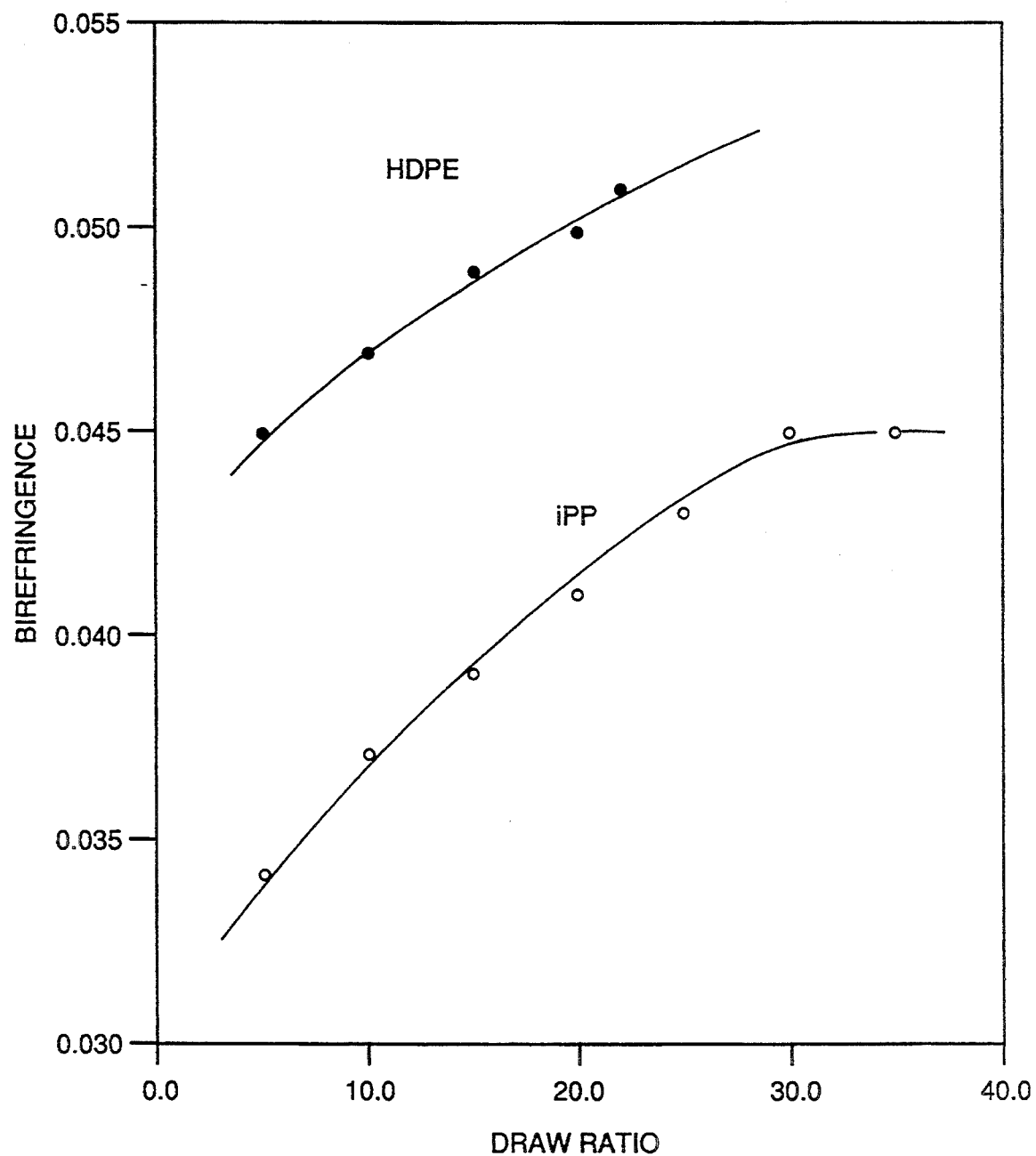
FIG. 8 is a plot of the birefringence values of triaxially oriented HDPE and iPP samples as a function of draw ratio.

Sample birefringence as a function of draw ratio is shown in FIG. 8. In both the triaxially oriented HDPE and iPP samples, the $n_{yz}$ and $n_{xz}$ values were virtually identical for a given draw ratio because the difference of the principle refractive indices, $n_a$ and $n_b$, is very small in both polyolefins.

Degree of Orientation

Figure 11:
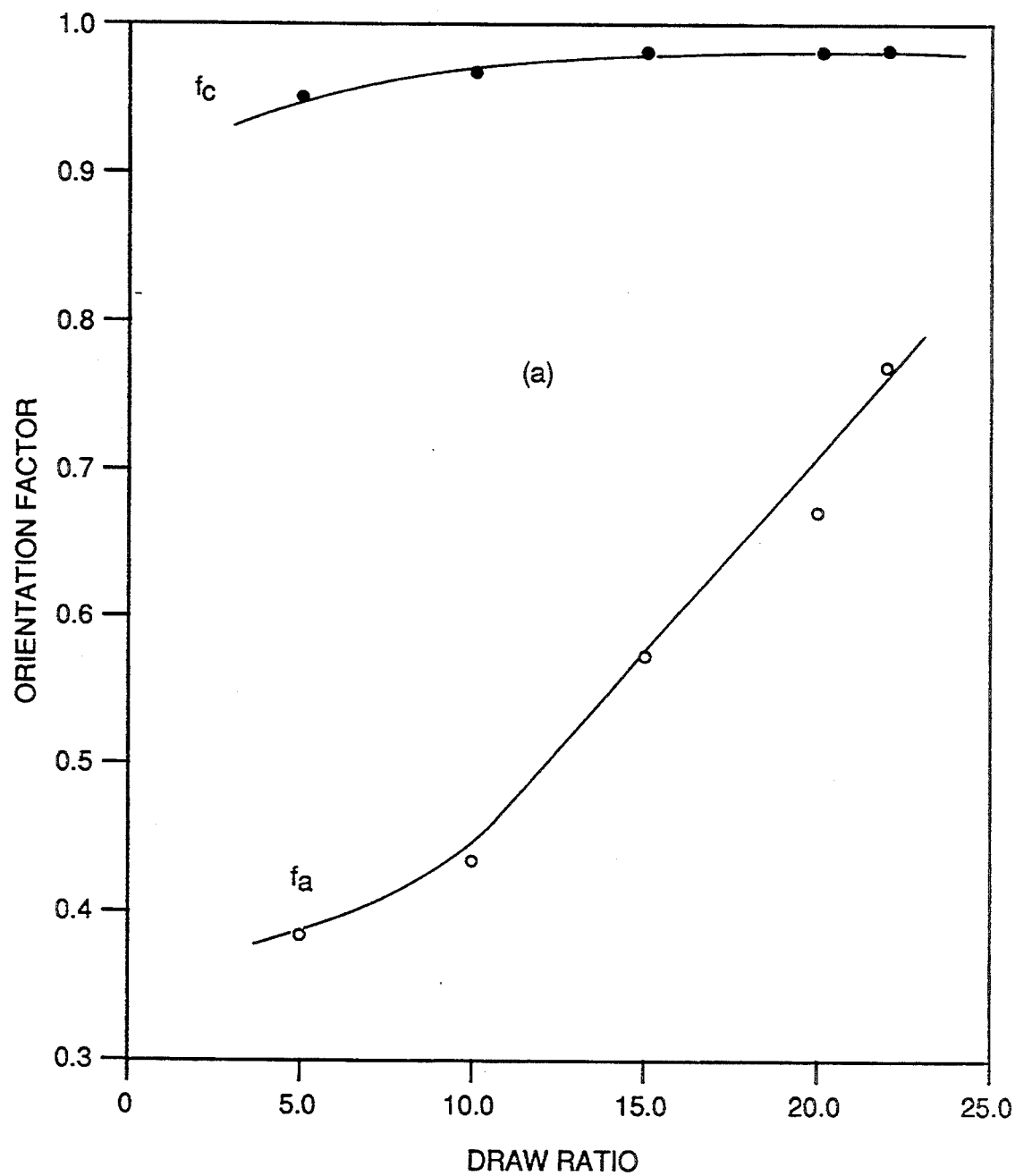
FIGS. 11 and 12 are plots of the Orientation Factors, for both amorphous and crystalline forms, for HDPE and, iPP, as a function of draw ratio.
Figure 12:
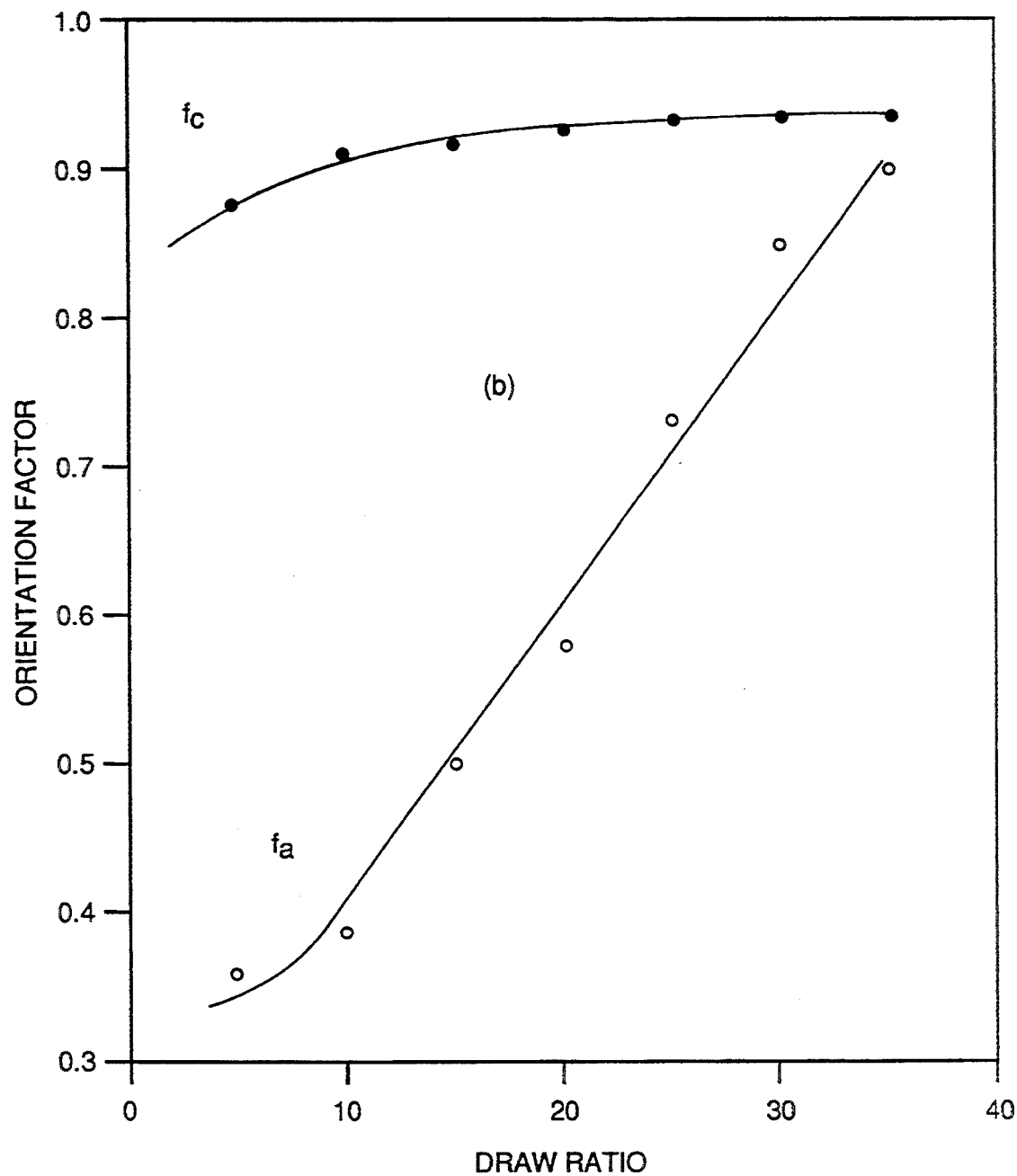

The degree of orientation for the crystallites, $f_c$, was determined from WAXS data, using the Hermann's function. The degree of orientation for the amorphous phase, $f_a$, was calculated based upon birefringence measurements along with $f_c$ results, assuming Stein's additivity equation to be valid. FIGS. 11 and 12 show the variations of $f_c$ and $f_a$, with draw ratio, for the two polyolefins. Both factors increase with increasing draw ratio, but $f_c$ tends rapidly towards an asymptotic (limiting) value at high DR values, while $f_a$ is found to increase steadily, suggesting that the intercrystallite materials play a very important role in the enhancement of mechanical properties.

Gel Permeation Chromatography

GPC measurements were made in order to monitor the changes in molecular weight and molecular weight distribution upon deformation. It is clear that no significant changes in the molecular weight distribution occurred during processing. Consequently, the commercial HDPE and iPP samples did not undergo thermomechanical degradation upon rolltrusion so that this procedure appears to be of technological value. In like manner, its utility for several other commercial plastics bas been verified and these results will be reported shortly.

Mechanical Properties

The tensile properties of the original and the triaxially oriented HDPE and iPP polymers were determined along the roll direction. The details of the testing conditions and the calculation of tensile properties such as modulus, strength, elongation at break and fracture toughness were outlined earlier.

The important point to appreciate is that through mechanical testing of a polymer produced by the rolltrusion process, it is established that the product is very strong, and has enhanced 3D mechanical properties which is a desirable characteristic for a membrane or thin-like film of the invention.

A, The Calculation of Tensile Properties

All tensile properties were calculated using the procedure outlined in the ASTM Test Method D-638;
  (a) Tensile Strength (psi)—load applied to the specimen divided by the cross-sectional area;
  (b) Tensile Modulus of Elasticity (psi)—the slope of the straight line portion of the load-strain curve divided by the cross-sectional area;
  (c) Elongation at break (in/in)—increase in the gage length at the point of fracture divided by the original sample gage length; and
  (d) Fracture Toughness—it is the measure of the area under the load-strain curve until fracture divided by the cross-sectional area of the sample.

The invention is now further described by way of example for several polymeric materials.

Example 1

Commercial isotactic polypropylene, as extruded sheet (Boltaron 5500), was cut into billets for triaxial orientation. A variety of thickness from $\frac{1}{8}''$ to $\frac{1}{2}''$ and sometimes greater were processed by the rolltrusion method as follows. The polypropylene workpiece was introduced between thermostatted rollers, and the existing end of the workpiece was clamped in a constant speed drawing device (which had a variable drive and variable tension or load capability, that could be used as the need arose). The load on the clamped workpiece was adjusted as it was pulled between the rollers until the desired thickness at exiting and properties were reached. The drawing speed was about 0.3 cm min$^{-1}$ and a draw temperature of 158° C., were such that they, and roller compression of desired dimensions, produced highly triaxially oriented transparent plastic from the opaque commercial sample. The cross sectional area of the product could be controlled, as required, covering changes in cross section of the original workpiece from $\times 2$ up to $\times 60$ to 1 in a single pass through the triaxial orientating assembly.

After passage between the rollers, the polypropylene was rectangular (strap-like) in shape. The Young's modulus of elasticity, the tensile strength and toughness of the polymer were characterized. For a typical commercial workpiece of polypropylene, $M_w = 371,000$ and $M_n = 65,000$, for example, and draw ratio (DR) $= \times 35$, for example, the Young's modulus enhancement could be in excess of $2.5 \times 10^6$ psi, the tensile strength $7 \times 10^4$ psi, and the toughness with respect to the starting material. At the same time, the elongation of the processed product was typically below 5%, i.e., manifold reduction, so that elongation or creep of the rolltruded polymer with respect to the original workpiece was significantly changed for better use in many practical applications, where elongation/creep have proven to be a problem in end use applications.

At drawing ratio (DR) values approaching $\times 30$, and well above this, the (b) axis of the polypropylene was oriented perpendicular to the roll plane (broad face) of the product which had now become highly transparent. The (c) molecular chain direction was now aligned in the draw, or stretch direction, and the (a) direction of the crystallites was oriented transverse to the rolling direction. These facts signified that true triaxial orientation had occurred. The measured X-ray orientation factor, birefringence, sample density and crystallinity were all enhanced significantly through this triaxial orientation processing.

Example 2

In this illustration, isotropic commercial (high density Boltaron 5200) polyethylene of $M_w = 91,900$ $M_n = 13,900$ was again cut into billets and triaxially oriented by drawing between the roller surfaces. The set-up procedure was similar to that cited in Example 1, except that the processing conditions, particularly temperature was considerably lower. The rolltrusion operation was similar to the polypropylene example, and the workpiece was processed to strip-like dimensions of high clarity, strength, modulus, draw ratio and orientation. Typical values for a draw ratio of $\times 25$ are tabulated. This illustration does not represent an upper limit on processability, but it only serves as an example.

For thick workpieces, as in polypropylene too, it may be desirable to preneck the work specimen, before placing it subsequently between the rollers of the rolltrusion equipment. After clamping the workpiece on the exiting (drawing) side from the rollers, the polymer is drawn and compressed simultaneously into an elongated strip. Tension and draw speed were selectively altered to reach the desired DR dimensions and qualities in the processed product.

In this example of high density commercial polyethylene, triaxially-oriented at 120° drawn to a DR=22, the results were: Young's Tensile modulus ($10^6$ psi) 3.5; Tensile strength ($10^5$ psi)=2.0; and Elongation=5%. (See FIGS. 5 and 9)

Example 3

In this example, unoriented Nylon 6, colored (blue dyed), billets (from Cadillac Plastics, Pittsburgh) were cut from a ½ sheet of Nylon 6 plastic, prenecked, and then subjected to rolltrusion at elevated temperatures, which were well above the conditions used for processing polypropylene. In a single operation at 205° C., for example, Nylon 6 workpiece was converted to highly triaxially oriented plastic, with enhanced physical properties and improved wear resistance, demonstrating that the product was capable of much improved quality and improved characteristics as an engineering plastic. An example of sample qualities for a DR=6.5 are illustrated in Table 10.

Example 4

Commercial sheets of amorphous polyethyleneterephthalate (PET), which is a crystallizable polymer, were processed at not too far removed from their glass transition temperature. Two different examples, one (a) with a workpiece ½" wide, and another (b) a workpiece 5½" wide were used. With (a), the rollers were heated and stationary, whereas with (b) they were cold (i.e., kept at room temperature) but the workpiece was preheated before passing through the roller nip which was adjusted to obtain product thickness as required. The workpiece in (b) was comprised of a sheet roll longer than (50 ft.) of amorphous PET, purposely tested to demonstrate the continuous nature of operation.

To illustrate the quality of the product produced, it is pointed out, that for a triaxially-oriented PET of DR=×10, the X-ray, density and DSC crystallinity are considerably enhanced during rolltrusion processing. The tensile modulus, and tensile strength, jump by a factor of ×10- and ×6-, respectively. The clarity of the PET was not impaired through the crystallization, which occurs during the rolltrusion operation, or even after subsequently annealing the rolltruded product at about 180° C., where its maximum rate of crystallization approximately. By way of contrast, the unoriented relaxed (originally clear amorphous PET) becomes milky white when heated and maintained 180° C. for 1 hr., indicating that a clear advantage is to be gained via the triaxial orientation processing described in this example.

All polymers tested in these examples were characterized by small and wide angle X-ray diffraction. It was demonstrated that orientation and crystallinity of the triaxially-oriented increased progressively, with conditions finally reaching a morphology in which the molecular chains, in crystalline and amorphous regions, were oriented along the stretch direction, and the other two crystallographic directions were oriented in, and perpendicular to, the rolling plane of the workpiece. At sufficiently high deformations, a monoclinic component was also noted along with predominant orthorhombic component in polyethylene. For polypropylene, the structure is monoclinic; and in PET, it is the usual triclinic structure which predominated.

FIG. 5 lists the tensile modulus values obtained from triaxially-oriented HDPE samples processed at 110° and 120° C. The tensile modulus, upon triaxial orientation of commercial HDPE polymer, was enhanced by almost an order of magnitude i.e., from $1.7 \times 10^5$ psi for the original polymer to $3.8 \times 10^6$ psi for the highly triaxially-oriented HDPE sample (DR=22). Almost a linear increase in tensile modulus values was noted with increasing draw ratio.

Also presented in FIG. 5 are the tensile modulus values of the triaxially-oriented iPP samples processed at 150° and 158° C. These values were subsequently plotted as a function of draw ratio. (no table) Again, there was observed a significant increase in modulus values upon triaxial orientation. The original iPP sample showed a value of $1.8 \times 10^5$ psi, while the highest drawn sample (DR=35) had an average value of $2.5 \times 10^6$ psi. The tensile modulus values of triaxially oriented HDPE and iPP samples obtained in the present investigation were comparable to those obtained by other orientation techniques described earlier.

Figure 9:
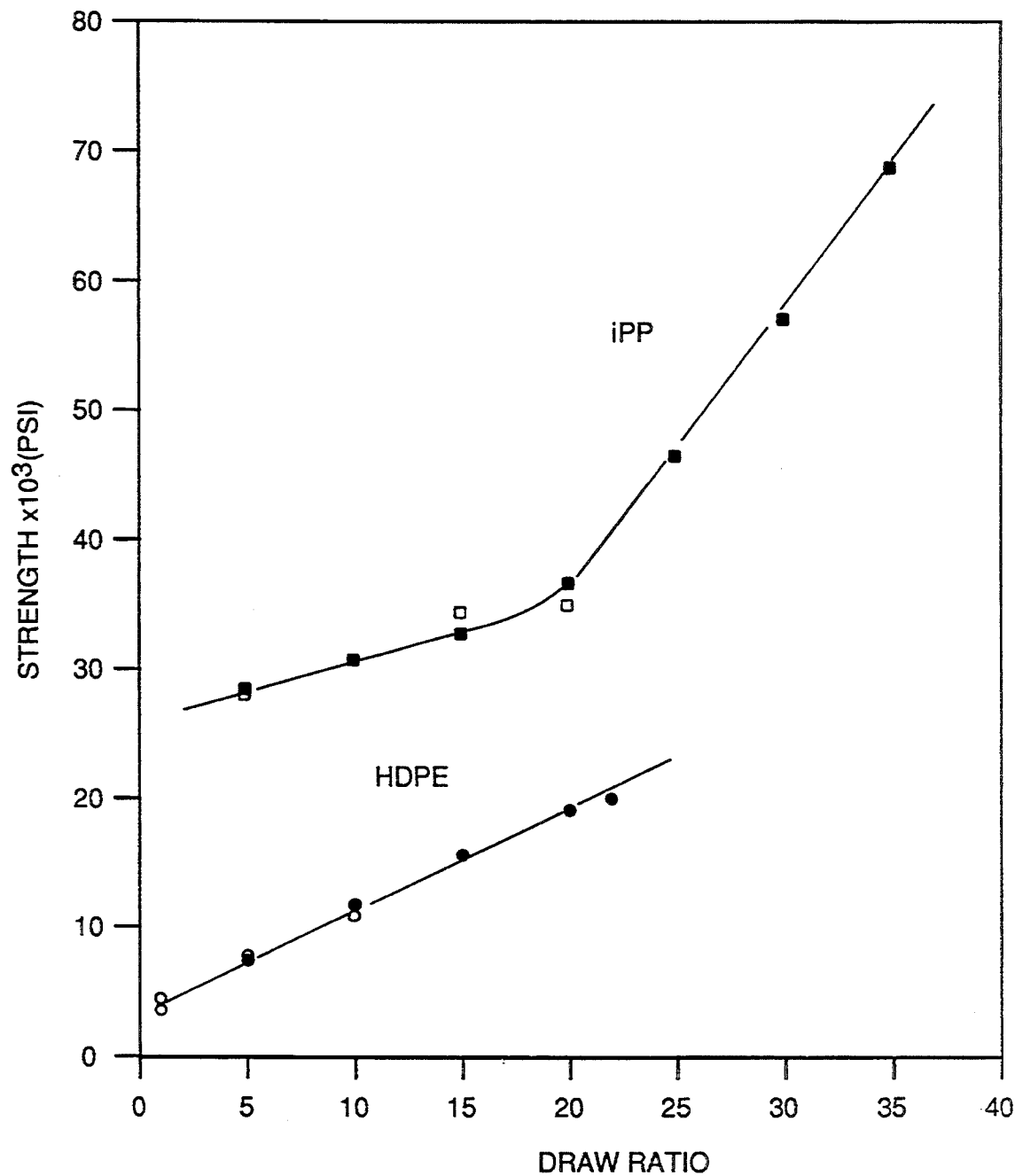
FIG. 9 presents the plots for tensile strength for HDPE and iPP as a function of draw ratio.

FIG. 9 presents the plotted tensile strength data on triaxially-oriented HDPE samples of various draw ratios. There was a plot of this data of the variation in tensile strength with draw ratio for HDPE samples triaxially oriented at 110° and 120° C. The plot suggests almost a linear increase in tensile strength with increasing draw ratio. The original undrawn HDPE had a tensile strength of 3000 psi compared to the tensile strength of 20,000 psi for the triaxially oriented HDPE (DR=22) sample.

The tensile strength values obtained from triaxially oriented iPP samples are also plotted in FIG. 9. There was also a plot of tensile strength expressed as a function of draw ratio for the triaxially oriented iPP specimens processed at 150° and 158° C. The tensile strength of the triaxially oriented iPP samples was enhanced over the original polymer by at least a factor of 15. The original iPP had an average value of 4000 psi, while the triaxially oriented sample (DR=35) showed a tensile strength of 69000 psi. However, no distinct trend was evident with respect to the draw temperatures and draw speeds used in this work.

Figure 10:
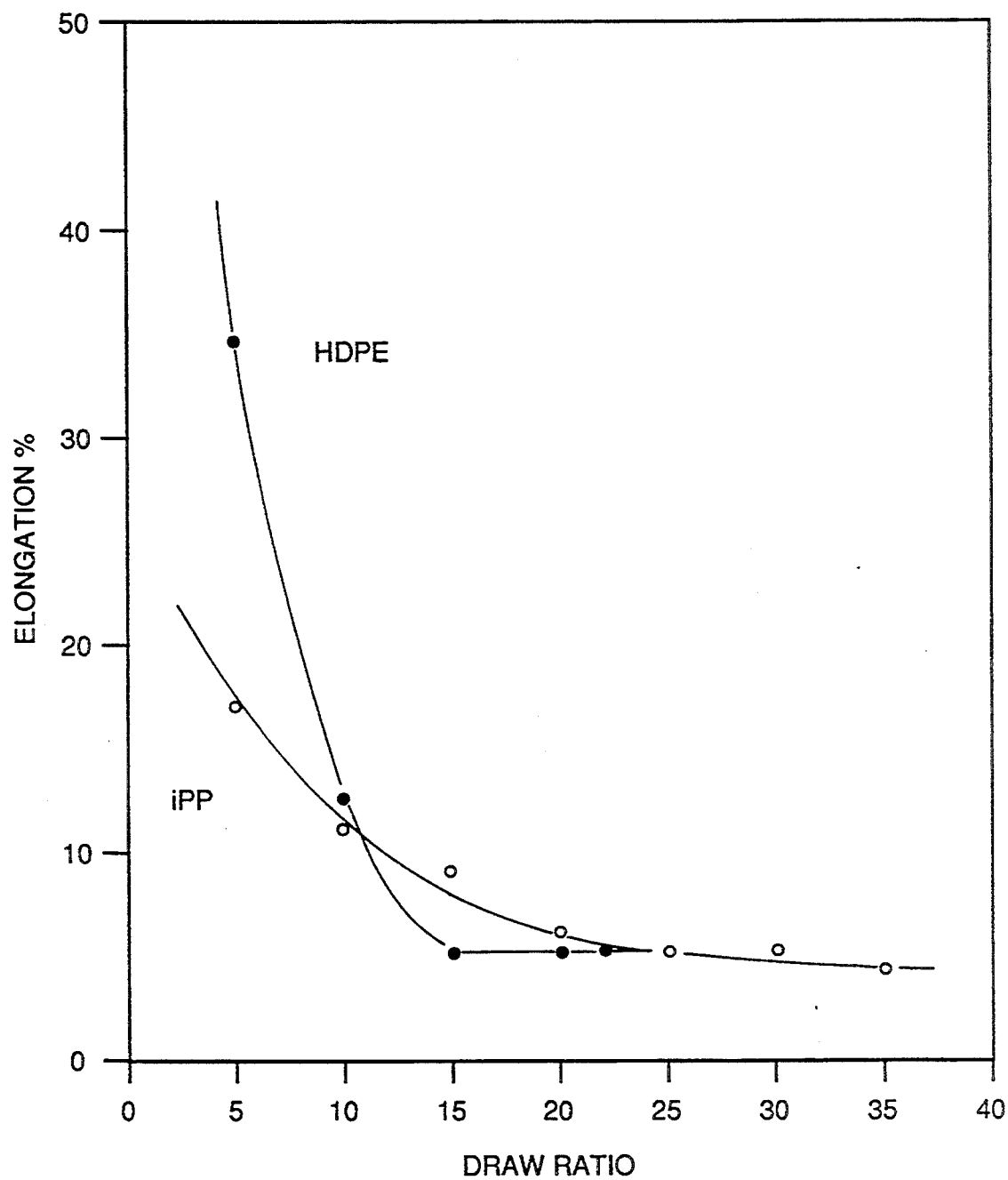
FIG. 10 presents the plots for percent elongation at break of HDPE and iPP as a function of draw ratio.

There was a plot made of measured values that show the effect of draw ratio on elongation-at-break for the triaxially oriented HDPE and iPP. The values of elongation at break used are listed in FIG. 10. An exponential decrease in percent elongation occurs upon triaxial orientation. Initially, HDPE and iPP samples showed an elongation at break values of 1250% and 590% respectively. In contrast, the triaxially oriented HDPE sample (DR=22) exhibited only 5% elongation before fracture, and triaxially oriented iPP (DR=35) showed an elongation at break of 4%. The transition from a ductile to a brittle behavior with increasing triaxial orientation can be explained on the basis of microfibrillar model, wherein the presence of tie molecules associated or created by a high degree of molecular orientation severely restricts shear deformation of microfibrils thus leading to a brittle failure.

The influence of draw ratio on fracture toughness of triaxial oriented HDPE and iPP samples were shown in a plot of data. The toughness values, as determined from the area under the stress strain curve for the triaxially oriented HDPE and iPP samples, are listed in Table 11. The fracture toughness of triaxially oriented HDPE decreased to as low as 9 mm$^2$ from 204 mm$^2$, on increasing the draw ratio from 5 to 22. Similarly, for iPP the fracture toughness decreased from 49 mm$^2$ to 7 mm$^2$ upon increasing the draw ratio from 5 to 35.

Finally, in Table 12 is presented some representative physical data for each of the polyolefins that were extensively studied, indicating the correlation of long period spacing, percent crystallinity and melting point, for the original polymers, and after useful processing according to the present invention.

It has thus been established by this array of data as presented in the tables that:

(a) Maximum draw ratio is a function of draw temperature and roller gap, but is independent of draw speed in the range cited;

(b) The average long period increases with increasing draw ratio and with increasing draw temperature. The mean polymer crystallite size increases predominantly with draw temperature;

(c) DSC traces of rolltruded polymers exhibited sharper melting profiles and higher melting points as compared to the original polymer billets;

(d) Birefringence measurements have indicated a high degree of molecular orientation in both the crystalline and amorphous regions;

(e) GPC studies showed no signs of thermomechanical degradation during rolltrusion processing; and (f) For the samples, the tensile modulus values and the tensile strength of these polymers were significantly better than the commercial polyolefins.

Rolltrusion has proved to be a useful technique for the preparation of highly triaxially oriented polymers from commercial plastics. Triaxially oriented HDPE and-iPP samples with tensile modulus values up to $3.8 \times 10^6$ and $2.5 \times 10^6$ psi, respectively, were obtained readily. Tensile strength of these polymers were much more than an order of magnitude better than the values found for the starting polymers. These mechanical properties are found to be increased by more than an order of magnitude depending upon the molecular weight and molecular distribution of the starting material.

It is generally found that the higher the mean molecular weight, the higher will be the tensile strength and modulus of the triaxial oriented specimen(s) obtained through rolltrusion. Creep was significantly reduced in these processed polymers too, so that their utility was greatly enhanced for many industrial applications. WAXS and SAXS patterns, along with TEM and SEM micrographs have shown that the polymer crystallites and amorphous regions are oriented with their c-axis along the draw direction and a low index plane aligned parallel to the roll surface in triaxially oriented polymers.

Data Pertaining Generally to a Triaxially Oriented Membrane or Film Produced by the Rolltrusion Process Whereas most of the previous data was given for only one dimension, the following data is given for three dimensions. Also in this section, data such as permeability, diffusivity, etc. are given for a membrane of-the present invention.

Materials and Sample Preparation

As mentioned hereinbefore, three commercial plastics were used in a more recent study, which appears in polymer engineering and science, mid-June 1989, Vol. 29, No. 11.

These three plastics used in this study are: isotactic polypropylene iPP (Aristech Company, Pennsylvania), polyvinylidene fluoride PVDF (Kynar Pennwalt Company, Pennsylvania) and propylene/ethylene block copolymer (11% of ethylene content, Chisso Corporation, Japan). Long billets cut from molded and extruded sheets were rolltruded. Draw speeds were between 0.28 to 6.05 cm/min, without preheating. Mechanical properties were found to be independent of draw speed within this range, however, draw temperature greatly influenced sample properties as well as morphology. The draw temperatures are shown hereinafter.

Mechanical Test

Figure 3:
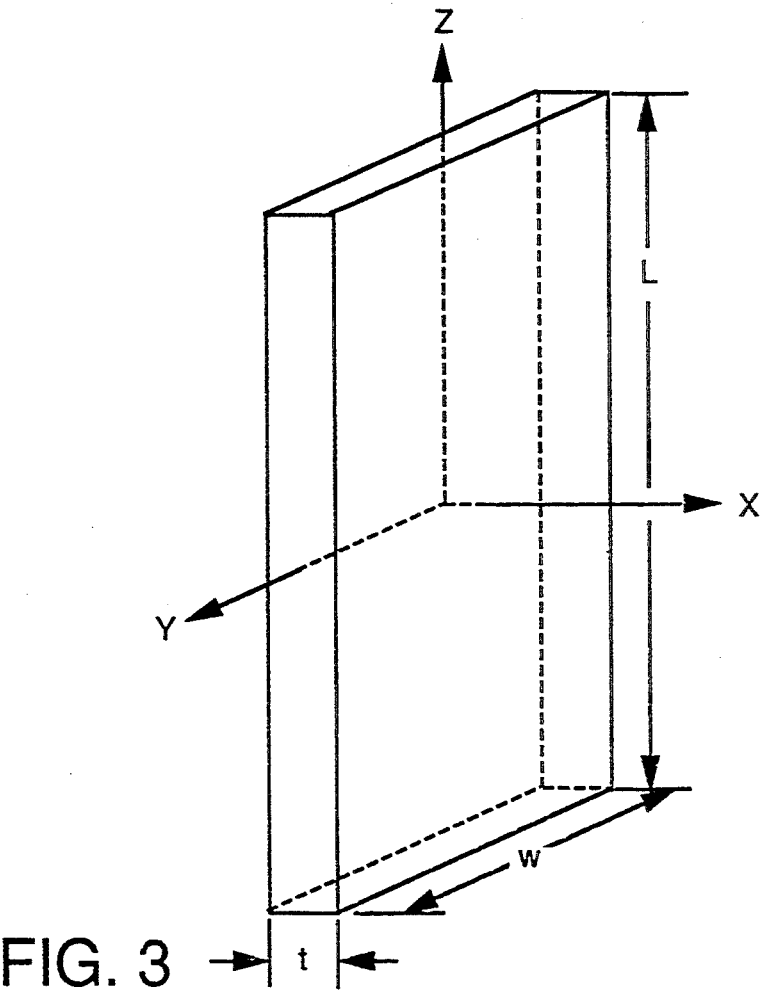
FIG. 3 shows the coordinates of triaxially oriented specimens, where the draw or machine direction is Z, the roll plane is YZ, and the transverse load is in X direction.

Using FIGS. 2 and 3 for reference, the tensile properties along Z (draw) and Y (transverse) directions were measured according to ASTM test method D-638. Due to the limitation of sample thickness, the X (thickness) direction property was represented by compressive modulus and compressive yields strength obtained using ASTM D695-80, except that the test specimens were thin and square in shape (1.3 cm $\times$ 1.3 cm was chosen). A few sonic moduli (equivalent to tensile moduli) have been measured at very high frequencies. These show values higher than the original sample.

Depending on the sample thickness which varies from 0.25 to 1.9 cm, the length-to-diameter ratio is found to be smaller than 1.0 for most specimens (aspect ratio of 1.0 is the minimum value recommended by ASTM). It was realized that the friction between the test sample and the compression dies may affect the results significantly so that compressive properties are reported here with some reservation. For both tensile and compressive tests, the cross-heat speed was set at 1.3 mm/min (0.05 in/min). All the tests were performed at room temperature and the machine compliance of MTS (model 880) was calibrated.

Results

Measured Mechanical properties are summarized in Tables 14 through 16. Correlations with draw ratio (DR) are presented by appropriate plots as discussed below.

Isotactic Polypropylene (iPP)

The highest mechanical properties obtained for the iPP are listed in Table 14. FIGS. 15 through 17 show the mechanical properties of rolltruded iPP specimens as a function of draw ratio. In the Z (draw) direction (FIGS. 15a and 15b), both tensile modulus and strength increase greatly with increasing draw ratio.

FIG. 15a shows the tensile modulus as a function of draw ratio of iPP rolltruded at 160° C. and tested at room temperature along Z direction. FIG. 15b shows tensile strength as a function of draw ratio for iPP rolltruded at 125° C. (top curve) and 160° C. (lower curve). Tests were made at room temperature along the Z-direction.

The transverse modulus and strength also improve significantly (FIGS. 16a and 16b), but they tend to level off at the higher draw ratios. Improvement in compressive modulus is not apparent for iPP samples drawn at 160° C., but become pronounced for samples drawn at a lower temperature (FIG. 17a). More experiments are underway to study further the effect of draw temperature on compressive modulus. Interestingly, the compressive strength improves almost three times for samples processed at draw temperatures of 125° C. and 160° C., respectively (FIG. 17b).

Figure 18:
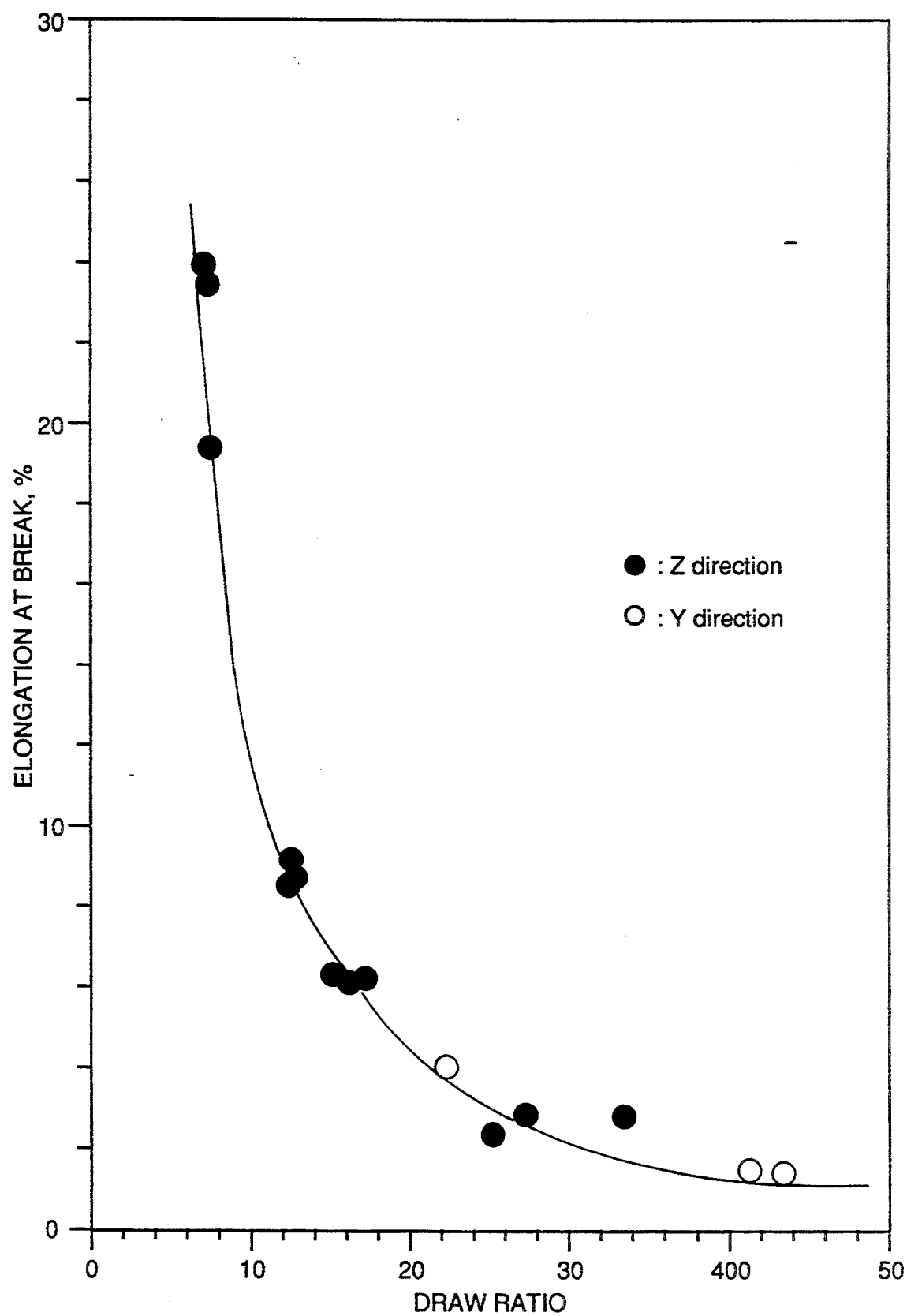
FIG. 18 is a plot showing the elongation at break as a function of draw ratio for iPP rolltruded at 160°.

Elongation to break for Z and Y tensile test directions are plotted in FIG. 18. The transformation from ductile to brittle behavior is evident for rolltruded iPP samples when they are subjected to tensile as well as transverse loads.

Figure 16B:
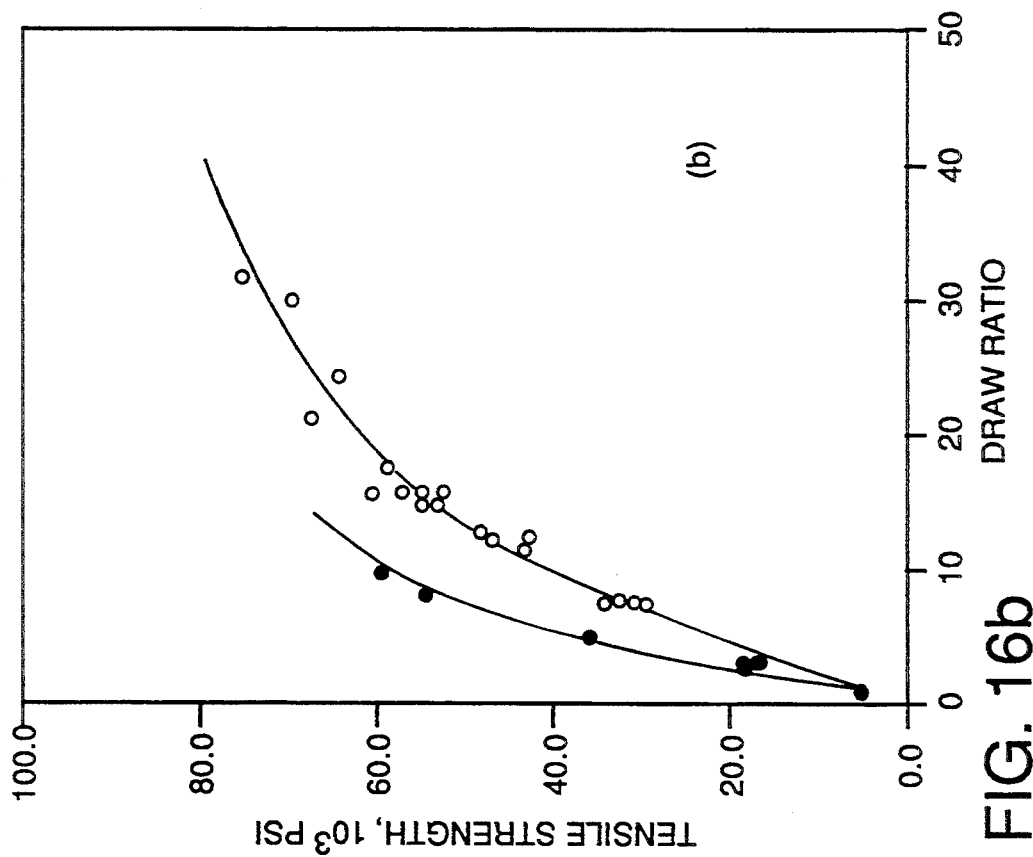
Figure 16A:
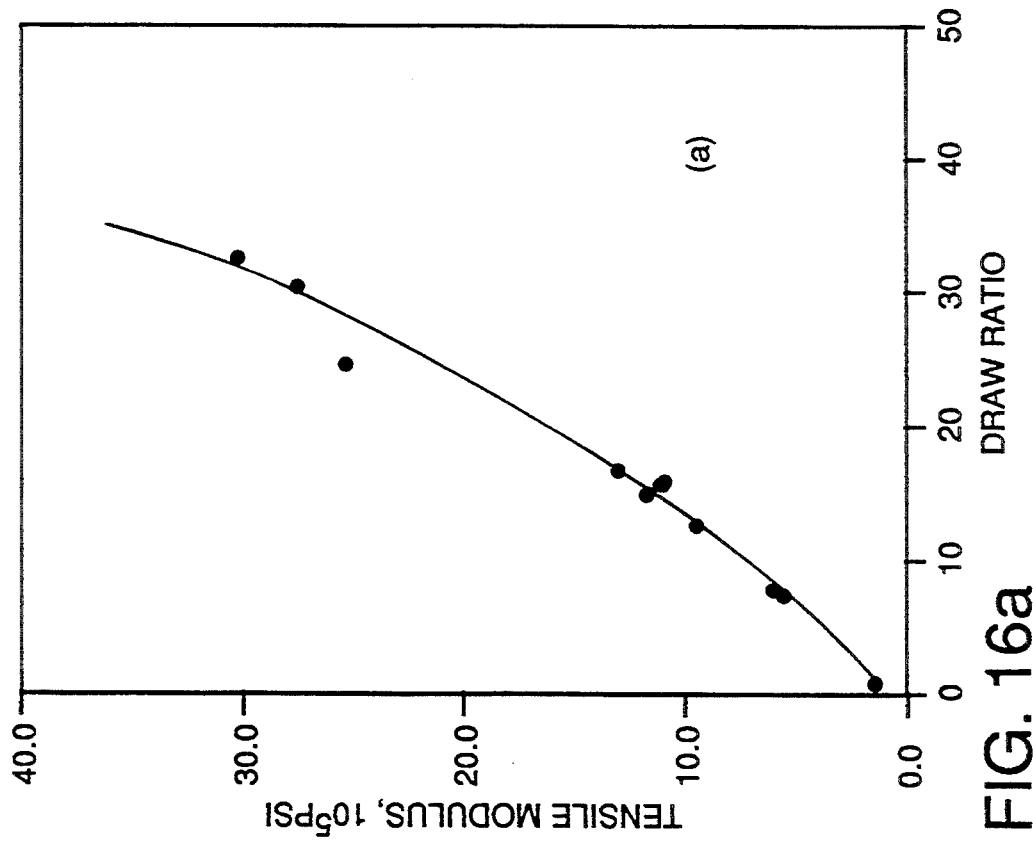

FIG. 16a shows tensile modulus as a function of draw ratio for iPP rolltruded at 160° C. and tested at room temperature along the Y direction. FIG. 16b shows the tensile strength as a function of draw ratio for iPP rolltruded at 150° C. (top curve) and 160° C. (lower curve). Tests were made at room temperature along the Y-direction. FIG. 17a shows compressive modulus as a function of draw ratio for iPP rolltruded at 125° C. (upper curve) and 160° C. (lower curve) FIG. 17b shows compressive strength as a function of draw ratio for iPP rolltruded at 125° C. (top curve) and 160° C. (lower curve). Tests were made at room temperature along the X direction.

FIG. 18 shows elongation at break as a function of draw ratio for iPP rolltruded at 160° C. Tensile Tests were made along Z and & directions, respectively. Samples with a draw ratio lower than 22 yielded and necked upon the Y-direction test.

Polyvinylidene Fluoride (PVDF)

Only a limited number of samples have been tested so far. As listed, in Table 15, all mechanical properties for samples drawn at various temperatures are enhanced except for the compressive modulus which decreases slightly.

Propylene Ethylene (P/E) Block Copolymer

Results are tabulated in Table 16. FIGS. 19 through 22 present mechanical properties for P/E copolymer samples. Most correlations show trends similar to iPP homopolymers. However, the enhancement in compressive modulus is more pronounced in FIG. 21a.

Figure 19B:
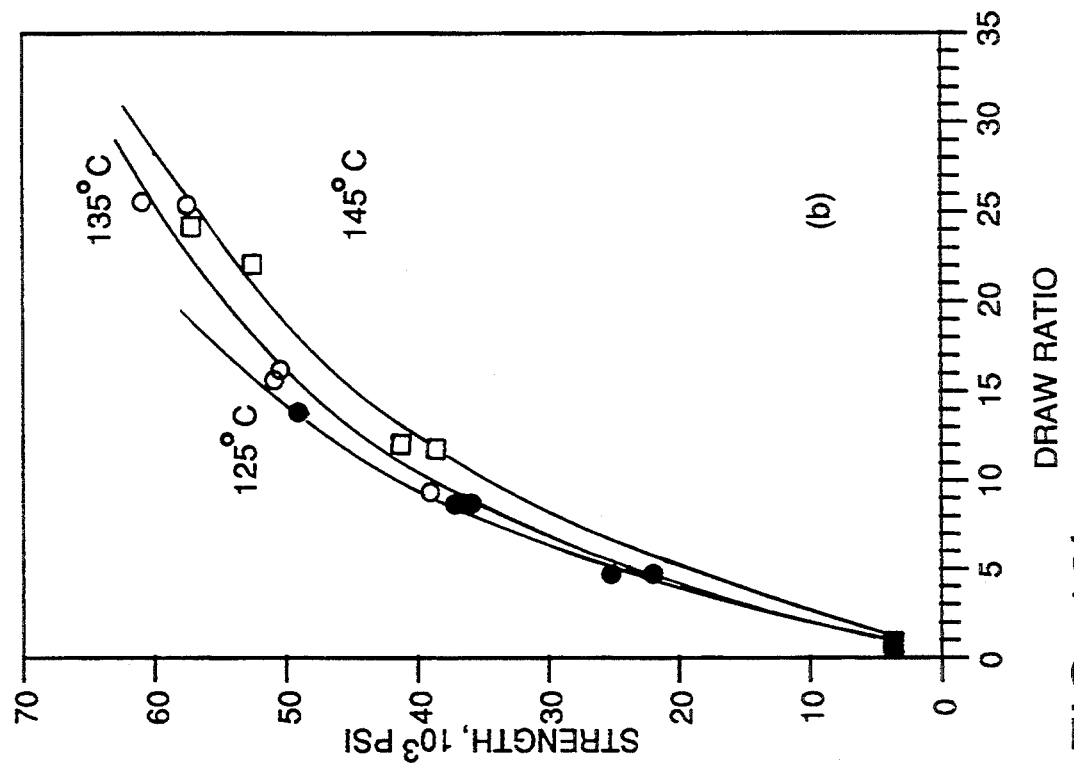
FIGS. 19–22 are plots showing mechanical properties for P/E copolymer samples.
Figure 19A:
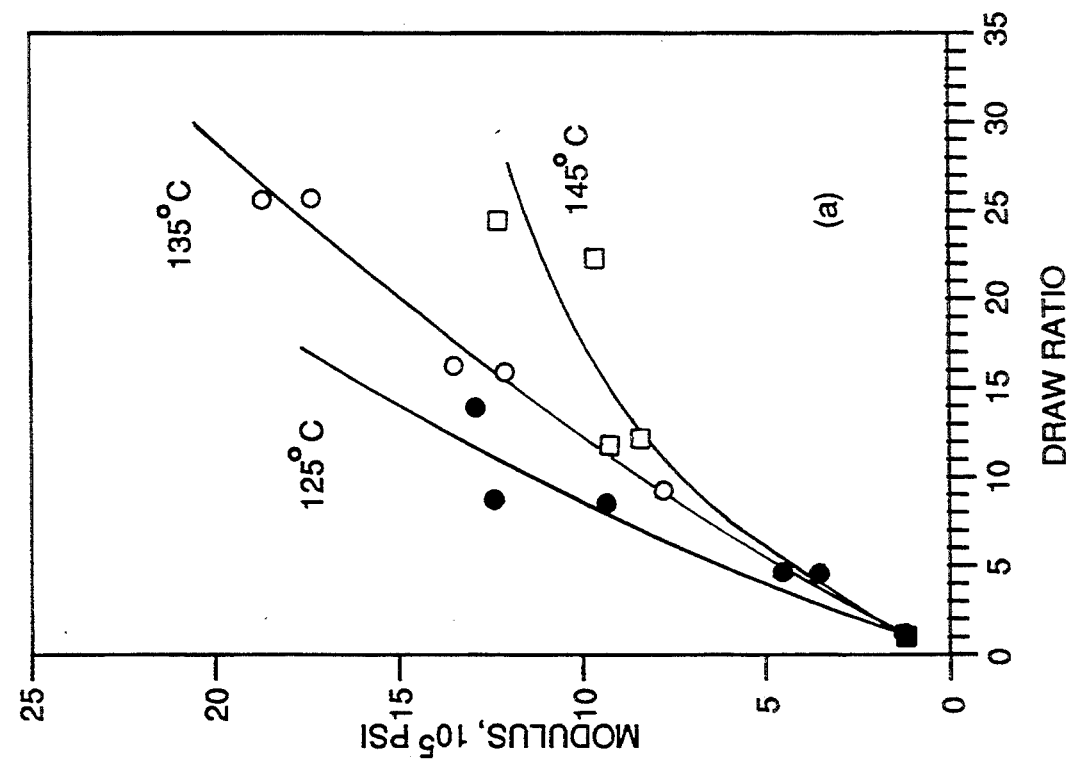

FIG. 19a shows tensile modulus as a function of draw ratio for P/E copolymer rolltruded at indicated temperatures and tested along Z direction. FIG. 19b shows tensile strength as a function of draw ratio for P/E copolymer rolltruded at indicated temperatures and tested along Z direction.

Figure 20B:
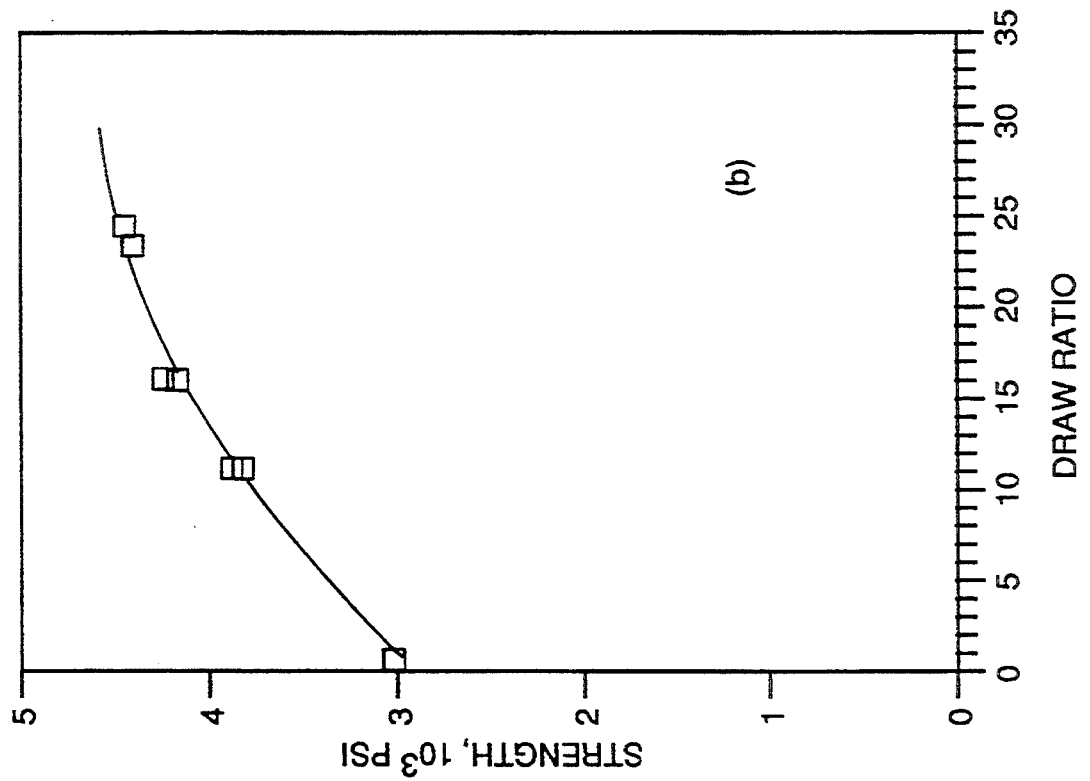
Figure 20A:
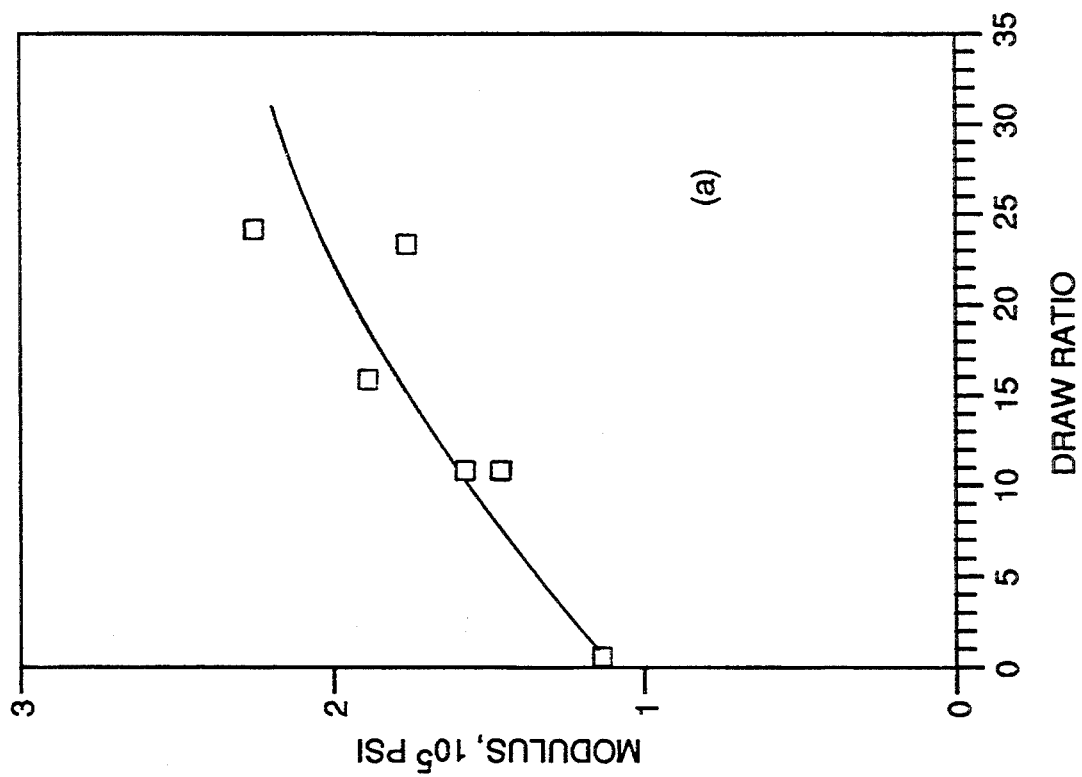

FIG. 20a shows tensile modulus as a function of draw ratio for P/E copolymer rolltruded at 145° C. and tested along Y direction.

FIG. 20b shows tensile strength as a function of draw ratio for P/E copolymer rolltruded at 145° C. and tested along Y direction.

Figure 21B:
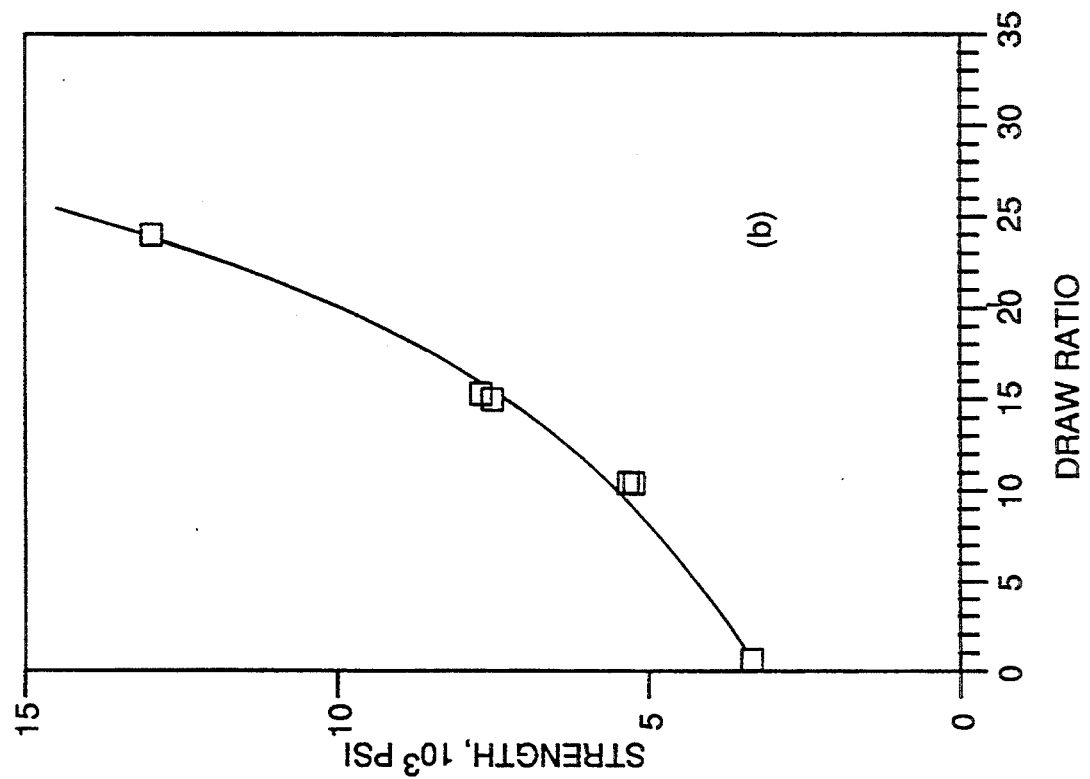
Figure 21A:
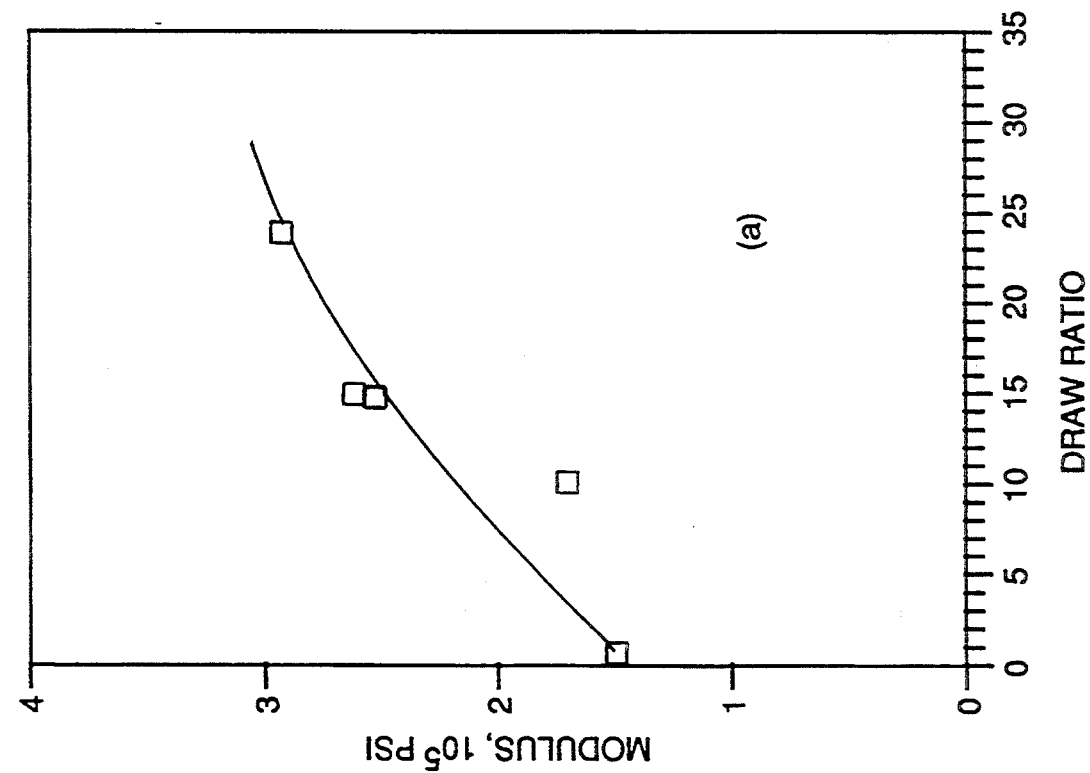

FIG. 21a shows compressive modulus as a function of draw ratio for P/E copolymer rolltruded at 145° C. and tested along X direction.

FIG. 21b shows compressive strength as a function of draw ratio for P/E copolymer rolltruded at 145° C. and tested along X direction.

Figure 22:
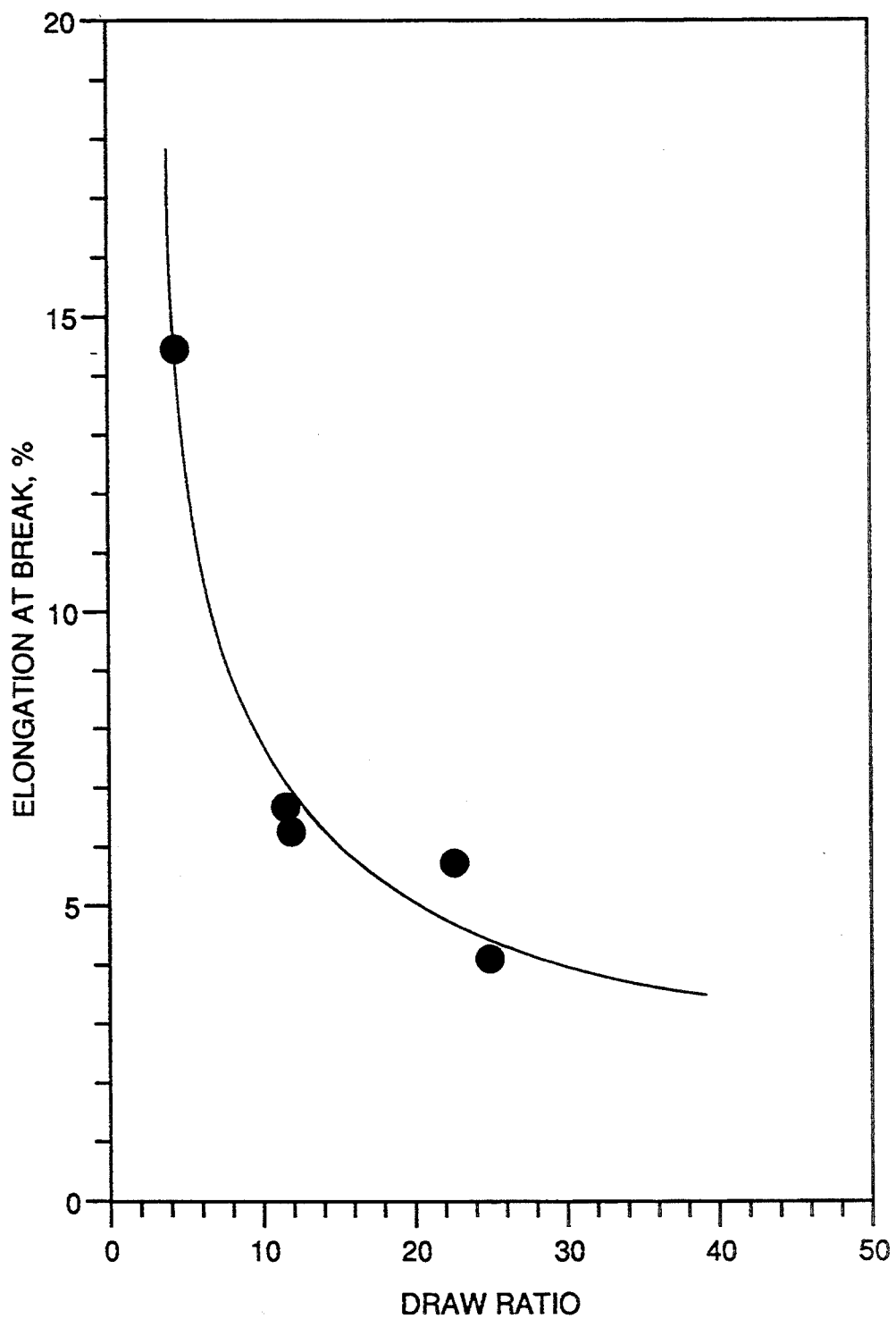

FIG. 22 shows elongated at break as a function of draw ratio for P/E copolymer rolltruded at 145° C. tensile tests were made along Z direction.

Discussion

The results shown in Tables 14 to 16 clearly demonstrate that the Mechanical properties of polymers can all be improved in the three principal directions through rolltrusion. Tensile modulus and strength in the Z (draw) direction are enhanced the most. The improvement can be as high as 28 times (see Table 14). The transverse (Y) modulus and strength as well as compressive (X) strength are also improved significantly, the highest values obtained being in the range of two to three times for the conditions employed. The enhancement in compressive modulus, however varies with polymer type and draw conditions. In the case of preliminary runs with PVDF, the compressive modulus is decreased slightly. However, optimization of the processing conditions should improve compressive and other properties. The 3-D mechanical property improvement is consistent with wear behavior studies where rolltruded HDPE and iPP samples exhibited wear property enhancement in the three mutually perpendicular directions and with the model shown in FIG. 13. These novel results have led to reexamination of some related polymer processes as well as structure-property models in literature.

Wide Angle X-ray Diffraction

Figure 23B:
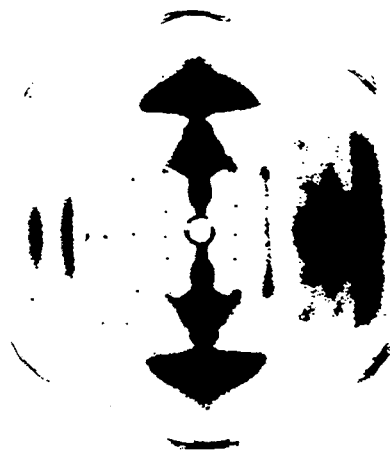
FIGS. 23a, 23b, and 23c show photographs of the triaxial three dimensional morphology of nylon 66 in the x, y, and z directions, respectively.
Figure 23C:
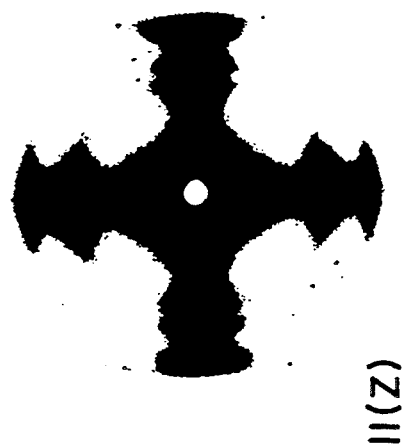
Figure 23A:
Figure 24C:
FIGS. 24a, 24b, and 24c shows photographs of the triaxial three dimensional morphology of UHMWPE in the x, y, and z directions respectively.
Figure 24B:
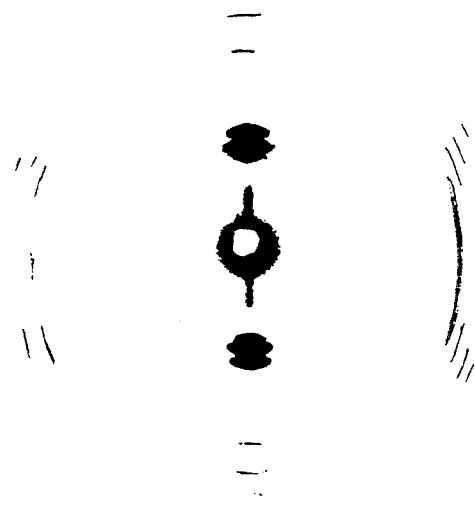
Figure 24A:
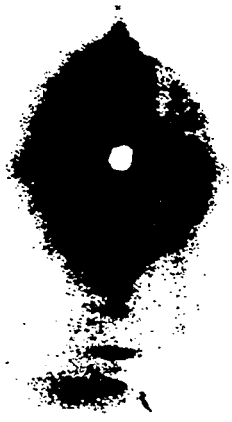
Figure 25C:
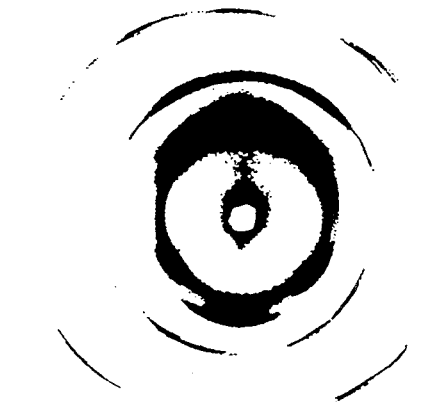
FIGS. 25a, 25b, and 25c show photographs of the triaxial three dimensional morphology of PEEK, a high melting engineering polymer in the x, y, and z directions respectively.
Figure 25B:
Figure 25A:
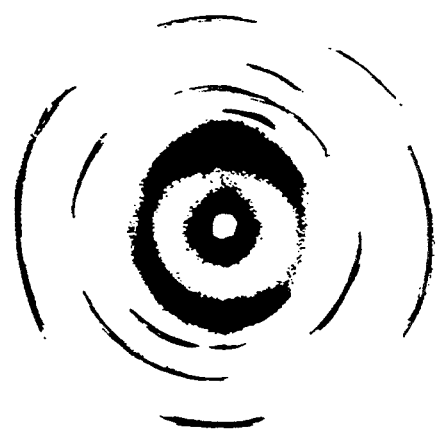

WAXD patterns have been recorded for many rolltruded polymers. In all instances their triaxial orientation is evident from section of the rolltruded workpiece depicted as illustrated in FIGS. 2 and 3. FIGS. 23a, 23b, and 23c illustrates clearly the triaxial 3D morphology of processed nylon 66, where the patterns are represented for the X-ray beam parallel to x, y, and z direction respectively. In FIGS. 23a, 23b, 23c the sample was stained with $K^+I_3^-$ to highlight the different textures. For ultra high molecular weight polyethylene (UHMWPE) the corresponding 3D morphology is shown in FIGS. 24a, 24b, and 24c for the x, y, and z directions in the workpiece. The triaxial morphology is very clear. Again in high melting engineering polymers such as PEEK, rolltrusion is equally successful in converting this polymer into a 3D triaxial texture as shown in FIG. 25 for the X-ray beam in the x, y, and z directions, respectively. In like manner the triaxial crystallite texture of many other semi-crystalline polymer may be illustrated.

Of course, it is useful to distinguish between rolltruded and other polymers processed by solid state deformation. Obviously, using polypropylene as an example (see FIGS. 26a through 26i) the x-ray diffraction patterns taken in the x, y, and z directions for rolled (FIGS. 26a, 26b, and 26c), biaxially stretched (FIGS. 26d, 26e and 26f and rolltruded (FIGS. 26g, 26h, and 26i) polymer are distinctly different. The rolltruded one has a three dimensional (3D) texture, while the others do not have this morphology.

Figure 27A:
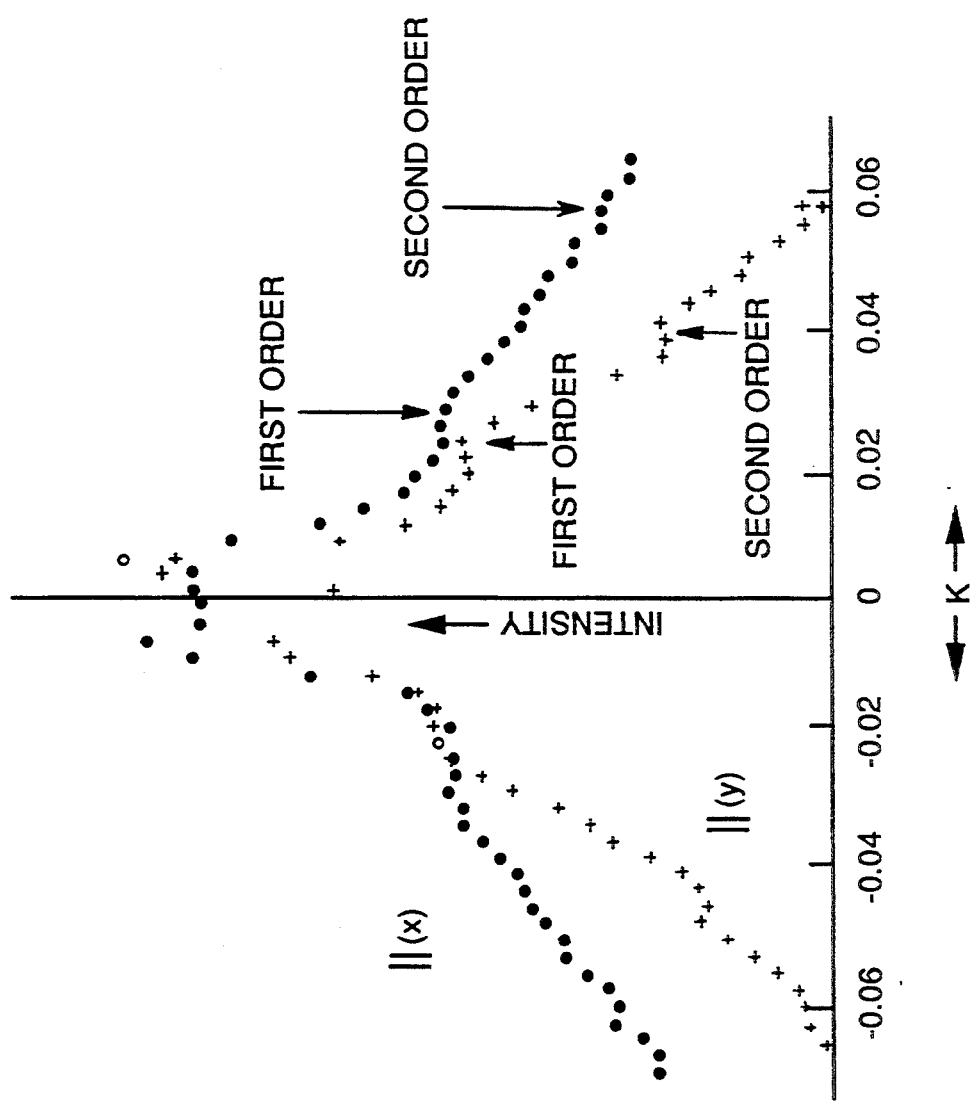
FIG. 27a is a graph of SAXS scattering associated with high density commercial polyethylene.
Figure 27B:
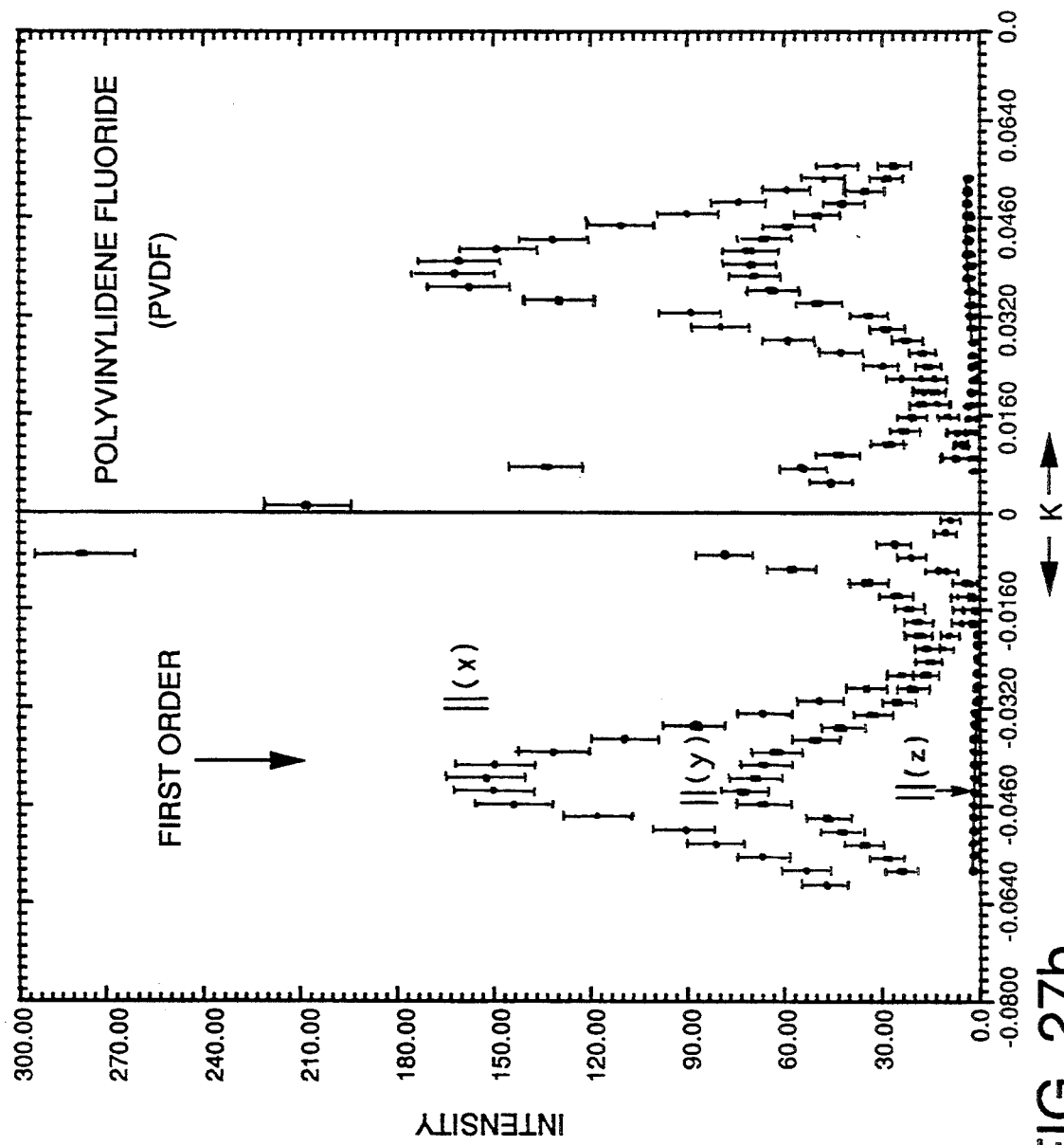
FIG. 27b is a graph showing SAXS scattering measurements made on PVDF or $PVF_2$.
Figure 28:
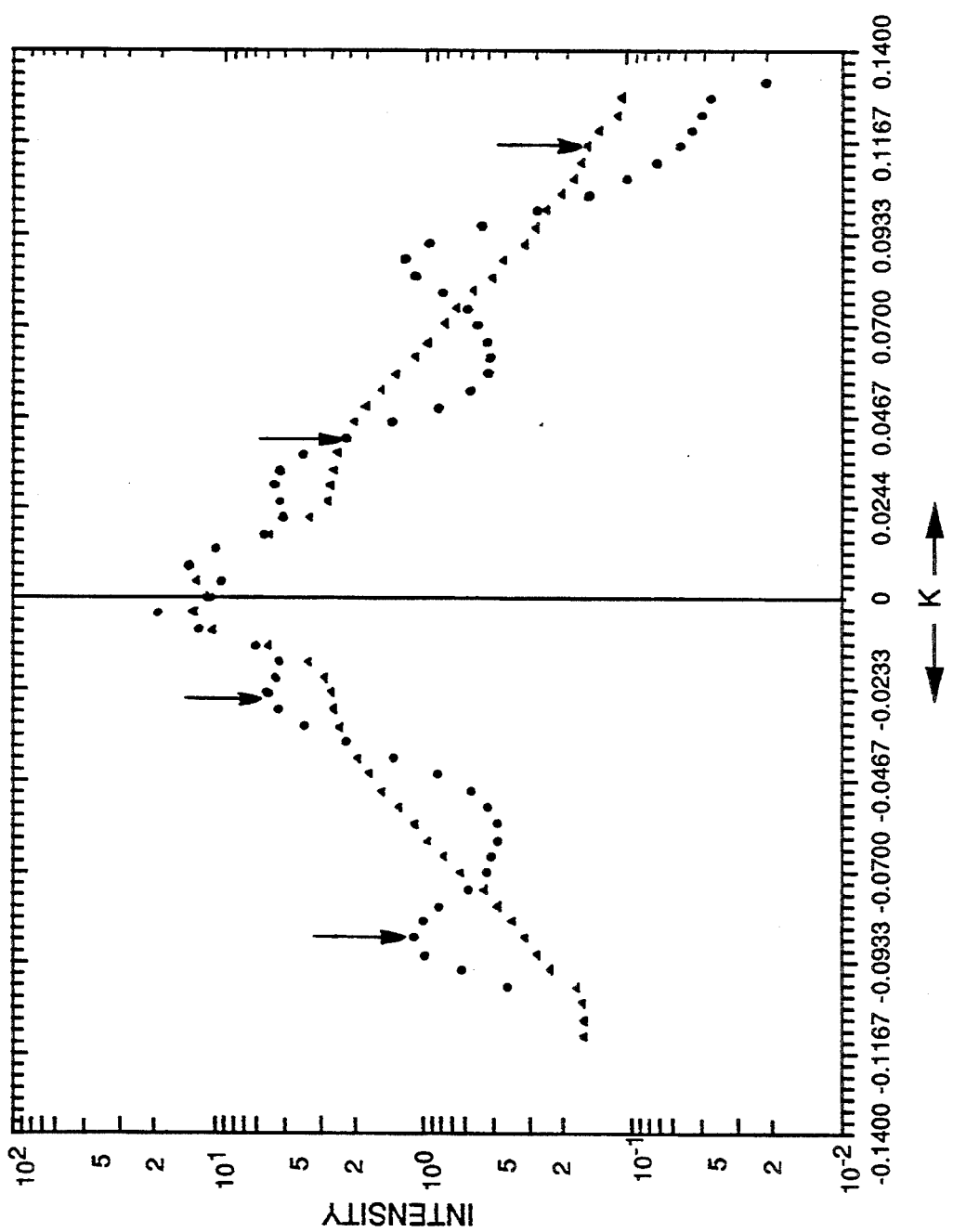
FIG. 28 is a graph showing periodic scattering for ethylene/propylene

Another important aspect of the 3D rolltruded polymers can be clearly discerned from their small-angle x-ray scattering two dimensional (2D) patterns recorded in three mutually perpendicular directions through the workpiece (illustrated in FIG. 3). These patterns may be shown pictorially, but a more illustrative representation is provided by mutually perpendicular intensity scans or slices made in three mutually perpendicular directions. (This was derived from the Oakridge data made at the National Center for small-angle scattering.) Since the WAXD pattern discerns the relative orientation of crystallographic planes, the SAXD measures the periodic SAXS scattering fluctuations due to alternating crystallites interconnected by amorphous regions (variously construed) between them in three directions. As examples of this extended morphology, FIG. 27a shows the periodic SAXS scattering associated with rolltruded high density commercial polyethylene parallel to x and y respectively. Similarly, FIG. 27b shows absolute small-angle scattering measurements made on PVDF in the x, y, and z directions, respectively, where the relative peak heights are related to the square of the electron density fluctuation between the crystallites and the amorphous regions of the triaxially oriented polymer. (This was derived from the Oakridge data made at the National Center for small-angle scattering.) The ratio of peak heights vary as 82:35:1 for x, y, z respectively. In the ethylene/propylene block copolymer (FIG. 28) discrete periodic scattering is revealed in two directions within the workpiece. Many other examples using other systems are available. The purpose for using these varied examples is to document the orientation of crystallites that are crystallographically disposed (i.e., triaxially arrayed) by WAXS and to further substantiate the periodic nature of the order of these crystallites in three directions by SAXS. It is this type of texture which is developed through rolltrusion of the polymer or copolymer that produces very strong and unique pin-hole free transparent membranes that are superior to others made through "state of the art" processing techniques.

These membranes are also distinguished by their mechanical properties in the three directions (i.e. x, y, and z), which are greatly improved over those of the original workpiece or polymer billet prior to processing; for example, in Tables 14–16 for rolltruded polypropylene, polyethyleneterephthalate and ethylene/propylene copolymers.

Transport Features of Rolltruded Films

In order to establish the functional transport features of rolltruded membranes several kinds of investigations have been made using rolltruded polypropylene and polyvinylidene fluoride thin sheets (membranes). Preliminary results clearly demonstrate the uniqueness of these 3D structured morphologies for different deformation ratios. FIG. 14 demonstrates the quality properties of rolltruded polypropylene film versus commercial biaxially oriented film (of much thinner dimensions). The relative diffusion rates of $N_2$ for membranes of deformation ratios of $\times 30$ and $\times 10$, respectively, are vastly improved over commercially blow molded (biaxial) film of the same polypropylene polymer.

Figure 29:
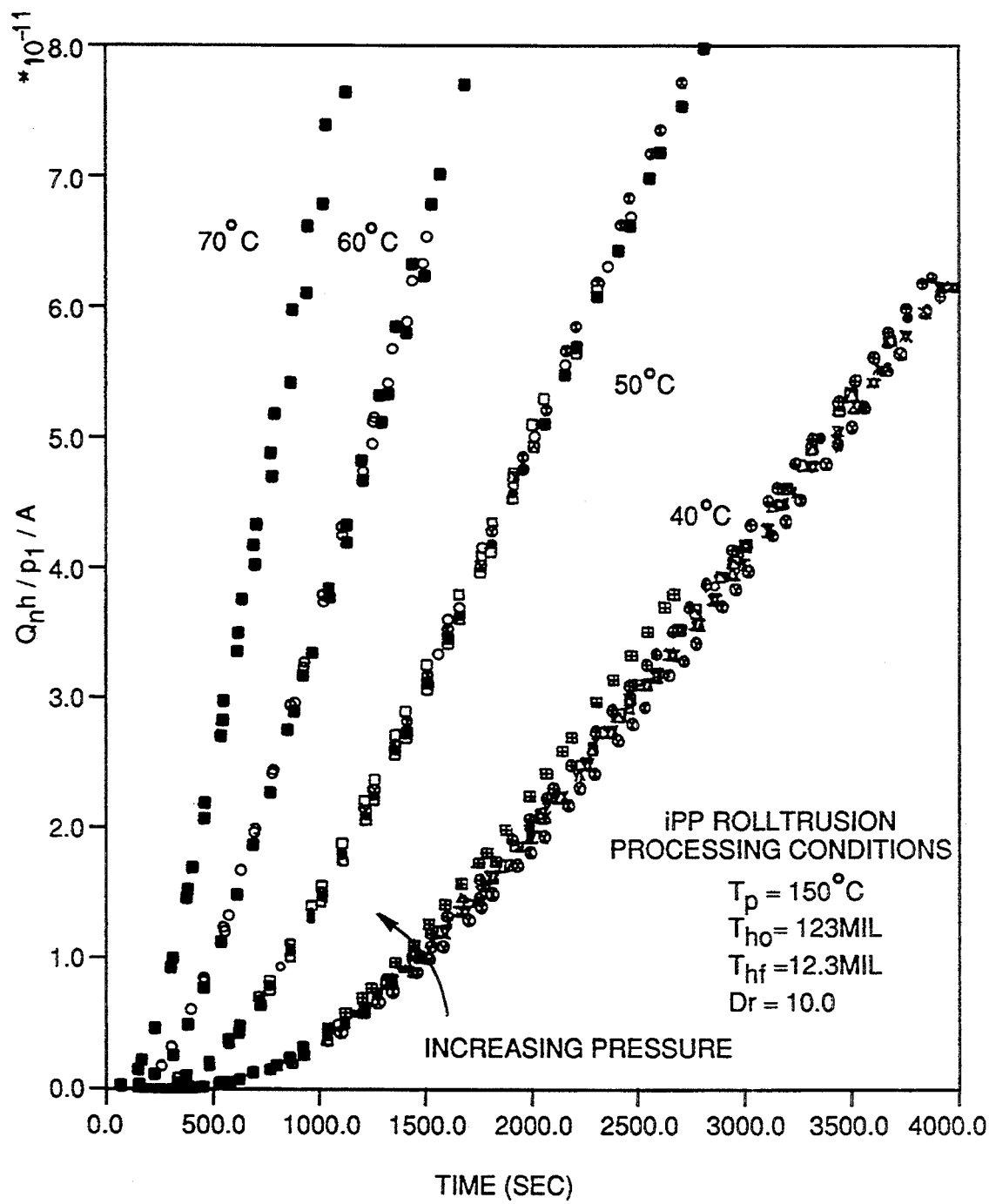
FIG. 29 is a graph showing the permeability versus time for $CO_2$ in iPP.
Figure 30:
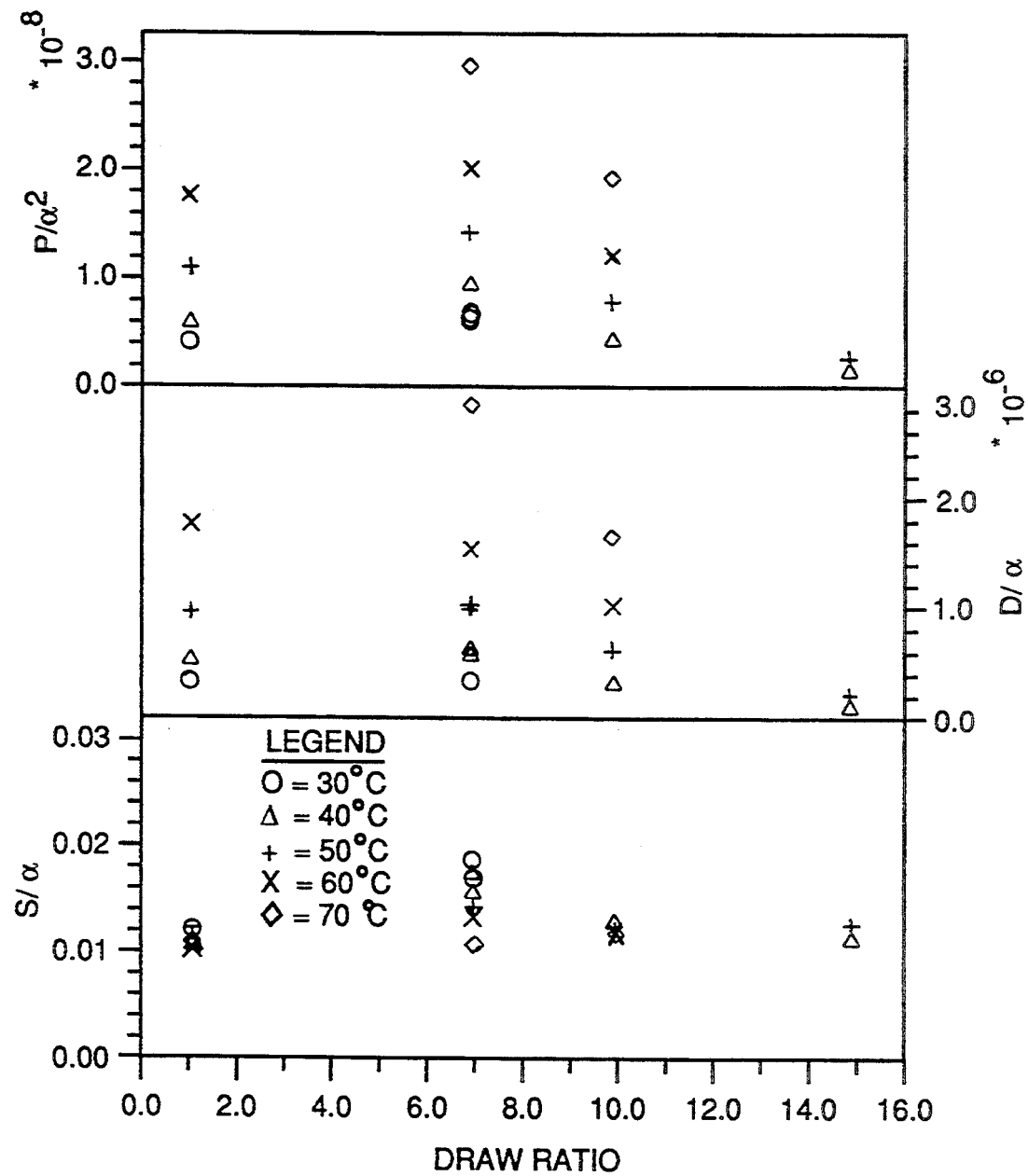
FIG. 30 shows graphs for the permeability, diffusivity, and solubility coefficient isotherms as a function of draw ratio in iPP at a constant driving pressure of 25 psia of $CO_2$.

FIG. 29 provides an example of the effect of increasing temperature ratio on rolltruded film properties $CO_2$ emergence through rolltruded polypropylene of DR=10. The influence of pressure is also indicated in a limited manner. More detailed investigations of the permeability, diffusivity and solubility coefficient isotherms are shown at a constant driving pressure of 25 psia of $CO_2$, and are provided in FIG. 30. Plots of the separation factor, $\alpha_s$ as a function of deformation ratio for a $CO_2/N_2$ mixture at a constant driving pressure of 75 psia illustrate that the separation factor increases with DR for all temperatures of measurement. This trend is a novel result in gas mixture separation which is in line with the illustration in FIG. 14 where one might expect very much improved behavior at even higher DR values for rolltruded polypropylene.

Figure 31:
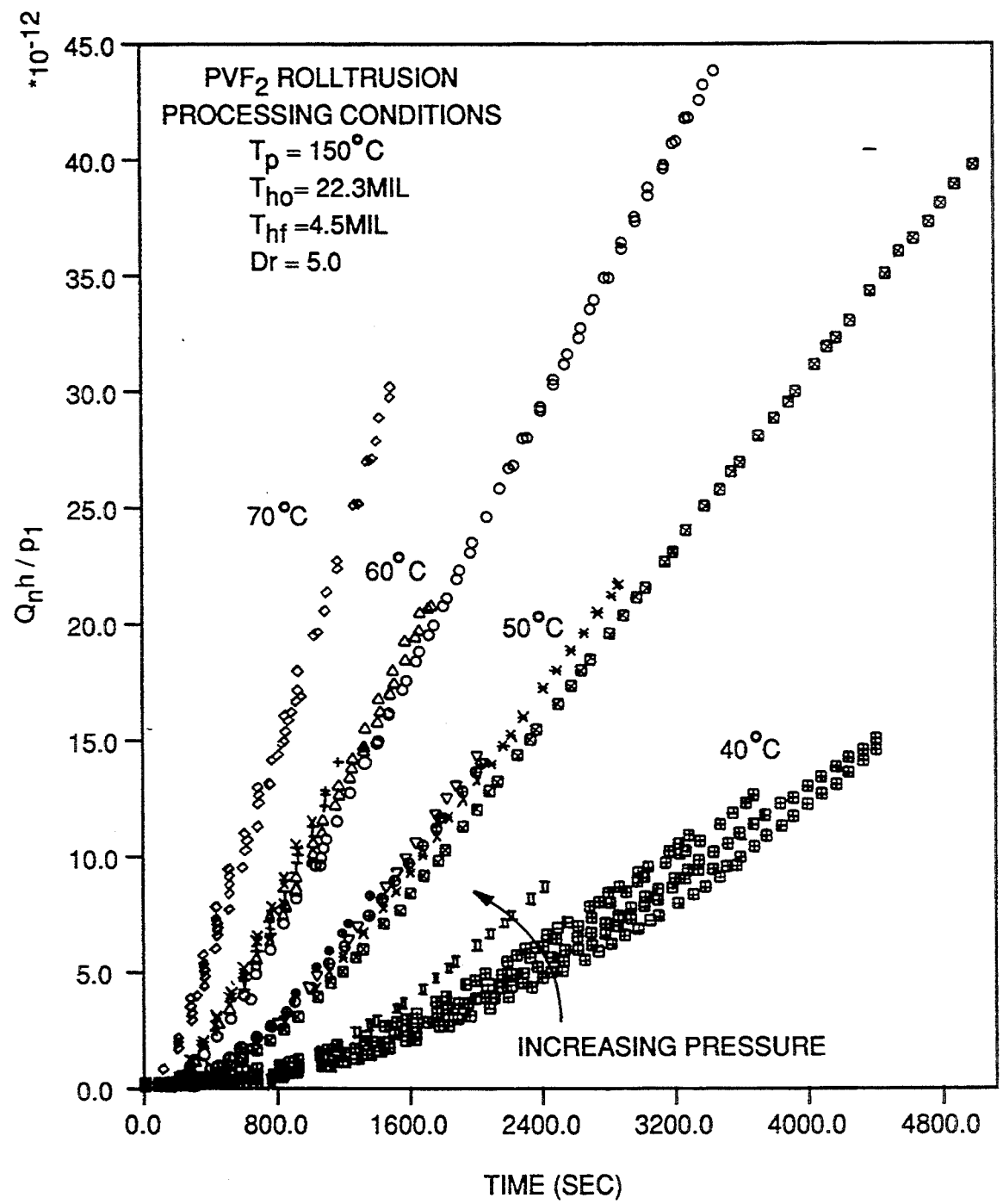
FIG. 31 is a graph showing the number of moles of $CO_2$ emerging as a function of time, temperature, and pressure for rolltruded $PVF_2$.
Figure 32:
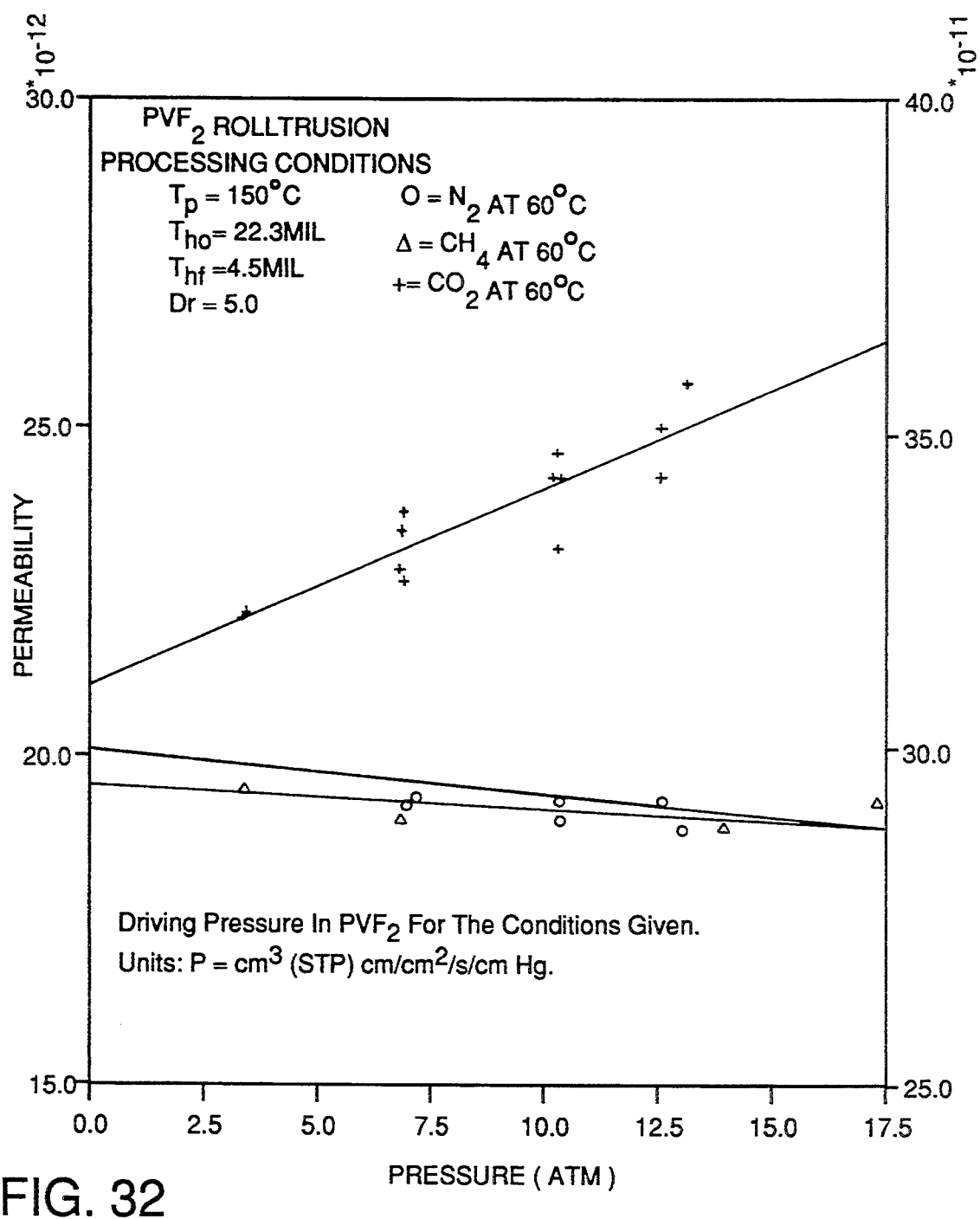
FIG. 32 is a graph plotting the permeability of several cases as a function of driving pressure in $PVF_2$.
Figure 33:
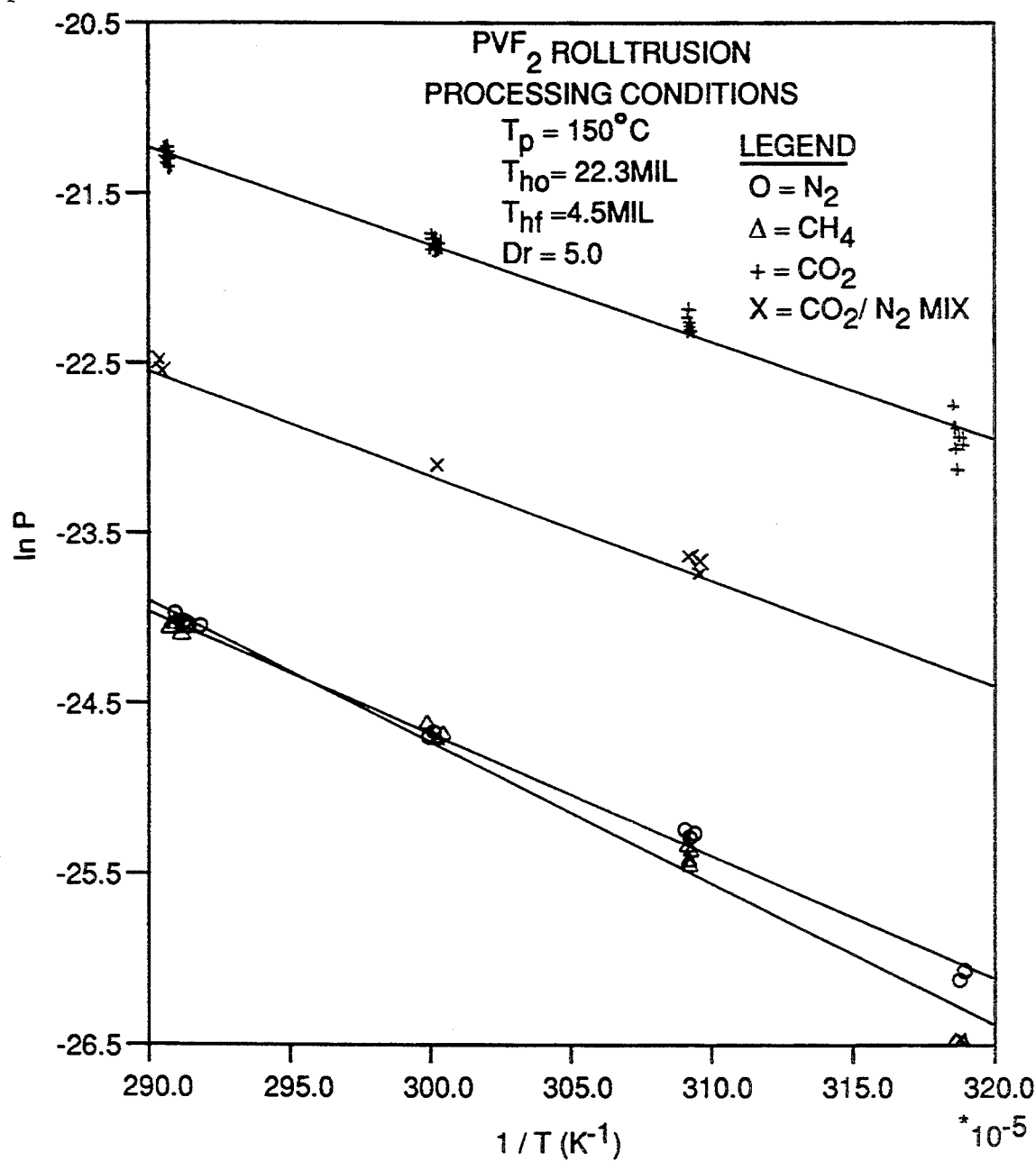
FIG. 33 is a graph showing the Arrhenius plots for several gases in $PVF_2$.

As another example rolltruded polyvinylidene fluoride of deformation ratio 5:1 clearly shows an increasing trend in permeability of $CO_2$ with temperature and with driving pressure. FIG. 31 shows the number of moles of $CO_2$ that have emerged from the bottom surface of the membrane as a function of time, temperature, and pressure. Trends in permeability of several gases with pressure and constant temperature are to be found in FIG. 32. Trends in the permeability of these gases $N_2$, $CH_4$ and $CO_2$ at 60° C. are well established again as examples using rolltruded membranes. Arrhenus plots are similarly established for gases and mixture in FIG. 33. The permeation activation energies for several gases are provided in Table 17.

Separation Factor

Figure 13:
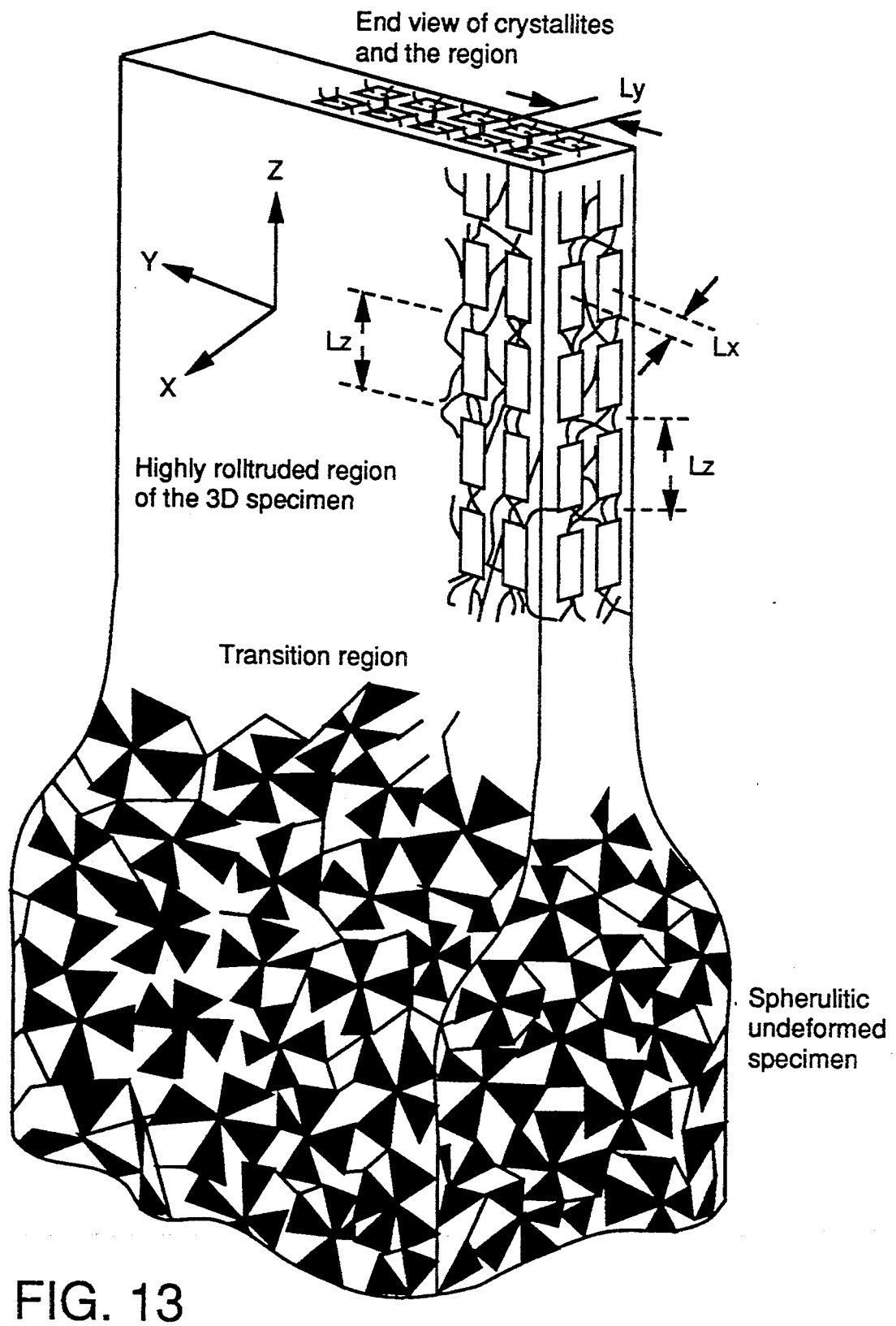
FIG. 13 is a schematic of the changes effected in the morphology of a material by the rolltrusion process.
Figure 34:
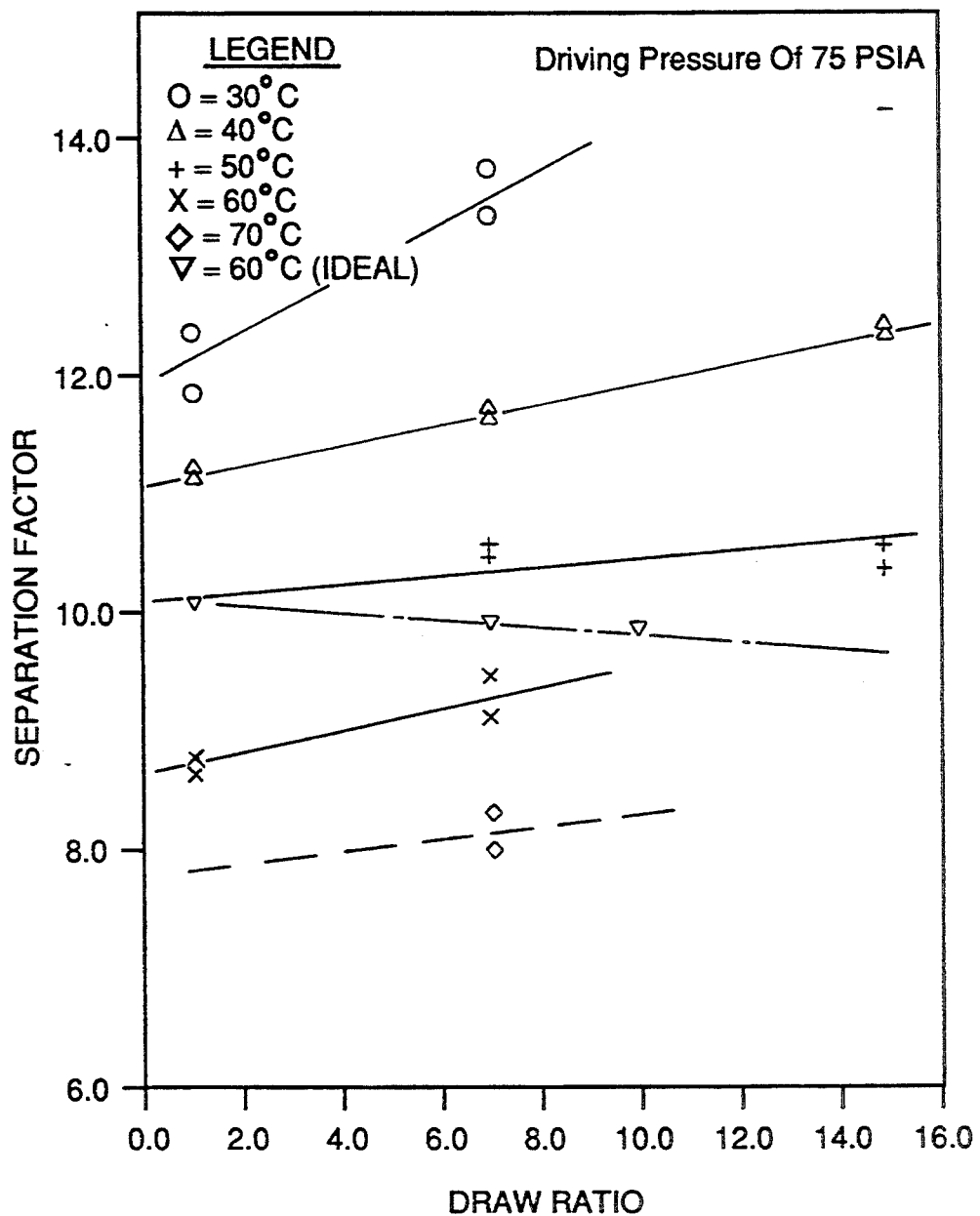
FIG. 34 is a graph plotting the deformation ratios for $CO_2/N_2$ for rolltruded iPP.

Deformation ratio plots for $CO_2/N_2$ are illustrated for PVDF in FIG. 34 where, at all temperatures, there is an increased trend in separation for the various temperatures listed. The separation factors are listed in FIG. 34. The uniqueness of rolltrusion membranes or films and their functional ability has been documented through these examples. The model in FIG. 13 is commensurate with these investigations. These values in Table 17 are in rough agreement with current data obtained by Elhibri and Pul for uniaxially drawn $PVF_2$, though the actual permeabilities here are higher. Similarly, Arrhenius plots of the diffusivity and solubility values are available but are not shown here. Table 18 shows the actual and ideal separation factors for several of the mixture runs as a function of temperature and pressure. The actual values are always lower than the ideal values. This is the result of an increase in the permeability of $N_2$ through the $PVF_2$ membrane because of the $CO_2$ plasticization. Note that the separation factors increase as the temperature decreases, which results from the greater difference in $CO_2$ solubility compared to $N_2$ at the lower temperatures.

Figure 1:
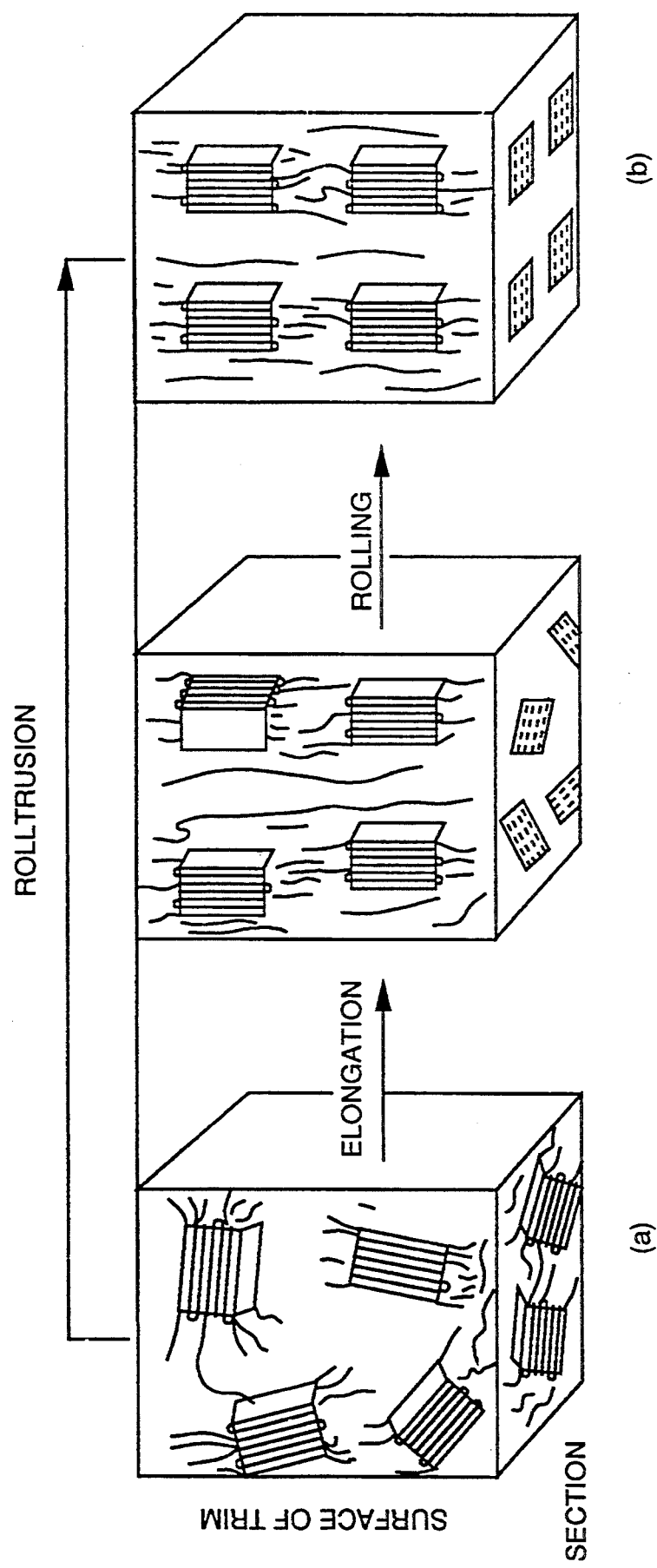
FIG. 1 is schematic of changes effected in morphology by rolltrusion.

FIG. 13 illustrates a morphological model associated with rolltruded materials. The bottom portion shows the spherulites in an underformed specimen prior to the rolltrusion process. The top section show the morphological results of the rolltrusion process in three dimensions. As can be seen in this top section of FIG. 13, the material has a morphology with a triaxial orientation or symmetry with a periodicity consisting of crystallites and amorphous or tie molecular regions between the crystallites, with no spherulites remaining in the rolltruded section of the workpiece. This is also shown in FIG. 1(b), and is discussed hereinbefore. The x, y, z axes are shown. Lx shows alignment of the crystallites in the x-direction; Ly shows the alignment of the crystallites in the y-direction; and Lz shows the alignment or-crystallites in the z direction. The end view at the top of FIG. 13 shows the crystallites and tie regions or amorphous material between the crystallites. The tie molecules distribution is illustrated as highly anisotropic in the three directions, the tie molecules being more abundant in the draw direction or the z-direction, which is in line with mechanical test results.

As discussed hereinbefore the rolltrusion process produces an improved film or membrane, in accordance with the teachings of the invention, which can be employed for several purposes. As is known in the art, polymer films or membranes can be used for the following purposes a) in the separation, removal or concentration of gases; b) for controlling drug release applications in medicine; c) for the delivery of microbiol herbicides in toxic waste treatments; d) for reverse osmosis; or e) in piezodialysis.

Examples of semicrystalline or potentially crystallizable polymers that have been studied so far are: polyolefins, for example, polyethylene, polypropylene and ethylene/propylene copolymers; polyamides, such as nylon 6 or nylon 66; polyesters, such as poly(ethyleneterephthalate); poly(fluoroalkenes) and poly(ketone), such as poly (aryletheretherketone) (PEEK).

Other polymers are in the process of being examined, but it is to be appreciated that all semicrystalline, amorphous and non-crystalline polymers which are potentially crystallizable can be rolltruded to produce a thin film which will function as a quality membrane, particularly for the concentration, separation or removal of gases or other molecular permeants, in general. Preferably, the thickness of such a film or membrane is less than 0.001 inch, which is the lower limit produced by the rolltrusion equipment disclosed herein. Several thousands of an inch are readily viable films, also.

As can be seen in FIG. 13, this morphology has a periodic distribution of crystalline (permeant blockers) and intercrystalline tie regions in the three xyz dimensions. Some dimensions that have been measured by small-angle x-ray scattering show sizes that depend upon the processing temperature and draw or deformation ratio. This morphology may be expressed as:

$$L_{(overall)} = L_{c(crystalline)} + L_{a(non-crystalline)}$$

Where L is the overall morphology measured in angstroms, Å. $L_c$ is the crystalline structure in the rolltruded material, and $L_a$ is the non-crystalline or amorphous structure in the rolltruded material.

$L_c$ functions as diffusion or permeator "blockers", whereas $L_a$ depicts the dimension comprised of variously oriented intercrystallite regions (ranging from relaxed to taut, depending upon the rolltrusion conditions) i.e., the region through which the permeant passes.

In the overall range of morphology, L, the non-crystalline structure $L_a$, typically varies between 10% and 25% of the overall range morphology, L.

Table 13 lists the several polymers for which examples of periodicity of membrane crystalline/amorphous dimensions in the triaxial orientation have been established. These materials include nylons, polyolefins, ethylene/propylene copolymers, polycarbonates, polyesters, polyvinylidene fluoride, homo and copolymers, and poly(aryletheretherketone) (PEEK).

For polyethylene specifically, the draw temperature used is in the range from 30° to 130° C., permitting a maximum draw ratio ranging from ×5 to ×30, the original specimen prior to rolltrusion. This sample had an overall morphology, L, ranging from 120 Å to 400 Å with 10% to 25% of this range being non-crystalline structure, La, as discussed hereinbefore.

For polypropylene, the draw temperature is in the range from 50° to 160° C., with a draw ratio ranging from ×5 to ×60 the specimen prior to rolltrusion. The morphology (L) range is 130 to 500 Å with approximately 10% to 25% of this range being non-crystalline structure and 75% to 90% being crystalline structure, Lc.

For ethylene/propylene, the processing temperature varied depending on the copolymer composition. The deformation ratio range is ×3 to ×30; and the overall morphology range is 100 to 300 Å.

For polyvinylidene fluoride, the temperature range is 100°–160°. The deformation ratio was ×3 to ×12, and the overall morphology was 120 to 250 Å.

For nylon 6, the processing temperature range is 180° to 210° C., the deformation ratio range is ×2 to ×7; and the overall morphology range is 100 to 150 Å.

Nylon 66 has a temperature range of 220 to 260° C., the deformation ratio range is ×2 to ×7, and the overall morphology range is 100 to 150 Å.

Poly(ethyleneterephthalate) (amorphous) has a temperature range of 60° to 80° C. the deformation ratio range is ×2 to ×10; and the overall morphology range is 100 to 150 Å.

For PEEK, the temperature range is typically 270° C. to 310° C.; the deformation ratio range is ×2 to ×10; and the morphology range is 180 to 250 Å.

As indicated in Table 13, the overall morphology, L, contains a morphology for the non-crystalline material ranging 10% to 25%. Thus, the morphology for the crystalline (Lc) material is approximately 75% to 90% of the overall morphological dimension in the deformation direction.

Whereas particular embodiments of the invention have been described above for purposes of illustration, it will be evident to those skilled in the art that numerous variations of the details may be made without departing from the invention as defined in the appended claims.

I claim:

1. A synthetic polymer membrane comprising a triaxial morphology produced by a rolltrusion process which is a one-step solid state processing technique involving simultaneous rolling and stretching operations performed on a workpiece to produce said membrane, and a perodicity of crystallites having a main axis oriented generally along the stretching direction and amorphous materials connecting said crystallites and lying in three generally perpendicular directions with a substantially small amount or no spherulite texture remaining after said rolltrusion process thereby enhancing the transparency characteristics and the mechanical properties of said membrane in said three directions.

2. A membrane of claim 1, said material being polyolefin.

3. A membrane of claim 2, said polyolefin material being polyethylene.

4. A membrane of claim 2, said polyolefin being polypropylene.

5. A membrane of claim 2, said polyolefin being ethylene/propylene copolymer.

6. A membrane of claim 1, said material being polyamide.

7. A membrane of claim 6, said polyamide being nylon.

8. A membrane of claim 1, said material being polyester.

9. A membrane of claim 8, said polyester being poly(ethyleneterephthalate).

10. A membrane of claim 1, said material being polyfluoroalkene.

11. A membrane of claim 10, said polyfluoroalkene being polyvinylidene fluoride.

12. A membrane of claim 1, said material being poly(ketone).

13. A membrane of claim 12, said poly(ketone) being poly(aryletheretherketone) (PEEK).

14. A membrane of claim 1, said material being polycarbonate.

15. A membrane of claim 1, wherein the thickness of said material is approximately 0.001 inch.

16. A synthetic polymer membrane comprising a triaxial morphology produced by a rolltrusion process which is a one-step solid state processing technique involving simultaneous rolling and stretching operations performed on a workpiece to produce said membrane, and a periodic distribution of crystallites having a main axis oriented generally along the stretching direction and said crystallites being interconnected by tie molecules in three generally perpendicular directions thereby enhancing the transparency characteristics and mechanical properties of said membrane in said three directions.

17. A membrane of claim 16, said material being polyolefin.

18. A membrane of claim 17 said polyolefin material being polyethylene.

19. A membrane of claim 17, said polyolefin being polypropylene.

20. A membrane of claim 17, said polyolefin being ethylene/propylene copolymer.

21. A membrane of claim 16, said material being polyamide.

22. A membrane of claim 21, said polyamide being nylon.

23. A membrane of claim 16, said material being polyester.

24. A membrane of claim 23, said polyester being poly(ethyleneterephthalate).

25. A membrane of claim 16, said material being polyfluoroalkene.

26. A membrane of claim 25, said polyfluoroalkene being polyvinylidene fluoride.

27. A membrane of claim 16 said material being poly(ketone).

28. A membrane of claim 27, said poly(ketone) being poly(aryletheretherketone) (PEEK).

29. A membrane of claim 16, wherein the thickness of said film material is approximately 0.001 inch.

30. A membrane of claim 16, said material being polycarbonate.

31. A synthetic polymer membrane comprising a triaxial morphology produced by a rolltrusion process which is a one-step solid state processing technique involving simultaneous rolling and stretching operations performed on a workpiece to produce said membrane, and a periodic distribution of crystallites having a main axis oriented generally along the stretching direction and said crystallites being interconnected by tie molecules in three generally perpendicular directions to enhance the transparency characteristics and mechanical properties of said membrane in said three directions, whereby said membrane is characterized by the property of being sturdy and rugged and suitable for use in chemical technology.

* * * * *